(12) United States Patent
Messina et al.

(10) Patent No.: US 11,858,300 B2
(45) Date of Patent: Jan. 2, 2024

(54) WHEEL COMPRISING A TIRE

(71) Applicant: Camso Inc., Magog (CA)

(72) Inventors: Salvatore Messina, Magog (CA); Marc Favre, Plattsburgh, NY (US); Slim Frikha, Otterburn Park (CA); Hugo Van De Wiele, Lokeren (BE); Tim De Witte, Ghent (BE)

(73) Assignee: CAMSO INC., Magog (CA)

( * ) Notice: Subject to any disclaimer, the term of this patent is extended or adjusted under 35 U.S.C. 154(b) by 444 days.

(21) Appl. No.: 16/497,293

(22) PCT Filed: Mar. 5, 2018

(86) PCT No.: PCT/CA2018/050256
§ 371 (c)(1),
(2) Date: Sep. 24, 2019

(87) PCT Pub. No.: WO2018/170583
PCT Pub. Date: Sep. 27, 2018

(65) Prior Publication Data
US 2021/0061008 A1    Mar. 4, 2021

Related U.S. Application Data

(60) Provisional application No. 62/476,370, filed on Mar. 24, 2017.

(51) Int. Cl.
*B60C 7/22* (2006.01)
*B60C 7/10* (2006.01)

(52) U.S. Cl.
CPC ............... *B60C 7/22* (2013.01); *B60C 7/102* (2013.01)

(58) Field of Classification Search
CPC .................................. B60C 7/102; B60C 7/22
See application file for complete search history.

(56) References Cited

U.S. PATENT DOCUMENTS

| | | | | |
|---|---|---|---|---|
| 6,142,203 | A * | 11/2000 | Bickford | B60C 7/22 152/394 |
| 2008/0314486 | A1* | 12/2008 | Manesh | B60C 7/14 152/328 |
| 2018/0086142 | A1* | 3/2018 | Hasegawa | C08K 5/40 |

FOREIGN PATENT DOCUMENTS

| CN | 2631795 Y | 8/2004 |
|---|---|---|
| CN | 203401877 U | 1/2014 |

(Continued)

OTHER PUBLICATIONS

Extended European Search Report dated Sep. 25, 2020, in connection with European Patent Application No. 18770187.5, 64 pages.

(Continued)

*Primary Examiner* — Kip T Kotter
(74) *Attorney, Agent, or Firm* — Hahn Loeser & Parks LLP; Bret A. Hrivnak

(57) ABSTRACT

A wheel for a vehicle, such as a forklift (e.g., an electric forklift) or another material-handling vehicle, in which the wheel comprises a tire (e.g., a non-pneumatic tire) and may be designed to enhance its use and performance and/or use and performance of the vehicle, including, for example, to exhibit less rolling resistance, be more energy-efficient and/or allow the vehicle to travel faster and/or with improved ride comfort. For instance, elastic deformation of the wheel as it rolls may be better managed (e.g., reduced), which may improve thermal behavior of the wheel and/or may be combined with ways to better distribute or dissipate heat (e.g., by increasing thermal conductivity).

49 Claims, 28 Drawing Sheets

(56) References Cited

FOREIGN PATENT DOCUMENTS

| CN | 106170401 A | 11/2016 | |
|---|---|---|---|
| CN | 1066265 | 7/2020 | |
| DE | 1480911 A1 | 10/1969 | |
| DE | 2120107 A * | 11/1972 | ............... B60C 7/22 |
| DE | 2120107 A1 | 11/1972 | |
| EP | 3064374 A1 | 9/2016 | |
| EP | 3135501 A1 * | 3/2017 | ......... B60C 11/0008 |
| FR | 901892 | 8/1945 | |
| FR | 1383874 A | 1/1965 | |
| GB | 2051699 A | 1/1981 | |
| JP | H04176706 | 6/1992 | |
| JP | 2005306295 | 11/2005 | |
| JP | 2009096415 | 5/2009 | |
| JP | 2010163123 A | 7/2010 | |
| WO | WO-2013095499 A1 * | 6/2013 | ............... B60C 7/00 |
| WO | WO-2015194277 A1 * | 12/2015 | .............. B60C 7/102 |
| WO | 2017005713 | 1/2017 | |

OTHER PUBLICATIONS

International Search Report dated Jun. 8, 2018 in connection with International PCT Patent Application No. PCT/CA2018/050256, 5 pages.
Written Opinion dated Jun. 8, 2018 in connection with International PCT Patent Application No. PCT/CA2018/050256, 7 pages.
Written Opinion dated Mar. 7, 2019 in connection with International PCT Patent Application No. PCT/CA2018/050256, 6 pages.
Communication pursuant to Article 94(3) EPC dated Aug. 4, 2021, in connection with European Patent Application No. 18770187.5, 14 pages.
First Office Action dated May 28, 2021, in connection with Chinese Patent Application No. 201880034143.0, 8 pages (translation).
Office Action dated Mar. 4, 2022, in connection with Chinese Patent Application No. 201880034143.0, 7 pages (translation).

* cited by examiner

WHEEL COMPRISING A TIRE

CROSS-REFERENCE TO RELATED APPLICATIONS

This application is a National Phase Entry of International PCT Application No. PCT/CA2018/050256 filed on Mar. 5, 2018 submitted under 35 USC § 371 and claims priority from U.S. Provisional Patent Application 62/476,370 filed on Mar. 24, 2017, all of which being incorporated by reference herein.

FIELD

This disclosure generally relates to wheels comprising tires (e.g., non-pneumatic tires) for vehicles, such as material-handling vehicles (e.g., forklifts) or other vehicles.

BACKGROUND

Wheels for vehicles comprise tires, which may be pneumatic tires or non-pneumatic tires.

Non-pneumatic tires, which can sometimes also be referred to as "solid" or "resilient" tires, are not supported by gas (e.g., air) pressure. This may provide certain benefits, such as allowing them to be flat-proof.

Rolling resistance and energy efficiency of tires may be important considerations. For instance, this may be particularly relevant for electric industrial vehicles, such as electric forklifts, to optimize battery runtime. Speed and stiffness characteristics of tires may also be significant for productivity, efficiency and ride comfort, although they may sometimes be conflicting factors.

For these and other reasons, there is a need to improve wheels comprising tires, including non-pneumatic tires.

SUMMARY

According to various aspects of this disclosure, there is provided a wheel for a vehicle, such as a forklift (e.g., an electric forklift) or another material-handling vehicle, in which the wheel comprises a tire (e.g., a non-pneumatic tire) and may be designed to enhance its use and performance and/or use and performance of the vehicle, including, for example, to exhibit less rolling resistance, be more energy-efficient and/or allow the vehicle to travel faster and/or with improved ride comfort. For instance, elastic deformation of the wheel as it rolls may be better managed (e.g., reduced), which may improve thermal behavior of the wheel and/or may be combined with ways to better distribute or dissipate heat (e.g., by increasing thermal conductivity).

For example, in accordance with an aspect of this disclosure, there is provided a tire for a wheel rolling on an underlying surface. The tire is non-pneumatic and comprises a plurality of layers that are structurally different and arranged in a radial direction of the tire. An outer one of the layers comprises an outer surface for contacting the underlying surface. An inner one of the layers comprises an inner surface for facing an axis of rotation of the wheel. An intermediate one of the layers is configured to decouple elastic deformations of respective ones of the layers.

In accordance with another aspect of this disclosure, there is provided a tire for a wheel rolling on an underlying surface. The tire is non-pneumatic and comprises a plurality of layers that are structurally different and arranged in a radial direction of the tire. An outer one of the layers comprises an outer surface for contacting the underlying surface. An inner one of the layers comprises an inner surface for facing an axis of rotation of the wheel. An intermediate one of the layers is stiffer than an adjacent one of the layers that is adjacent to the intermediate one of the layers.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A rolling resistance coefficient of the tire is no more than 14 $kg_f/t_f$ according to VDI 2196.

In accordance with another aspect of this disclosure, there is provided a tire for a wheel rolling on an underlying surface. The tire is non-pneumatic and comprises an outer surface for contacting the underlying surface, an inner surface for facing an axis of rotation of the wheel, and reinforcing cables extending transversally to a circumferential direction of the tire.

In accordance with another aspect of this disclosure, there is provided a tire for a wheel rolling on an underlying surface. The tire is non-pneumatic and comprises: an outer surface for contacting the underlying surface; an inner surface for facing an axis of rotation of the wheel; a first band of material stiffer than elastomeric material of the tire; and a second band of material stiffer than the elastomeric material of the tire and spaced apart from the first band of material in a radial direction of the tire.

In accordance with another aspect of this disclosure, there is provided a tire for a wheel rolling on an underlying surface. The wheel comprises a wheel body for connecting the wheel to an axle. The tire is configured to be press-mounted about the wheel body. The tire is non-pneumatic and comprises: an outer surface for contacting the underlying surface; a mounting band that comprises an inner surface for facing an axis of rotation of the wheel and configured to mount the tire onto the wheel body; and a reinforcing band spaced apart from the mounting band in a radial direction of the tire.

In accordance with another aspect of this disclosure, there is provided a tire for a wheel rolling on an underlying surface. The tire is non-pneumatic and comprises: an outer surface for contacting the underlying surface, an inner surface for facing an axis of rotation of the wheel, rubber, and a polymeric material other than rubber. A ratio of a thickness of the polymeric material other than rubber over an outer diameter of the tire is at least 0.1.

In accordance with another aspect of this disclosure, there is provided a tire for a wheel rolling on an underlying surface. The tire is non-pneumatic and comprises a plurality of layers that are structurally different and arranged in a radial direction of the tire. An outer one of the layers comprises an outer surface for contacting the underlying surface. An inner one of the layers comprises an inner surface for facing an axis of rotation of the wheel. A radial stiffness of an intermediate one of the layers varies in a lateral direction of the tire.

In accordance with another aspect of this disclosure, there is provided a tire for a wheel rolling on an underlying surface. The tire is non-pneumatic and comprises an outer surface for contacting the underlying surface, an inner surface for facing an axis of rotation of the wheel, lateral surfaces opposite one another, and a void extending around the tire and spaced from the lateral surfaces.

In accordance with another aspect of this disclosure, there is provided a tire for a wheel rolling on an underlying surface. The tire is non-pneumatic and comprises: an outer surface for contacting the underlying surface; an inner surface for facing an axis of rotation of the wheel; lateral surfaces opposite one another; and a plurality of voids extending around the tire, spaced from the lateral surfaces, and spaced from one another in a lateral direction of the tire.

In accordance with another aspect of this disclosure, there is provided a tire for a wheel rolling on an underlying surface. The tire is non-pneumatic and comprises: an outer surface for contacting the underlying surface; an inner surface for facing an axis of rotation of the wheel; a reinforcing band between the outer surface and the inner surface; and a plurality of voids spaced apart from one another in a circumferential direction of the tire and extending in a lateral direction of the tire for at least a majority of a width of the tire.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A working-day-average-speed (WDAS) for the tire is allowed to be at least 10 km/h.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A working-day-average-speed (WDAS) for the tire is allowed to be at least 8 km/h. A radial stiffness of the tire is no more than 210 kg/mm.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A working-day-average-speed (WDAS) for the tire is allowed to be at least 10 km/h. A radial stiffness of the tire is no more than 210 kg/mm.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A working-day-average-speed (WDAS) allowed for the tire and a radial stiffness of the tire are defined in a crosshatched zone SRS indicated in a chart shown in FIG. 35A.

In accordance with another aspect of this disclosure, there is provided a tire for a wheel rolling on an underlying surface. The tire is non-pneumatic and comprises an outer surface for contacting the underlying surface and an inner surface for facing an axis of rotation of the wheel. A working-day-average-speed (WDAS) allowed for the tire and a radial stiffness of the tire are defined in a crosshatched zone SRS indicated in a chart shown in FIG. 35B.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be limitative.

DETAILED DESCRIPTION OF EMBODIMENTS

Figure 1:
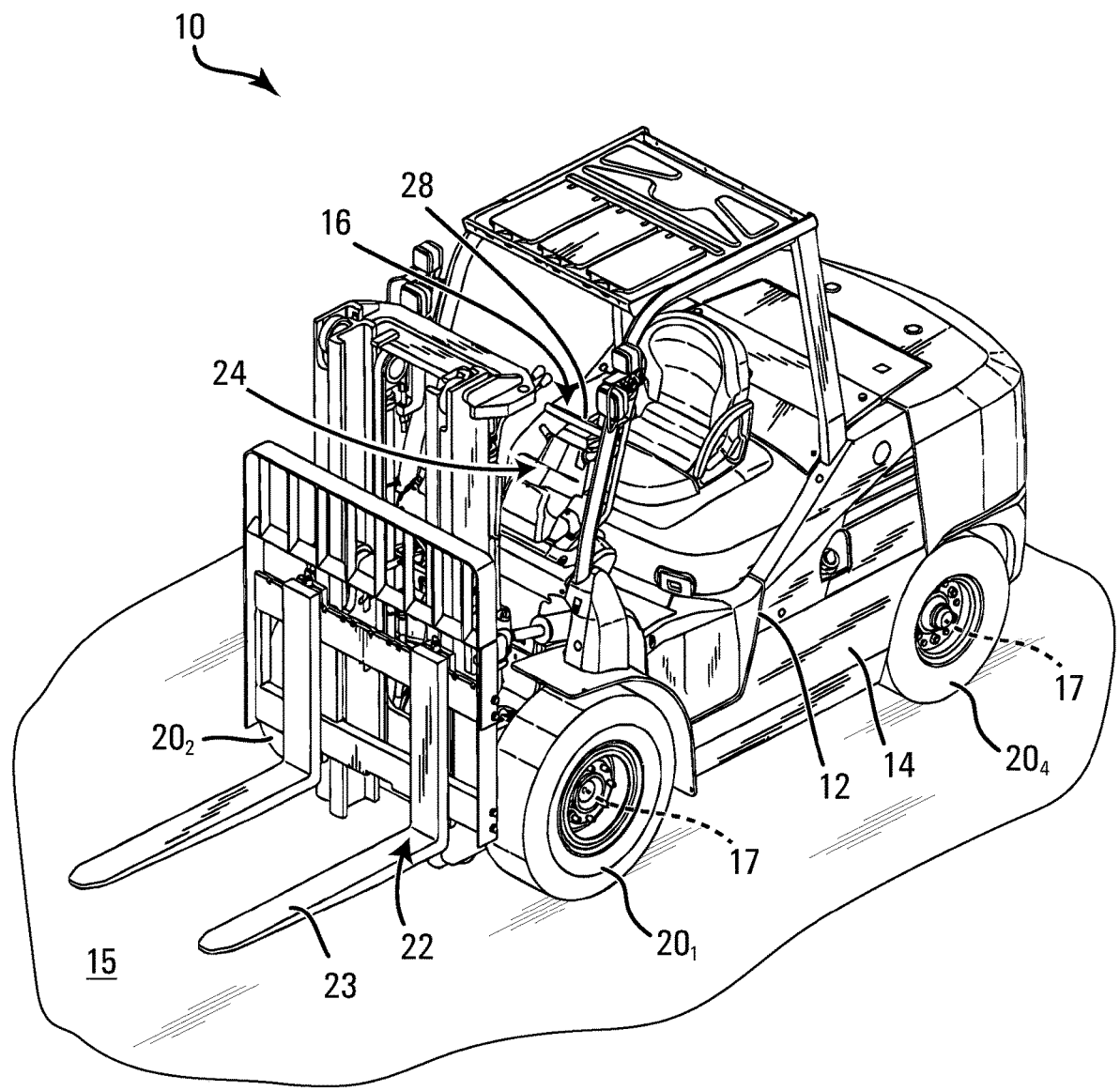
FIG. 1 shows an example of a vehicle comprising wheels in accordance with an embodiment.

FIG. 1 shows an example of a vehicle 10 comprising wheels $20_1$-$20_4$ in accordance with an embodiment. In this embodiment, the vehicle 10 is a material-handling vehicle, which is an industrial vehicle designed to travel off-road to move (e.g., transport) and/or otherwise handle materials (e.g., goods and products), such as during their manufacturing, storage, distribution, consumption, and/or disposal. More particularly, in this embodiment, the material-handling vehicle 10 is a forklift.

As further discussed later, in this embodiment, the wheels $20_1$-$20_4$ may be non-pneumatic and designed to enhance their use and performance and/or use and performance of the forklift 10, including, for example, to exhibit less rolling resistance, be more energy-efficient, and/or allow the forklift 10 to travel faster and/or with improved ride comfort. For example, elastic deformation of the wheels $20_1$-$20_4$ as they roll may be better managed (e.g., reduced), which may improve their thermal behavior and/or may be combined with ways to better distribute or dissipate heat (e.g., by increasing thermal conductivity).

In this embodiment, the forklift 10 comprises a frame 12, a powertrain 14, a steering system 16, the wheels $20_1$-$20_4$, a work implement 22, and a user interface 24, which enable a user of the forklift 10 to control the forklift 10 on an underlying surface 15 (e.g., a floor, soil or another ground surface, etc.), including to steer the forklift 10 and perform work using the work implement 22. The forklift 10 has a longitudinal direction, a widthwise direction, and a heightwise direction.

The powertrain 14 is configured for generating motive power and transmitting motive power to respective ones of the wheels $20_1$-$20_4$ to propel the forklift 10 on the underlying surface 15. To that end, the powertrain 14 comprises a prime mover 26, which is a source of motive power that comprises one or more motors. For example, in this embodiment, the prime mover comprises an electric motor. The forklift 10 is thus an electric forklift. In other embodiments, the prime mover may comprise another type of motor (e.g., an internal combustion engine) or a combination of different types of motor (e.g., an internal combustion engine and an electric motor). The prime mover is in a driving relationship with respective ones of the wheels $20_1$-$20_4$. That is, the powertrain 14 transmits motive power generated by the prime mover to respective ones of the wheels $20_1$-$20_4$ (e.g., via a transmission and/or a differential) in order to drive (i.e., impart motion to) them.

The steering system 16 is configured to enable the user to steer the forklift 10 on the underlying surface 15. To that end, the steering system 16 comprises a steering device 28 that is operable by the user to direct the forklift 10 along a desired course on the underlying surface 15. In this embodiment, the steering device 28 comprises a steering wheel. The steering device 28 may any other steering component that can be operated by the user to steer the forklift 10 in other embodiments. The steering system 16 responds to the user interacting with the steering device 28 by turning respective ones of the wheels $20_1$-$20_4$ to change their orientation relative to the frame 12 of the forklift 10 in order to cause the forklift 10 to move in a desired direction. In this example, rear ones of the wheels $20_1$-$20_4$ are turnable in response to input of the user at the steering device 28 to change their orientation relative to the frame 12 of the forklift 10 in order to steer the forklift 10 on the ground. More particularly, in this example, each of the rear ones of the wheels $20_1$-$20_4$ is pivotable about a steering axis of the forklift 10 in response to input of the user at the steering device 28 in order to steer the forklift 10 on the ground. Front ones of the wheels $20_1$-$20_4$ are not turned relative to the frame 12 of the forklift 10 by the steering system 16.

The work implement 22 is used to perform work. In this embodiment, the work implement 22 comprises a fork 23 that can be raised and lowered to lift or lower objects to be transported or otherwise handled. In other embodiments, for other types of vehicles, the work implement 22 may comprise a platform, an arm, a grapple, or any other type of implement.

The user interface 24 allows the user to interact with the forklift 10. More particularly, the user interface 24 comprises an accelerator, a brake control, and the steering device 28 that are operated by the user to control motion of the forklift 10 on the underlying surface 15 and operate the work implement 22. The user interface 24 may also comprise an instrument panel (e.g., a dashboard) which provides indicators (e.g., a speedometer indicator, a tachometer indicator, etc.) to convey information to the user.

The wheels $20_1$-$20_4$ engage the underlying surface 15 for traction of the forklift 10. Each wheel $20_i$ comprises a wheel body 32 for connecting the wheel $20_i$ to an axle 17 of the forklift 10 and a tire 34 disposed around the wheel body 32 for contacting the underlying surface 15.

Figure 2:
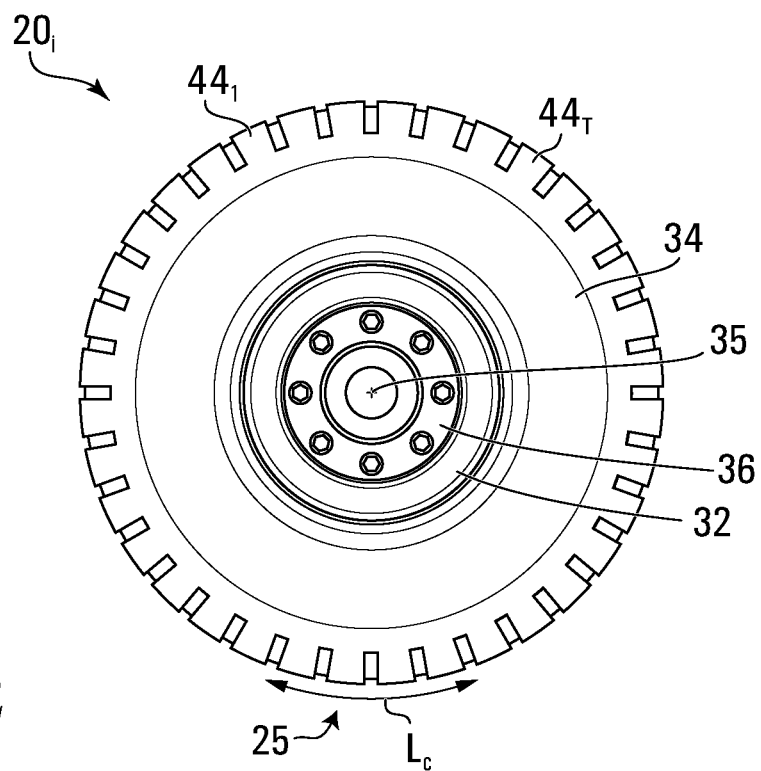
FIGS. 2 and 3 show a side view and a front view of a wheel comprising a wheel body and a tire.
Figure 3:
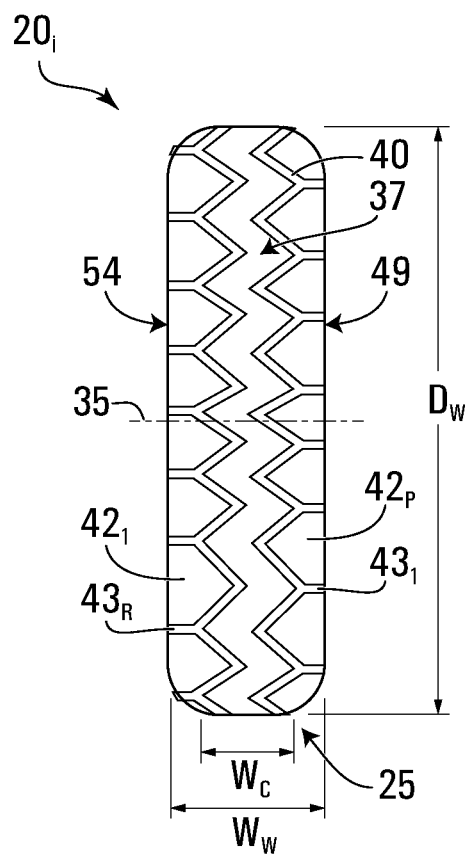

With additional reference to FIGS. 2 and 3, the wheel $20_i$ has: an axial direction defined by an axis of rotation 35 of the wheel $20_i$, which may also be referred to as a lateral, widthwise, or "Y" direction; a radial direction, which may also be referred to as a "Z" direction; and a circumferential direction, which may also be referred to as a "X" direction. The axis of rotation 35 of the wheel $20_i$ corresponds to an axis of rotation of the tire 34 and an axis of rotation of the wheel body 32, and the axial direction, the radial direction and the circumferential direction of the wheel $20_i$ respectively correspond to an axial (i.e., lateral or widthwise) direction, a radial direction, and a circumferential direction of each of the tire 34 and the wheel body 32. The wheel $20_i$ has an outer diameter $D_W$ and a width $W_W$. It comprises an inboard lateral side 54 for facing a center of the forklift 10 in the widthwise direction of the forklift 10 and an outboard lateral side 49 opposite the inboard lateral side 54. The wheel 20$_i$ has an area of contact 25 with the underlying surface 15$_i$ which may be referred to as a "contact patch" of the wheel 20$_i$ with the underlying surface 15. The contact patch 25 of the wheel 20$_i$, which is a contact interface between the tire 34 and the underlying surface 15, has a dimension $L_C$, referred to as a "length", in the circumferential direction of the wheel 20$_i$ and a dimension $W_C$, referred to as a "width", in the lateral direction of the wheel 20$_i$.

The wheel body 32 is a central structure of the wheel 20$_i$ disposed radially inwardly of the tire 34. In this embodiment, the wheel body 32 comprises a rigid material, such as a metallic material (e.g., steel), providing strength to the wheel 20$_i$. The wheel body 32 comprises a hub 36 to secure the wheel 20$_i$ to the axle 17 of the forklift 10. For instance, the hub 36 may be fastened to the axle 17 of the forklift 10 via fasteners.

The tire 34 comprises an outer surface 37 for contacting the underlying surface 15, an inner surface 39 for facing the wheel body 32 and the axis of rotation 35 of the wheel, 20$_i$, and lateral surfaces 41$_1$, 41$_2$ opposite one another and spaced from one another in the lateral direction of the tire 34. It has an outer diameter $D_T$, an inner diameter $d_T$ and a width $W_T$.

The outer surface 37 of the tire 34 comprises a tread 40. In this example, the tread 40 comprises a pattern of traction elements 44$_1$-44$_T$ to enhance traction on the underlying surface 15. The pattern of traction elements 44$_1$-44$_T$ comprises traction projections 42$_1$-42$_P$ and traction recesses 43$_1$-43$_R$ between the traction projections 42$_1$-42$_P$. Any suitable design for the pattern of traction elements 44$_1$-44$_T$ may be used. In other examples, the tread 40 may be smooth, i.e., with no pattern of traction elements such as the pattern of traction elements 44$_1$-44$_T$.

Figure 4A:
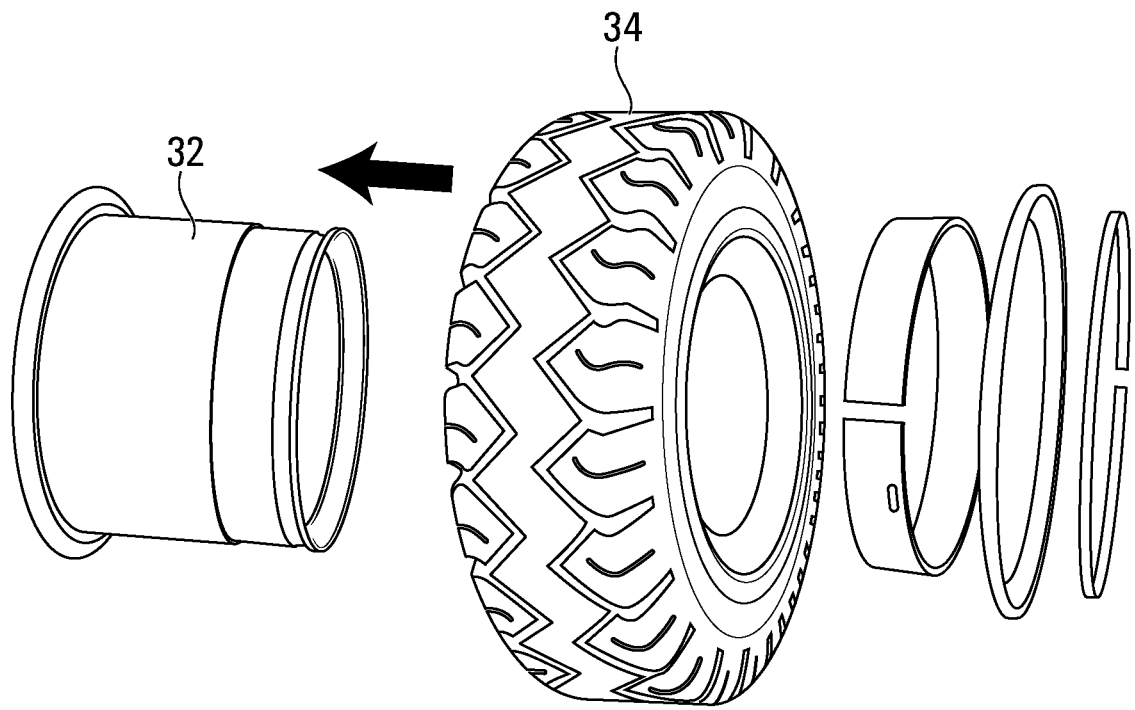
FIGS. 4A and 4B shows the tire being secured to the wheel body via one or more locking elements.
Figure 4B:
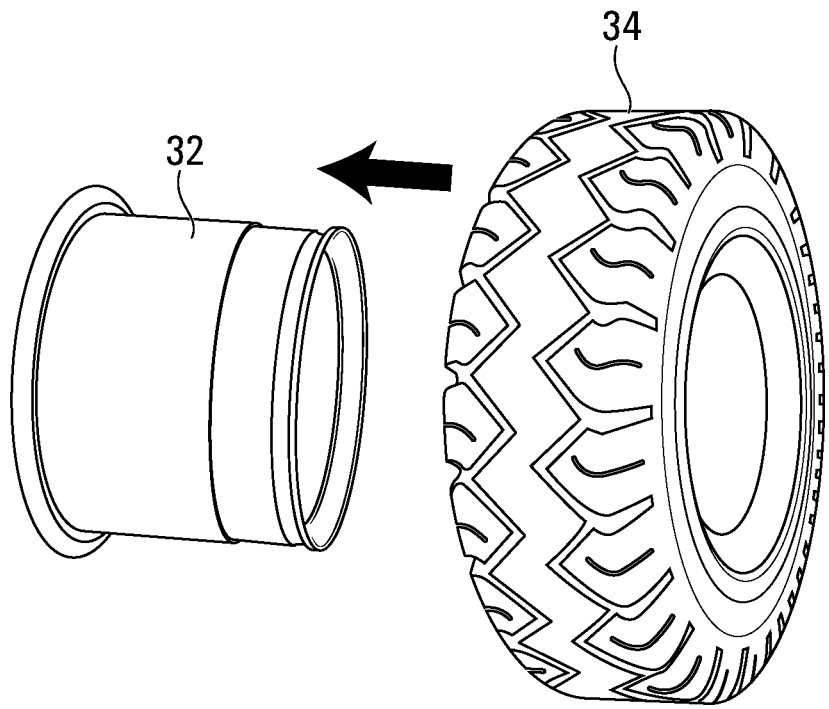
Figure 5:
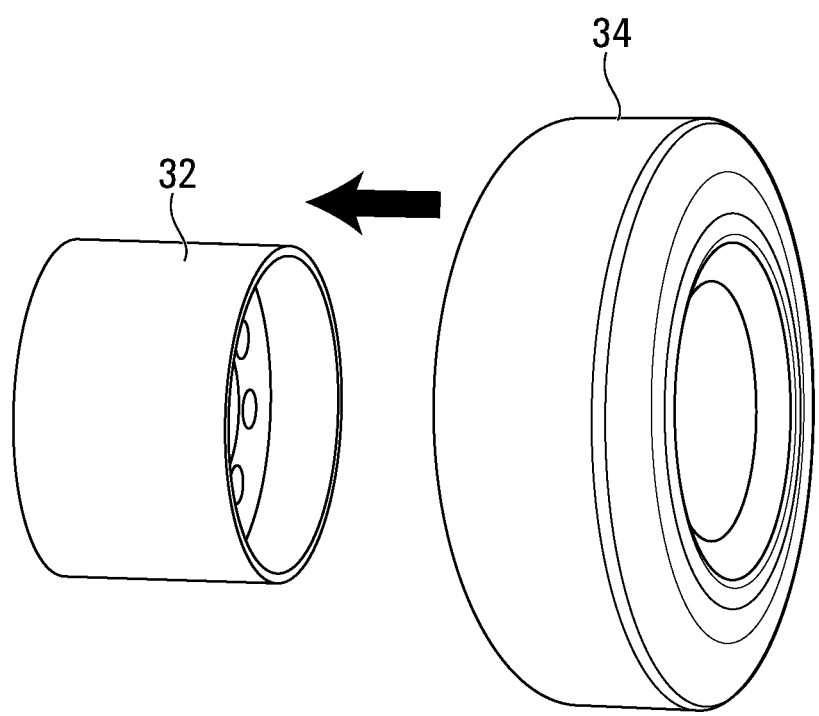
FIG. 5 shows the tire being secured to the wheel body via a press-fit.

The tire 34 is mounted about the wheel body 32. For example, the tire 34 may be moved laterally relative to the wheel body 32 to press-fit the tire 34 onto the wheel body 32 (e.g., using a press such as a hydraulic press). In embodiments in which the inner surface 39 of the tire 34 that is configured to contact the wheel body 32 comprises an elastomeric material (e.g., rubber) such that an interface between the wheel body 32 and the tire 34 is a metallic material to elastomeric material interface, the tire 34 can be secured to the wheel body 32 by one or more locking elements (e.g., side ring and/or lock rings) of the wheel body 32, as shown in FIG. 4A, or as another example, as shown in FIG. 4B, the tire 34 may be secured to the wheel body 32 by a locking element of the tire 34 such as a locking nose 55 configured to fit into a corresponding groove in the wheel body 32 (shown more clearly in FIGS. 7A and 7B). In embodiments in which the inner surface 39 of the tire 34 comprises a metallic material such that the interface between the wheel body 32 and the tire 34 is a metallic-material-to-metallic-material interface, as shown in FIG. 5, the tire 34 may be press-fit onto the wheel body 32 and secured to the wheel body 32 via metal-to-metal interference between the tire 34 and the wheel body 32 achieved by the press-fit. In such examples, the tire 34 may be referred to as a "press-on" tire.

In this embodiment, the tire 34 is a non-pneumatic tire. The non-pneumatic tire 34 is a compliant wheel structure that is not supported by gas (e.g., air) pressure and that is resiliently deformable (i.e., changeable in configuration) as the wheel 20$_i$ contacts the underlying surface 15. In this example, the tire 34 may also be referred to as a "solid" or "resilient" tire.

More particularly, in this embodiment, the tire 34 comprises a plurality of layers 50$_1$-50$_L$ that are structurally different and arranged in the radial direction of the tire 34. For example, in various embodiments, respective ones of the layers 50$_1$-50$_L$ of the tire 34 may include different structures, such as structures comprising different materials and/or having different shapes.

Figure 7A:
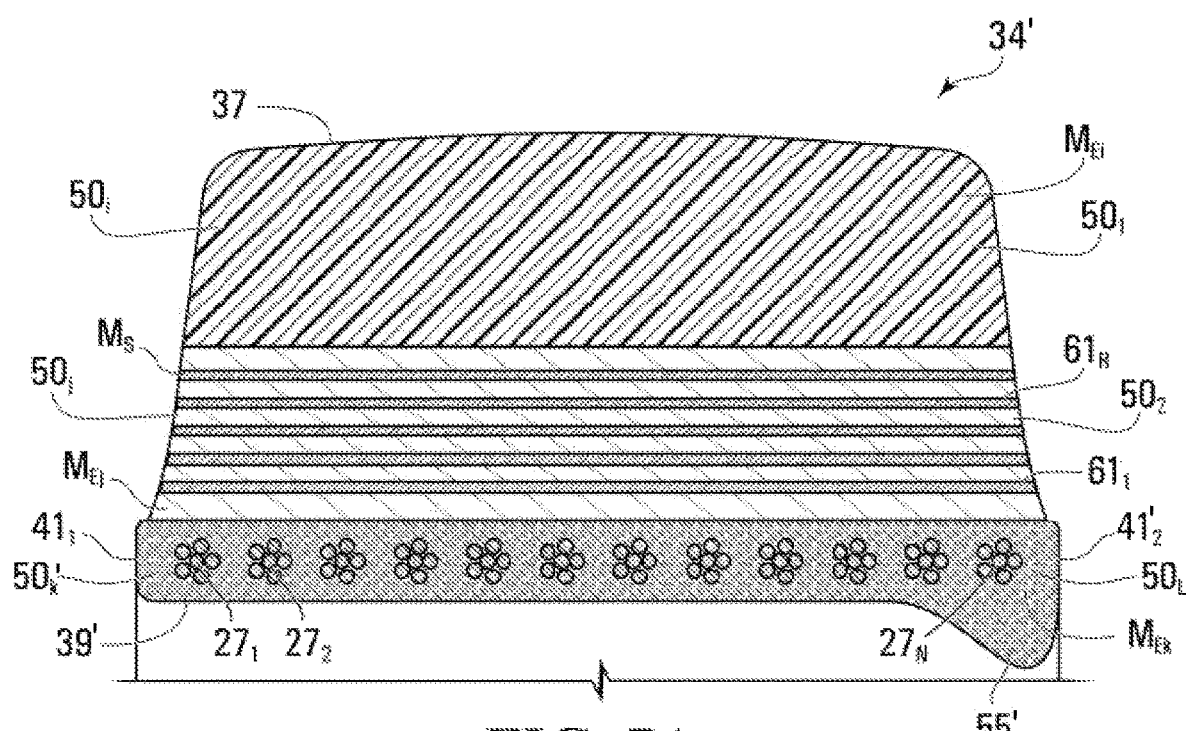
FIG. 7A is a cross-sectional view of the tire of FIG. 6A.

An outer one of the layers 50$_1$-50$_L$, namely the layer 50$_1$, comprises the outer surface 37 and the tread 40 of the tire 34. In that sense, the outer layer 50$_1$ can be referred to as a "tread layer". An inner one of the layers 50$_1$-50$_L$, namely the layer 50$_L$, comprises the inner surface 39 of the tire 34. In some cases, depending on how the tire 34 is constructed, the inner surface 39 of the tire 34 may be part of a "heel" or "inner heel" of the tire 34, and thus the inner layer 50$_L$ can be referred to as a "heel layer" or "inner heel layer". As shown in FIG. 7A, the layer 50$_L$ may comprise the locking nose 55 which protrudes radially inwardly to engage the wheel body 32. In some embodiments, there may be one or more intermediate ones of the layers 50$_1$-50$_L$ between the tread layer 50$_1$ and the inner layer 50$_L$.

Each of one or more of the layers 50$_1$-50$_L$ of the tire 34 comprises elastomeric material. The elastomeric material of a layer 50$_x$ can include any polymeric material with suitable elasticity. For example, the elastomeric material of the layer 50$_x$ may include rubber. Any suitable rubber compound may be used. As another example, in some cases, the elastomeric material of the layer 50$_x$ may include another elastomer in addition to or instead of rubber (e.g., a thermoplastic elastomer (TPE), such as thermoplastic polyurethane (TPU)).

In some embodiments, where it includes elastomeric material, given its proximity to the wheel body 32 when the tire 34 is mounted about the wheel body 32, the inner layer 50$_L$ may include reinforcements 27$_1$-27$_N$ (e.g., cables) embedded in its elastomeric material which may provide tension about the wheel body 32.

In this embodiment, the layers 50$_1$-50$_L$ of the tire 34 are configured to enhance use and performance of the tire 34, including, for example, such that the tire 34 may exhibit less rolling resistance, be more energy-efficient and/or allow the forklift 10 to travel faster. For instance, the layers 50$_1$-50$_L$ of the tire 34 may be configured such that elastic deformation of the tire 34 as it rolls may be better managed (e.g., reduced), which may improve its thermal behavior and/or may be combined with ways to better distribute or dissipate heat (e.g., by increasing thermal conductivity). For example, in some embodiments, this may be achieved by decoupling (i.e., substantially reduce or eliminate an interrelationship of) elastic deformations of respective ones of the layers 50$_1$-50$_L$.

The elastic deformation of the tire 34 as it rolls depends on various factors. For example, this may include a stiffness of the tire 34 in a given direction of the tire 34, which refers to a rigidity of the tire 34 in that given direction, i.e., a resistance of the tire 34 to elastic deformation in that given direction when loaded, such as: a radial stiffness of the tire 34, which refers to a rigidity of the tire 34 in its radial direction, i.e., a resistance of the tire 34 to elastic deformation in its radial direction when loaded; a circumferential stiffness of the tire 34, which refers to a rigidity of the tire 34 in its circumferential direction, i.e., a resistance of the tire 34 to elastic deformation in its circumferential direction when loaded; and/or a lateral stiffness of the tire 34, which refers to a rigidity of the tire 34 in its lateral direction, i.e., a resistance of the tire 34 to elastic deformation in its lateral direction when loaded. For each layer $50_x$ of the tire 34, a radial stiffness of the layer $50_x$ of the tire 34, which refers to a rigidity of the layer $50_x$ in the tire's radial direction (i.e., a resistance of the layer $50_x$ to elastic deformation in the tire's radial direction when loaded); a circumferential stiffness of the layer $50_x$ of the tire 34, which refers to a rigidity of the layer $50_x$ in the tire's circumferential direction (i.e., a resistance of the layer $50_x$ to elastic deformation in the tire's circumferential direction when loaded) and/or a lateral stiffness of the layer $50_x$ of the tire 34, which refers to a rigidity of the layer $50_x$ in the tire's lateral direction (i.e., a resistance of the layer $50_x$ to elastic deformation in the tire's lateral direction when loaded), may thus influence the elastic deformation of the tire 34. As another example, a resistance to shear of the layers $50_1$-$50_L$ of the tire 34 can affect the elastic deformation of the tire 34.

Examples of embodiments in which the layers $50_1$-$50_L$ of the tire 34 are configured to enhance use and performance of the tire 34 will now be discussed.

1. Decoupling (e.g., Stiffening) Intermediate Layer

Figure 6A:
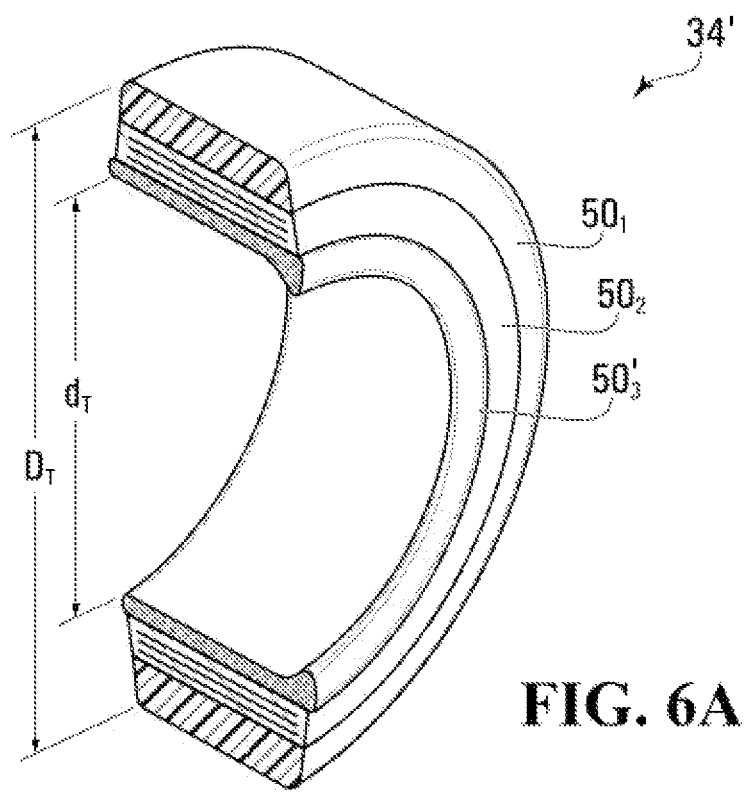
FIG. 6A is a perspective view of a cross-sectional cut of the tire in which an intermediate layer of the tire is stiffer in a radial direction of the tire than an outwardly-adjacent layer of the tire.

In some embodiments, as shown in FIGS. 6A and 7A, an intermediate layer $50_j$ of the tire 34' may be configured to decouple (i.e., substantially reduce or eliminate an interrelationship of) elastic deformations of respective ones of the layers $50_1$-$50_L$ of the tire 34', such as, for instance, adjacent layers $50_i$, $50_k$' of the tire 34' between which it is disposed and/or itself and a given one of the adjacent layers $50_i$-$50_k$' of the tire 34'. In that sense, the intermediate layer $50_j$ may be referred to as a "decoupling layer". Decoupling of the elastic deformations of respective ones of the layers $50_1$-$50_L$ of the tire 34' by the intermediate layer $50_j$ of the tire 34' may be effected in various ways.

For example, in some embodiments, the intermediate layer $50_j$ of the tire 34' may be stiffer in a given direction of the tire 34' than at least one of the adjacent layers $50_i$, $50_k$' of the tire 34'. A stiffness of the intermediate layer $50_j$ of the tire 34' in the given direction of the tire 34' is thus greater than a stiffness of at least one of the adjacent layers $50_i$, $50_k$' of the tire 34' in the given direction of the tire 34'. This may limit elastic deformation of the intermediate layer $50_j$ of the tire 34' in the given direction of the tire 34' as the tire 34' rolls. In that sense, the intermediate layer $50_j$ may also be referred to as a "stiffening layer".

For instance, in some embodiments: the intermediate layer $50_j$ of the tire 34' may be stiffer in the radial direction of the tire 34' than at least one of the adjacent layers $50_i$, $50_k$' of the tire 34', i.e., the radial stiffness of the intermediate layer $50_j$ of the tire 34' is greater than the radial stiffness of at least one of the adjacent layers $50_i$, $50_k$' of the tire 34'; the intermediate layer $50_j$ of the tire 34' may be stiffer in the circumferential direction of the tire 34' than at least one of the adjacent layers $50_i$, $50_k$' of the tire 34', i.e., the circumferential stiffness of the intermediate layer $50_j$ of the tire 34' is greater than the circumferential stiffness of at least one of the adjacent layers $50_i$, $50_k$' of the tire 34'; and/or the intermediate layer $50_j$ of the tire 34' may be stiffer in the lateral direction of the tire 34' than at least one of the adjacent layers $50_i$, $50_k$' of the tire 34', i.e., the lateral stiffness of the intermediate layer $50_j$ of the tire 34' is greater than the lateral stiffness of at least one of the adjacent layers $50_i$, $50_k$' of the tire 34'.

In this embodiment, the intermediate layer $50_j$ of the tire 34' is stiffer than an outwardly-adjacent layer $50_i$ of the tire 34' (i.e., a given one of the layers $50_1$-$50_L$ of the tire 34' that is adjacent to and disposed radially outwardly relative to the intermediate layer $50_j$ of the tire 34'). For example, in some embodiments, a ratio of the stiffness of the intermediate layer $50_j$ of the tire 34' in a given direction of the tire 34' over the stiffness of the outwardly-adjacent layer $50_i$ of the tire 34' in the given direction of the tire 34' may be at least 1.1, in some cases at least 1.2, in some cases at least 1.3, in some cases at least 1.4, in some cases at least 1.5 and in some cases even more.

More particularly, in this embodiment, the stiffness of the intermediate layer $50_j$ of the tire 34' in the given direction of the tire 34' is greater than the stiffness of the outwardly-adjacent layer $50_i$ of the tire 34' in the given direction of the tire 34' but less than the stiffness of an inwardly-adjacent layer $50_k$' of the tire 34' (i.e., a given one of the layers $50_1$-$50_L$ of the tire 34' that is adjacent to and disposed radially inwardly relative to the intermediate layer $50_j$ of the tire 34') in the given direction of the tire 34'. For example, in some embodiments, a ratio of the stiffness of the intermediate layer $50_j$ of the tire 34' in the given direction of the tire 34' over the stiffness of the inwardly-adjacent layer $50_k$' of the tire 34' in the given direction of the tire 34' may be no more than 0.9, in some cases no more than 0.8, in some cases no more than 0.7, and in some cases even less.

In this example of implementation, the outwardly-adjacent layer $50_i$ of the tire 34' is the outer one of the layers $50_1$-$50_L$ (i.e., tread layer) of the tire 34' comprising the outer surface 37 of the tire and the inwardly-adjacent layer $50_k$' of the tire 34' is the inner one of the layers $50_1$-$50_L$ of the tire 34' comprising the inner surface 39' of the tire 34' such that the stiffness of the tire 34' in the given direction of the tire 34' increases inwardly from the outer one of the layers $50_1$-$50_L$ of the tire 34' to the inner one of the layers $50_1$-$50_L$ of the tire 34'.

In this embodiment, the intermediate layer $50_j$ of the tire 34' is stiffer in plural directions of the tire 34' than at least one of the adjacent layers $50_i$, $50_k$' of the tire 34'. Notably, in this embodiment, the radial stiffness of the intermediate layer $50_j$ of the tire 34' may be greater than the radial stiffness of the outwardly-adjacent layer $50_i$ of the tire 34'; the circumferential stiffness of the intermediate layer $50_j$ of the tire 34' may be greater than the circumferential stiffness of the outwardly-adjacent layer $50_i$ of the tire 34'; and/or the lateral stiffness of the intermediate layer $50_j$ of the tire 34' may be greater than the lateral stiffness of the outwardly-adjacent layer $50_i$ of the tire 34'. Differences between the radial stiffness, the circumferential stiffness or the lateral stiffness of the intermediate layer $50_j$ of the tire 34' and the radial stiffness, the circumferential stiffness or the lateral stiffness of the outwardly-adjacent layer $50_i$ of the tire 34' may be as discussed above. Similarly, this would also apply to the radial stiffness, the circumferential stiffness or the lateral stiffness of the intermediate layer $50_j$ of the tire 34' compared to the radial stiffness, the circumferential stiffness or the lateral stiffness of the inwardly-adjacent layer $50_k$' of the tire 34'.

In some examples of implementation, the intermediate layer $50_j$ of the tire 34' being stiffer in the circumferential direction of the tire 34' than the outwardly-adjacent layer $50_i$ of the tire 34' and, if applicable, the inwardly-adjacent layer $50_k$' of the tire 34' may contribute significantly to its decoupling effect. For instance, in some cases, the intermediate layer $50_j$ of the tire 34' being stiffer in the circumferential direction of the tire 34' than the outwardly-adjacent layer $50_i$ of the tire 34' and, if applicable, the inwardly-adjacent layer $50_k$' of the tire 34' may contribute more to its decoupling effect than having the intermediate layer $50_j$ of the tire 34' stiffer in the lateral direction of the tire 34' than the outwardly-adjacent layer $50_i$ of the tire 34' and, if applicable, the inwardly-adjacent layer $50_k$' of the tire 34'.

The intermediate layer $50_j$ of the tire 34' that is stiffer than the outwardly-adjacent layer $50_i$ of the tire 34' may be implemented in various ways.

For example, in this embodiment, the intermediate layer $50_j$ of the tire 34' comprises a material $M_S$ that is stiffer than a material $M_{Ei}$ of the outwardly-adjacent layer $50_i$ of the tire 34'. For instance, in some embodiments, a ratio of a modulus of elasticity (e.g., Young's modulus) of the material $M_S$ of the intermediate layer $50_j$ of the tire 34' over a modulus of elasticity of the material $M_{Ei}$ of the outwardly-adjacent layer $50_i$ of the tire 34' may be at least 2, in some cases at least 10, in some cases at least 50, in some cases at least 500, in some cases at least 1000, in some cases at least 2000, and in some cases even more.

In this embodiment, the material $M_S$ of the intermediate layer $50_j$ of the tire 34' is a metallic material, the material $M_{Ei}$ of the outwardly-adjacent layer $50_i$ of the tire 34' is an elastomeric material, and a material $M_{Ek}$ of the inwardly-adjacent layer $50_k$' of the tire 34' is an elastomeric material. In this example, the metallic material $M_S$ of the intermediate layer $50_j$ of the tire 34' is steel, and each of the elastomeric materials $M_{Ei}$, $M_{Ek}$ of the adjacent layers $50_i$, $50_k$' of the tire 34' is rubber. In some cases, the rubber $M_{Ei}$ of the outwardly-adjacent layer $50_i$ of the tire 34' may be identical to the rubber $M_{Ek}$ of the inwardly-adjacent layer $50_k$' of the tire 34'. In other cases, the rubber $M_{Ei}$ of the outwardly-adjacent layer $50_i$ of the tire 34' may be different from the rubber $M_{Ek}$ of the inwardly-adjacent layer $50_k$' of the tire 34'.

In addition to the metallic material $M_S$, in this embodiment, the intermediate layer $50_j$ of the tire 34' also comprises an elastomeric material $M_{Ej}$. More particularly, in this embodiment, the intermediate layer $50_j$ of the tire 34' comprises a plurality of reinforcing members $61_1$-$61_R$ that include respective parts of its metallic material $M_S$ and are spaced from one another by respective parts of its elastomeric material $M_{Ej}$. In this example, the elastomeric material $M_{Ej}$ of the intermediate layer $50_j$ of the tire 34' is rubber. In some cases, the rubber $M_{Ej}$ of the intermediate layer $50_j$ of the tire 34' may be identical to the rubber $M_{Ei}$ of the outwardly-adjacent layer $50_i$ of the tire 34' and/or the rubber $M_{Ek}$ of the inwardly-adjacent layer $50_k$' of the tire 34'. In other cases, the rubber $M_{EJ}$ of the intermediate layer $50_j$ of the tire 34' may be different from the rubber $M_{Ei}$ of the outwardly-adjacent layer $50_i$ of the tire 34' and/or the rubber $M_{Ek}$ of the inwardly-adjacent layer $50_k$' of the tire 34'.

In this embodiment, the reinforcing members $61_1$-$61_R$ of the intermediate layer $50_j$ of the tire 34' are elongated. More particularly, in this embodiment, the reinforcing members $61_1$-$61_R$ are reinforcing cables. Each of the reinforcing cables $61_1$-$61_R$ may be a cord or wire rope including a plurality of strands or wires or another type of cable.

The reinforcing cables $61_1$-$61_R$ are configured to restrict elastic deformation of the elastomeric material $M_{Ej}$ of the intermediate layer $50_j$ primarily along a given direction of the tire 34'. To that end, the reinforcing cables $61_1$-$61_R$ are disposed such as to extend along a direction in which restriction of elastic deformation of the elastomeric material $M_{Ej}$ of the intermediate layer $50_j$ is primarily desired.

More particularly, in this embodiment, the reinforcing cables $61_1$-$61_R$ extend transversally to the circumferential direction of the tire 34'. In this example, the reinforcing cables $61_1$-$61_R$ extend transversally to the circumferential direction of the tire 34' and the radial direction of the tire 34'. Specifically, in this example, the reinforcing cables $61_1$-$61_R$ extend substantially normal to the circumferential direction of the tire 34' and the radial direction of the tire 34'. In this case, the reinforcing cables $61_1$-$61_R$ extend substantially parallel to the lateral direction of the tire 34' such that elastic deformation of the elastomeric material $M_{Ej}$ of the intermediate layer $50_j$ is restricted in the lateral direction of the tire 34'.

Figure 8:
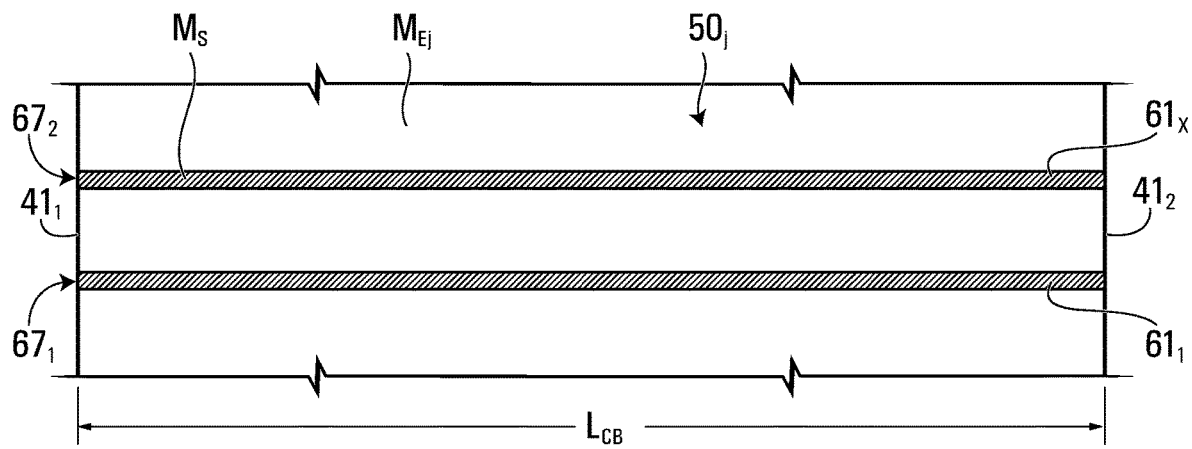
FIGS. 8 and 9 are cross-sectional views of an intermediate layer of the tire of FIG. 6 as seen along a lateral direction and a circumferential direction of the tire.

In this example, as shown in FIG. 8, the reinforcing cables $61_1$-$61_R$ extend for at least a significant part (e.g., a significant part, such as a majority, or an entirety) of the width $W_T$ of the tire 34', 34". For instance, in some embodiments, a ratio of a length $L_{CB}$ of each reinforcing cable $61_x$ over the width $W_T$ of the tire 34', 34" may be at least 0.5, in some cases at least 0.6, in some cases at least 0.7, in some cases at least 0.8, in some cases at least 0.9, and in some cases even more (e.g., 0.95 or more). In some cases, the length $L_{CB}$ of each reinforcing cable $61_x$ may correspond to the width $W_T$ of the tire 34', 34". For instance, the reinforcing cables $61_1$-$61_R$ may extend across the tire 34', 34" such that they constitute part of each of the lateral surfaces $41_1$, $41_2$ of the tire 34', 34".

Figure 9:
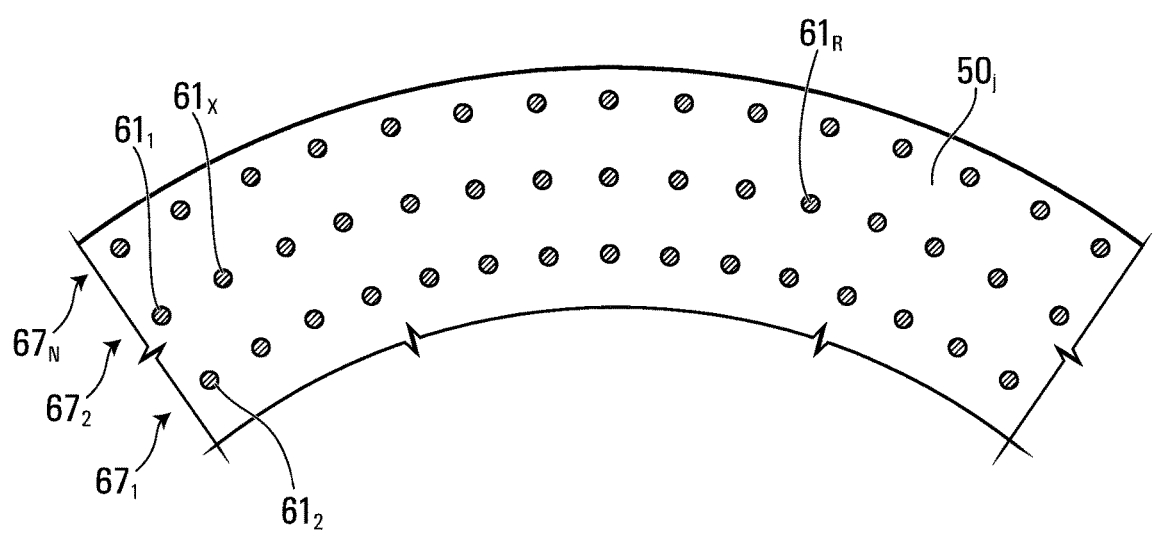

Also, in this embodiment, respective ones of the reinforcing cables $61_1$-$61_R$ are spaced apart from one another in the circumferential direction of the tire 34', 34". In this example, the reinforcing cables $61_1$-$61_R$ are distributed around the tire 34', 34". Furthermore, in this embodiment, respective ones of the reinforcing cables $61_1$-$61_R$ are spaced apart from one another in the radial direction of the tire 34', 34". In this example, as shown in FIG. 9, the reinforcing cables $61_1$-$61_R$ are disposed in rows $67_1$-$67_N$ that are spaced in the radial direction of the tire 34', 34". The reinforcing cables $61_1$-$61_R$ may be disposed in any number of rows, such as one row (i.e., a single row), two rows, three rows, five rows, ten rows, fifteen rows or more.

In this embodiment, the intermediate layer $50_j$ of the tire 34', 34" is configured to decouple the elastic deformations of the outwardly-adjacent layer $50_k$' $50_k$" of the tire 34', 34" and the intermediate layer $50_j$ of the tire 34', 34". More specifically, the reinforcing cables $61_1$-$61_R$ of the intermediate layer $50_j$ may substantially reduce the interrelationship between the elastic deformations of the intermediate and outwardly-adjacent layers $50_j$, $50_i$ of the tire 34', 34", notably due to a restrictive effect of the reinforcing cables $61_1$-$61_R$ of the intermediate layer $50_j$ on the elastic deformation of the elastomeric material $M_{Ej}$ of the intermediate layer $50_j$. In contrast, in a conventional tire where an intermediate layer would not comprise reinforcing cables like the reinforcing cables $61_1$-$61_R$ of the intermediate layer $50_j$, elastic deformation of the intermediate layer of the conventional tire and elastic deformation of an outwardly-adjacent layer of the conventional tire would be strongly interrelated due to their adjacency and relatively low stiffness (e.g., compared to an inner layer of the conventional tire which is a stiffest of the conventional tire's layers) such that the elastic deformation of the outwardly-adjacent layer of the conventional tire would substantially guide the elastic deformation of the intermediate layer of the conventional tire. However, in this embodiment, because the reinforcing cables $61_1$-$61_R$ of the intermediate layer $50_j$ restrict the elastic deformation of the elastomeric material $M_{Ej}$ of the intermediate layer $50_j$ in a given direction of the tire 34', 34" (e.g., the lateral direction of the tire 34', 34"), the elastic deformation of the intermediate layer $50_j$ is decoupled from the elastic deformation of the outwardly-adjacent layer $50_j$.

In this example of implementation, the intermediate layer $50_j$ of the tire 34', 34" is a middle layer $50_2$ and the adjacent layers $50_i$, $50_k$', $50_k$" of the tire 34', 34" are the tread layer $50_1$ and the heel layer $50_3$', $50_3$". There is no inner heel layer in this case, which allows the tire 34', 34" to contain less rubber (e.g., akin to a "low-profile" tire).

Furthermore, in this example of implementation, a spacing between adjacent ones of the rows $67_1$-$67_N$ (such as the rows $67_1$, $67_2$) measured in the radial direction of the tire 34', 34" is similar to a spacing between adjacent ones of the reinforcing cables $61_1$-$61_R$ in a given one of the rows $67_1$-$67_N$. In other words, in this example the reinforcing cables $61_1$-$61_R$ are spaced similarly in the radial direction of the tire 34', 34" and in the circumferential direction of the tire 34', 34". For instance, in some cases, a ratio of the spacing between adjacent ones of the rows $67_1$-$67_N$ measured in the radial direction of the tire 34', 34" over the spacing between adjacent ones of the reinforcing cables $61_1$-$61_R$ in a given one of the rows $67_1$-$67_N$ may be at least 0.8, in some cases at least 0.9, in some cases at least 0.95 and in some cases even more (e.g., 1).

The tire 34', 34" may be manufactured in various ways. In this example, the tire 34', 34" is manufactured by layering plies of the material of respective ones of the layers $50_1$-$50_L$ atop one another to form the tire 34', 34". For instance, multiple plies of the rubber of the heel layer $50_L$ are first layered onto (e.g., wound about) a cylindrical mold until a desired thickness of that layer is achieved. Then, multiple plies of the material of the intermediate layer $50_j$, including the rubber $M_{Ej}$ and the reinforcing cables $61_1$-$61_R$ embedded therein, are layered atop the material of the heel layer $50_L$. This may be done for example by producing pre-calendered layers of the rubber $M_E$, containing the reinforcing cables $61_1$-$61_R$. In other examples, the rubber $M_{Ej}$ of the intermediate layer $50_j$ may be layered atop the material of the heel layer $50_L$ and the reinforcing cables $61_1$-$61_R$ may then be placed at a desired location (i.e., at a desired thickness) of the intermediate layer $50_j$ and additional plies of the rubber $M_E$, of the intermediate layer $50_j$ can then be layered atop the reinforcing cables $61_1$-$61_R$ as desired. After layering the material of the intermediate layer $50_j$, multiple plies of the rubber of the tread layer $50_1$ are layered over the material $M_{Ej}$ of the intermediate layer $50_j$. This assembly may then be placed in a second mold (which can be coated with a release agent prior to use) such as to form a desired geometry of the tire 34', 34" (e.g., its tread). The second mold is then heated such that the material of the layers $50_1$-$50_L$ acquires the shape of the mold and the rubber of respective ones of the layers $50_1$-$50_L$ is vulcanized.

Figure 6B:
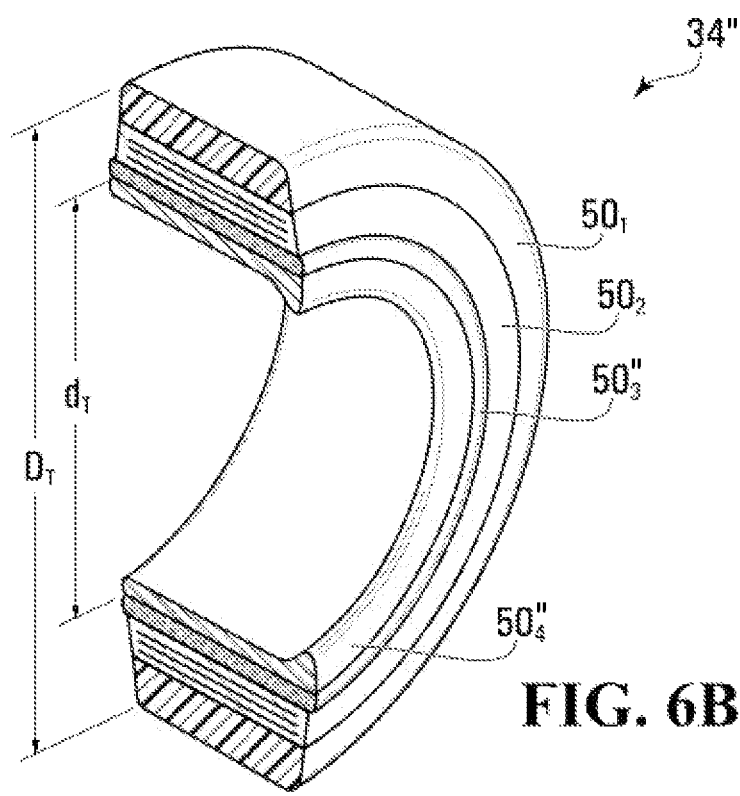
FIG. 6B is a variant of the tire comprising an inner heel layer.
Figure 7B:
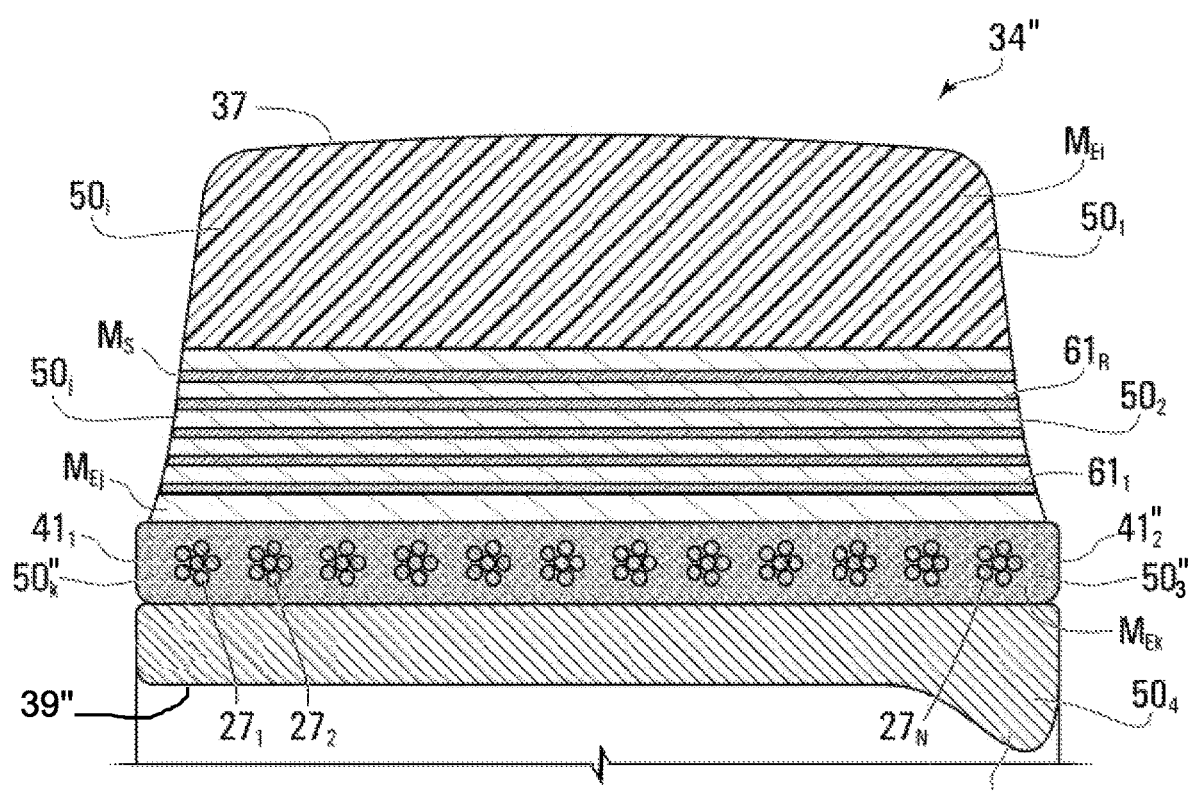
FIG. 7B is a cross-sectional view of the tire of FIG. 6B.

In a variant, as shown in FIGS. 6B and 7B, the intermediate layer $50_j$ of the tire 34" is the middle layer $50_2$ and disposed between the tread layer $50_1$ and the heel layer $50_3$", while the tire 34" comprises an inner heel layer $50_4$" that includes the inner surface 39" of the tire 34". Also, in this variant, the elastomeric material of the tread layer $50_1$ and the elastomeric material of the middle layer $50_2$ may have less energy dissipation under deformation (e.g., lower tan δ values) which may bring lower hysteresis, lower heat buildup, and lower rolling resistance.

The intermediate layer $50_j$ of the tire 34" that is stiffer may be implemented in any other suitable way in other embodiments.

Figure 10:
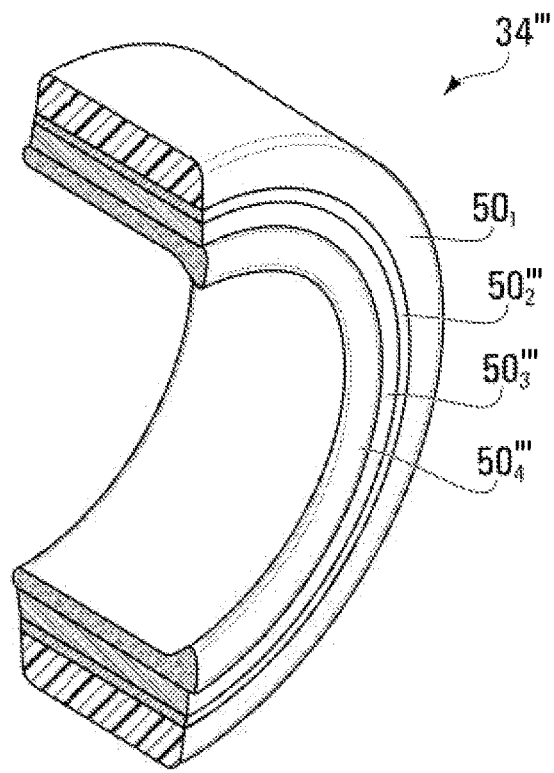
FIG. 10 is a perspective view of a cross-sectional cut of the tire in accordance with another embodiment in which the intermediate layer of the tire is an outer middle layer.
Figure 11:
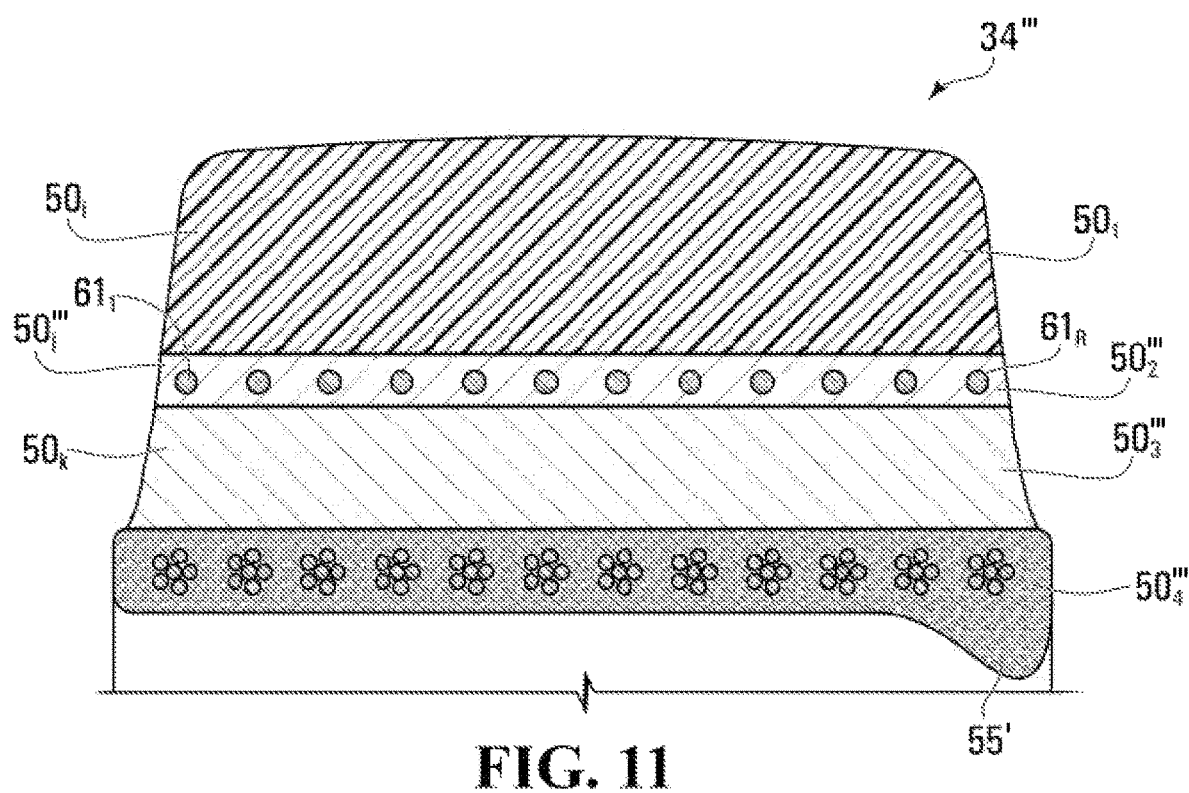
FIG. 11 is a cross-sectional view of the tire of FIG. 10.

For example, in some embodiments, as shown in FIGS. 10 and 11, the intermediate layer $50_j'''$ of the tire 34''' is an outer middle layer $50_2'''$ and the adjacent layers $50_i$, $50_k$ of the tire 34''' are the tread layer $50_1$ and an inner middle layer $50_3'''$ that is disposed next to the heel layer $50_4''$. In this embodiment, the intermediate layer $50_j'''$ of the tire 34''' comprises the reinforcing members $61_1$-$61_R$ that include respective parts of its metallic material $M_S$ and are spaced from one another by respective parts of its elastomeric material $M_{Ej}$.

In this case, the reinforcing members $61_1$-$61_R$ are reinforcing cables extending substantially parallel to the circumferential direction of the tire 34''' (i.e., "at 0°") and provided as a single row (i.e., the reinforcing cables $61_1$-$61_R$ are not spaced in the tire's radial direction). Thus, in this case, the reinforcing members $61_1$-$61_R$ may restrict elastic deformation of the elastomeric material $M_{Ej}$ of the intermediate layer $50_j'''$ primarily in the circumferential direction of the tire 34'''.

In this embodiment, the intermediate layer $50_j'''$ of the tire 34''' is stiffer than the outwardly-adjacent layer $50_i$ of the tire 34''' and stiffer than the inwardly-adjacent layer $50_k$ of the tire 34'''. That is, the outer middle layer $50_2'''$ of the tire 34''' is stiffer than the tread layer $50_1$ of the tire 34''' and stiffer than the inner middle layer $50_3'''$ of the tire 34'''. Notably, in this embodiment, the radial stiffness of the intermediate layer $50_j'''$ of the tire 34''' may be greater than the radial stiffness of the outwardly-adjacent layer $50_i$ of the tire 34''' and greater than the radial stiffness of the inwardly-adjacent layer $50_k$ of the tire 34'''; the circumferential stiffness of the intermediate layer $50_j'''$ of the tire 34''' may be greater than the circumferential stiffness of the outwardly-adjacent layer $50_i$ of the tire 34''' and greater than the circumferential stiffness of the inwardly-adjacent layer $50_k$ of the tire 34'''; and/or the lateral stiffness of the intermediate layer $50_j'''$ of the tire 34''' may be greater than the lateral stiffness of the outwardly-adjacent layer $50_i$ of the tire 34''' and greater than the lateral stiffness of the inwardly-adjacent layer $50_k$ of the tire 34'''. Thus, in this example, the intermediate layer $50_j'''$ of the tire 34''' may decouple the elastic deformations of the outwardly-adjacent layer $50_i$ and the inwardly-adjacent layer $50_k$ (which, in this embodiment, are those layers $50_1$-$50_L$ of the tire 34''' that are least stiff). As such, in this embodiment, the intermediate layer $50_j'''$ of the tire 34''' may be referred to as a "separation layer" since it separates given ones of the layers $50_1$-$50_L$ of the tire 34''' that are less stiff than the intermediate layer $50_j'''$ of the tire 34'''.

Figure 12A:
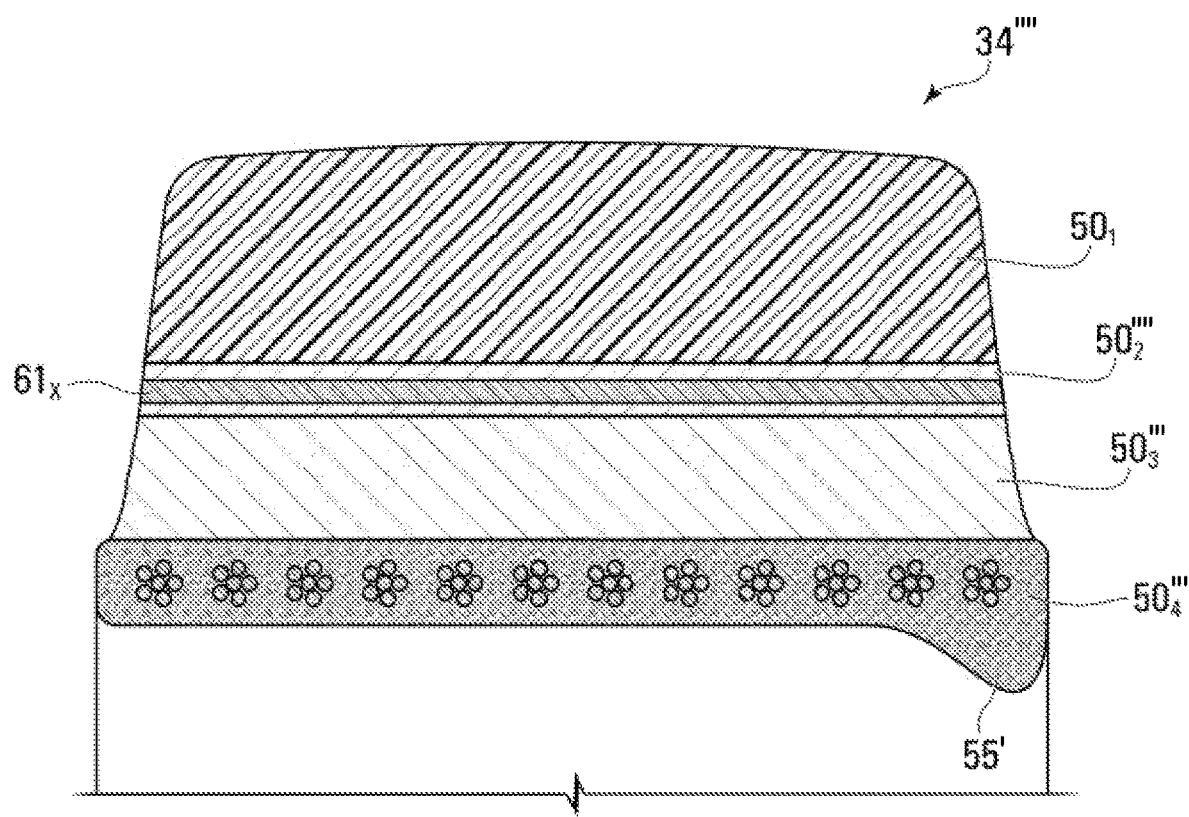
FIG. 12A is a cross-sectional view of a variant of the tire of FIG. 10 in which reinforcing members of the tire extend substantially parallel to a lateral direction of the tire.
Figure 12B:
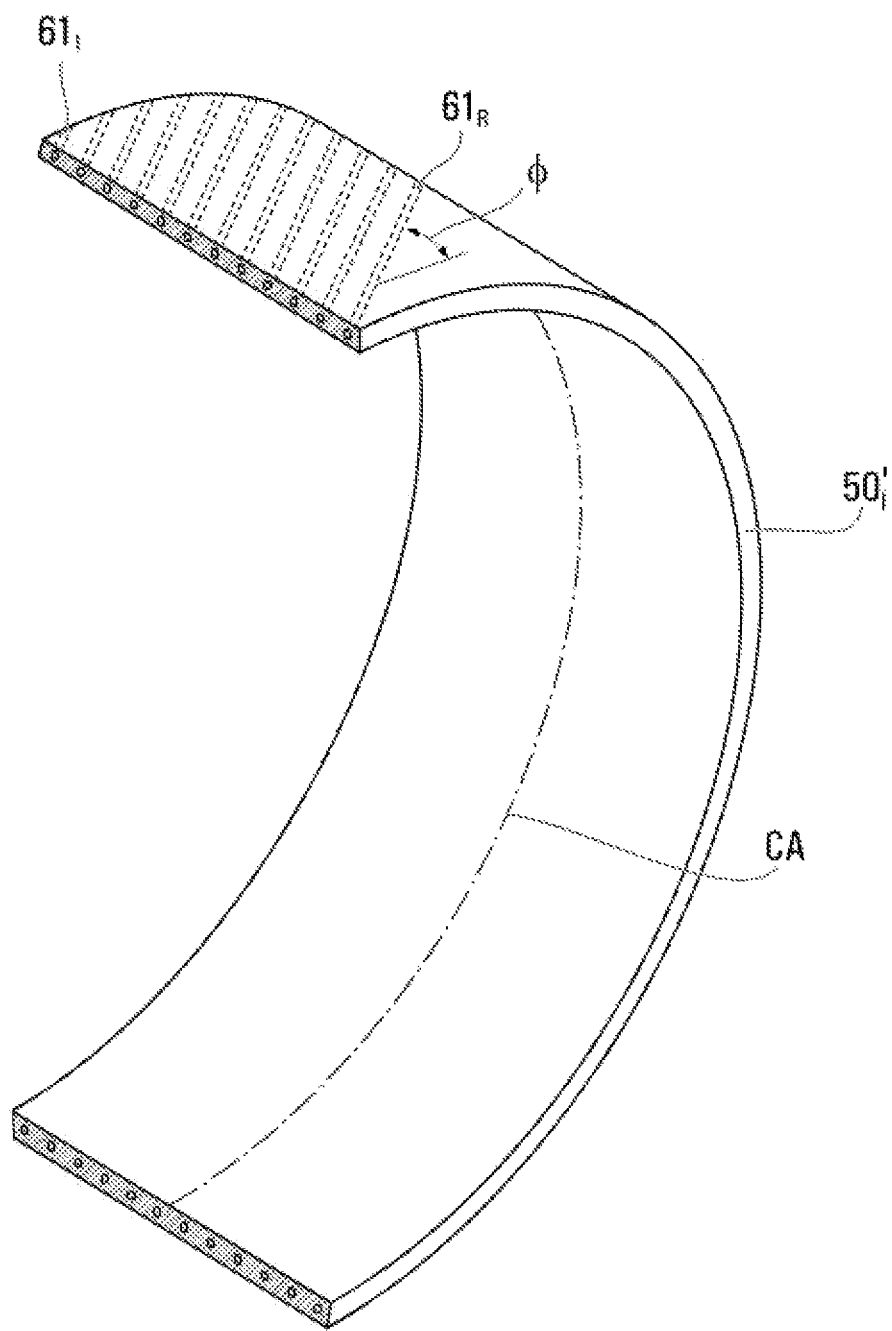
FIG. 12B is a cross-sectional view of a variant of the tire of FIG. 10 in which the reinforcing members are biased.

In a variant of the tire of FIGS. 10 and 11, as shown in FIG. 12A, the reinforcing cables $61_1$-$61_R$ may instead extend substantially parallel to the lateral direction of the tire 34" (i.e., "at 90°"). In other variants, as shown in FIG. 12B, the reinforcing cables $61_1$-$61_R$ may be biased such that they extend along a direction that is not parallel to the circumferential direction or the lateral direction of the tire 34'''. For instance, the reinforcing cables $61_1$-$61_R$ may extend at an angle φ relative to a circumferential axis CA of the tire 34''' (which extends along the circumferential direction of the tire 34"). In some cases, the angle φ defined by the reinforcing cables $61_1$-$61_R$ may be at least 15°, in some cases at least 30°, in some cases at least 45°, in some cases at least 60°, in some cases at least 75°, and in some cases even more (e.g., 80°). In such cases, the reinforcing cables $61_1$-$61_R$ may restrict elastic deformation of the elastomeric material $M_{Ej}$ of the intermediate layer $50_j'''$ primarily in a direction other than the circumferential direction or the lateral direction of the tire 34'''.

Figure 13:
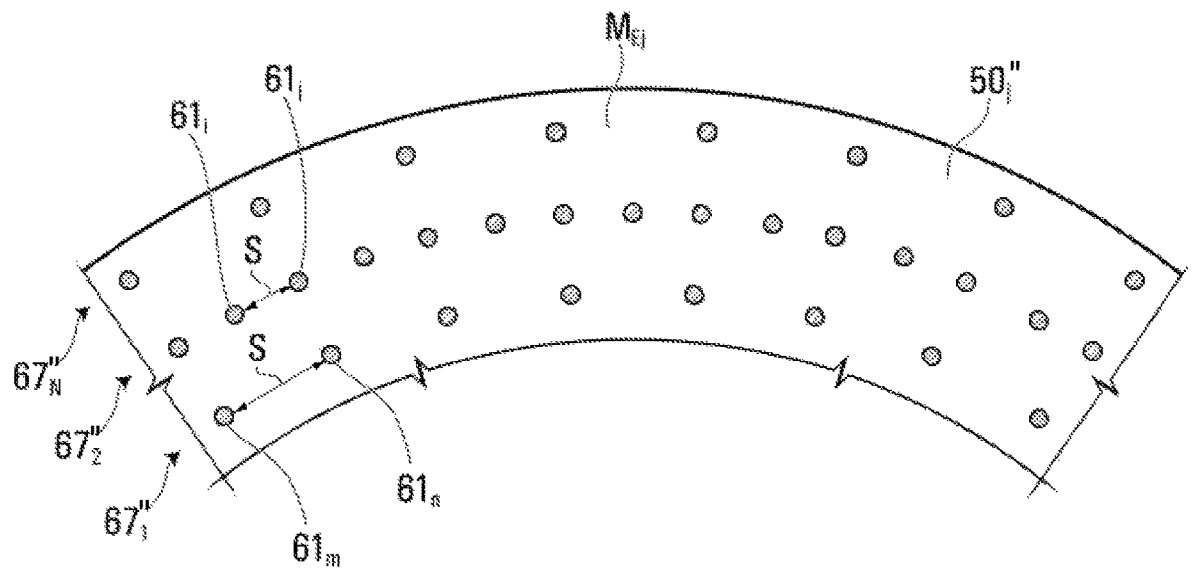
FIG. 13 is a cross-sectional view of the intermediate layer of the tire in accordance with an embodiment in which a spacing of respective ones of the reinforcing members that are spaced apart from one another in a circumferential direction of the tire varies.
Figure 14:
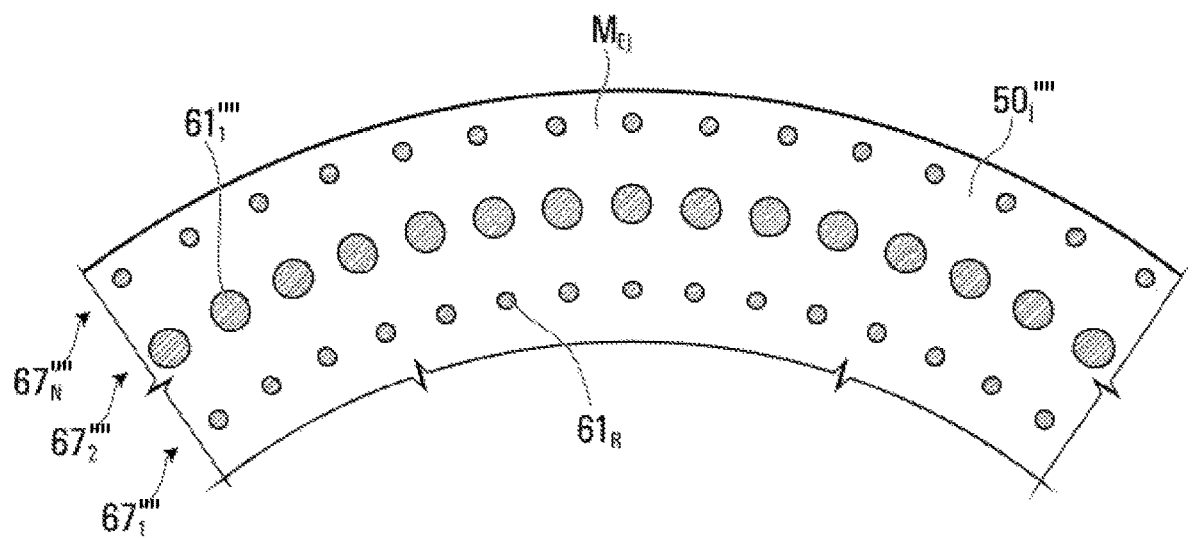
FIG. 14 is a cross-sectional view of the intermediate layer of the tire in accordance with an embodiment in which a diameter of respective ones of the reinforcing members that are spaced apart from one another in the circumferential direction of the tire varies.

As another example, in some embodiments, as shown in FIGS. 13 and 14, where the reinforcing cables $61_1''$-$61_R$ are disposed in the rows $67_1''$, $67_1''$-$67_N''$, $67_N''''$ that are spaced in the radial direction of the tire 34, respective ones of the reinforcing cables $61_1''$-$61_R$ of a given one of the rows $67_1''$, $67_1''$-$67_N''$, $67_N''''$ may be configured differently from respective ones of the reinforcing cables $61_1''$-$61_R$ of another one of the rows $67_1''$, $67_1''''$-$67_N''$, $67_N''''$ (e.g., an adjacent row).

For instance, in some embodiments, as shown in FIG. 13, a spacing S of respective ones of the reinforcing cables $61_1''$-$61_R$ that are spaced apart from one another in the circumferential direction of the tire 34 may vary. For example, in this embodiment, the spacing S of respective ones of the reinforcing cables 61₁"-61_R of the row 67₁" is different from the spacing S of respective ones of the reinforcing cables 61₁"-61_R of the row 67₂". In this case, the spacing S of respective ones of the reinforcing cables 61₁"-61_R of the row 67₁" is greater than from the spacing S of respective ones of the reinforcing cables 61₁""-61_R of the row 67₂".

In some embodiments, as shown in FIG. 14, a diameter of respective ones of the reinforcing cables 61₁""-61_R that are spaced apart from one another in the circumferential direction of the tire 34 may vary. For example, in this embodiment, the diameter of respective ones of the reinforcing cables 61₁"-61_R of the row 67₁" is different from the diameter of respective ones of the reinforcing cables 61₁"-61_R of the row 67₂"". In this case, the diameter of respective ones of the reinforcing cables 61₁""-61_R of the row 67₁" is less than from the diameter of respective ones of the reinforcing cables 61₁""-61_R of the row 67₂"".

Figure 15:
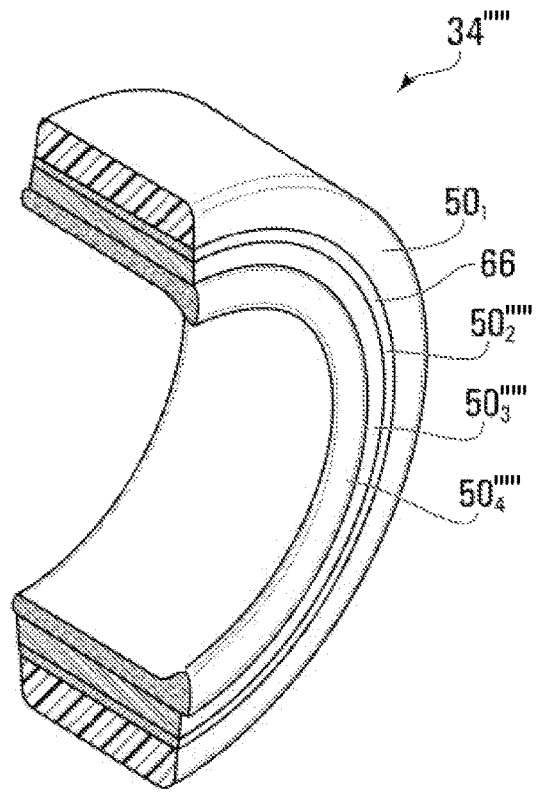
FIG. 15 is a perspective view of a cross-sectional cut of the tire in accordance with an embodiment in which the intermediate layer of the tire comprises a reinforcing band extending in the circumferential direction of the tire.
Figure 16:
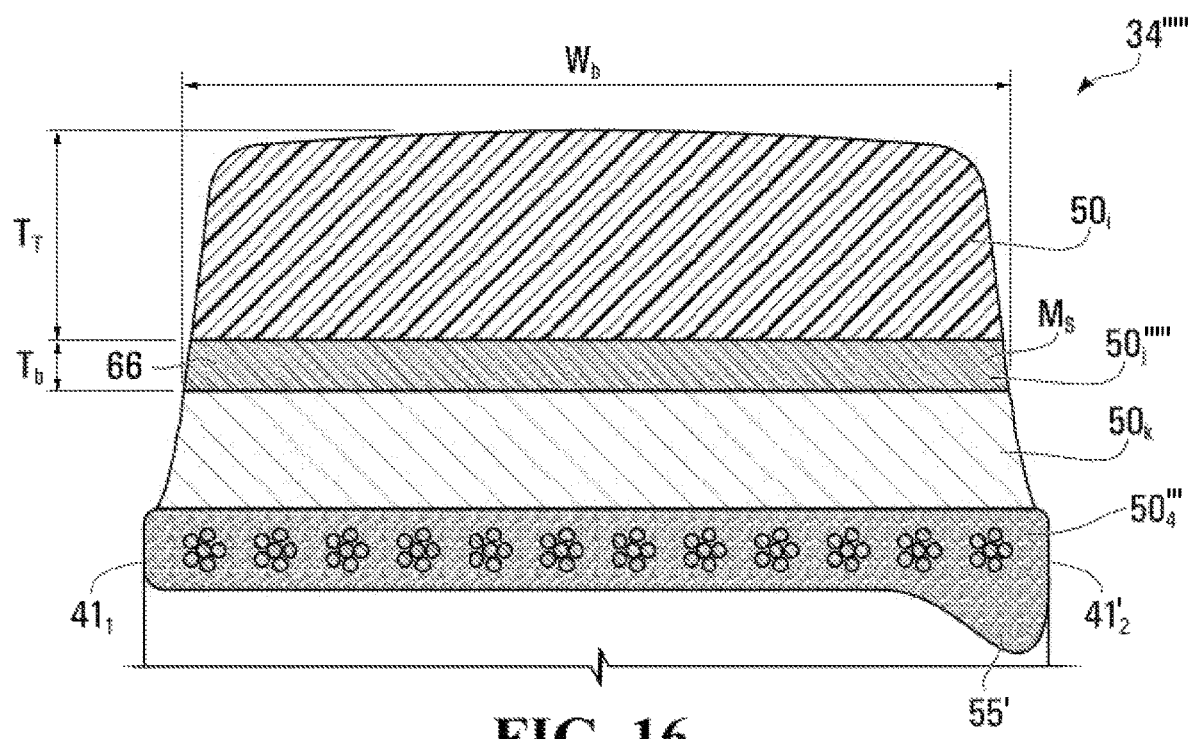
FIG. 16 is a cross-sectional view of the tire of FIG. 15.

As another example, in some embodiments, as shown in FIGS. 15 and 16, the intermediate layer 50_j"" of the tire 34' may comprise a reinforcing band 66 that includes its material $M_S$. The reinforcing band 66 extends in the circumferential direction of the tire 34"" and has a width $W_b$ in the lateral direction of the tire 34"" and a thickness $T_b$ in the radial direction of the tire 34"". As the material $M_S$ is metallic in this case, the reinforcing band 66 can be referred to as a metallic reinforcing band. Given its stiffening and/or decoupling functionality, the reinforcing band 66 may also be referred to as a "stiffening band" or a "decoupling band".

The width $W_b$ of the reinforcing band 66 may be significant in relation to the width $W_T$ of the tire 34"". For example, in some embodiments, a ratio of the width $W_b$ of the reinforcing band 66 over the width $W_T$ of the tire 34"" may be at least 0.5, in some cases at least 0.6, in some cases at least 0.7, in some cases at least 0.8, in some cases at least 0.9, and in some cases even more (e.g., 0.95 or more). In some cases, the width $W_b$ of the reinforcing band 66 may correspond to the width $W_T$ of the tire 34"". For instance, the reinforcing band 66 may extend across the tire 34"" such that it constitutes part of each of the lateral surfaces 41₁, 41₂' of the tire 34"".

The thickness $T_b$ of the reinforcing band 66 may be relatively small in relation to the outer diameter $D_T$ of the tire 34"". For example, in some embodiments, a ratio of the thickness $T_b$ of the reinforcing band 66 over the outer diameter $D_T$ of the tire 34"" may be no more than 0.02, in some cases no more than 0.015, in some cases no more than 0.01, in some cases no more than 0.008, in some cases no more than 0.005, in some cases no more than 0.003, in some cases no more than 0.001 and in some cases even less. As another example, the thickness $T_b$ of the reinforcing band may be relatively small in relation to a thickness $T_T$ of the tread layer 50₁ of the tire 34. For example, in some embodiments, a ratio of the thickness $T_b$ of the reinforcing band 66 over the thickness $T_T$ of the tread layer 50₁ may be no more than 0.25, in some cases no more than 0.15, in some cases no more than 0.1, in some cases no more than 0.05, in some cases no more than 0.02, in some cases no more than 0.015, in some cases no more than 0.01 and in some cases even less. For instance, in some cases, the thickness $T_b$ of the reinforcing band 66 may be no more than 10 mm, in some cases no more than 8 mm, in some cases no more than 6 mm, in some cases no more than 4 mm, in some cases no more than 2 mm, in some cases no more than 1 mm, in some cases no more than 0.5 mm and in some cases even less.

More particularly, in this embodiment, the intermediate layer 50_j"" of the tire 34"" is an outer middle layer 50₂"" and the adjacent layers 50_i, 50_k of the tire 34"" are the tread layer 50₁ and an inner middle layer 50₃"" that is disposed next to the heel layer 50₄"". The metallic reinforcing band 66 is thus disposed between the tread layer 50₁ and the inner middle layer 50₃"". As such, in this example, the intermediate layer 50_j"" of the tire 34"" may decouple the elastic deformations of the outwardly-adjacent layer 50_i and the inwardly-adjacent layer 50_k.

In this embodiment, the tire 34"" may be manufactured by layering plies of the material of respective ones of the layers 50₁-50_L as discussed above. The reinforcing band 66 may first be formed as an annular structure having an inner diameter suitable for being installed over the formed layers 50₃"", 50₄'. The tread layer 50₁ may then be formed over the reinforcing band 66 by layering plies of its rubber material over the reinforcing band 66.

Figure 17:
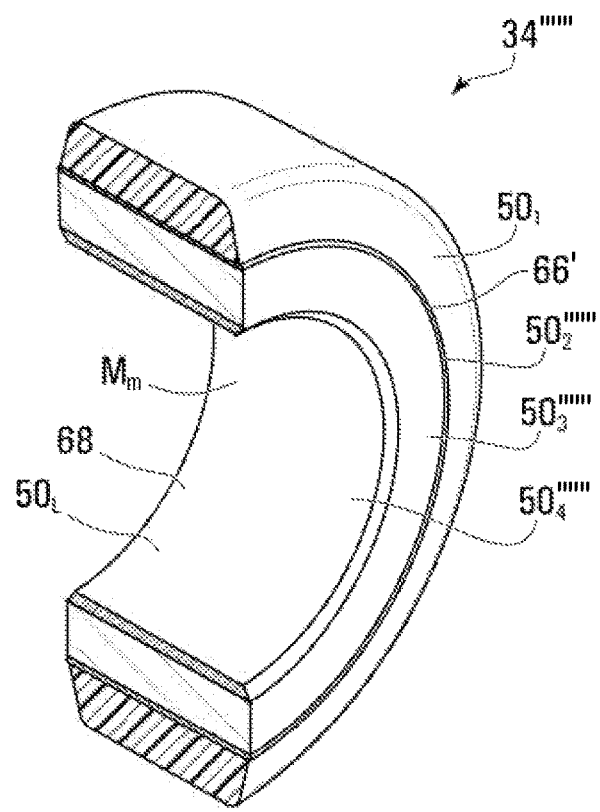
FIG. 17 is a perspective view of a cross-sectional cut of the tire in accordance with an embodiment in which the tire is a press-on tire.
Figure 18:
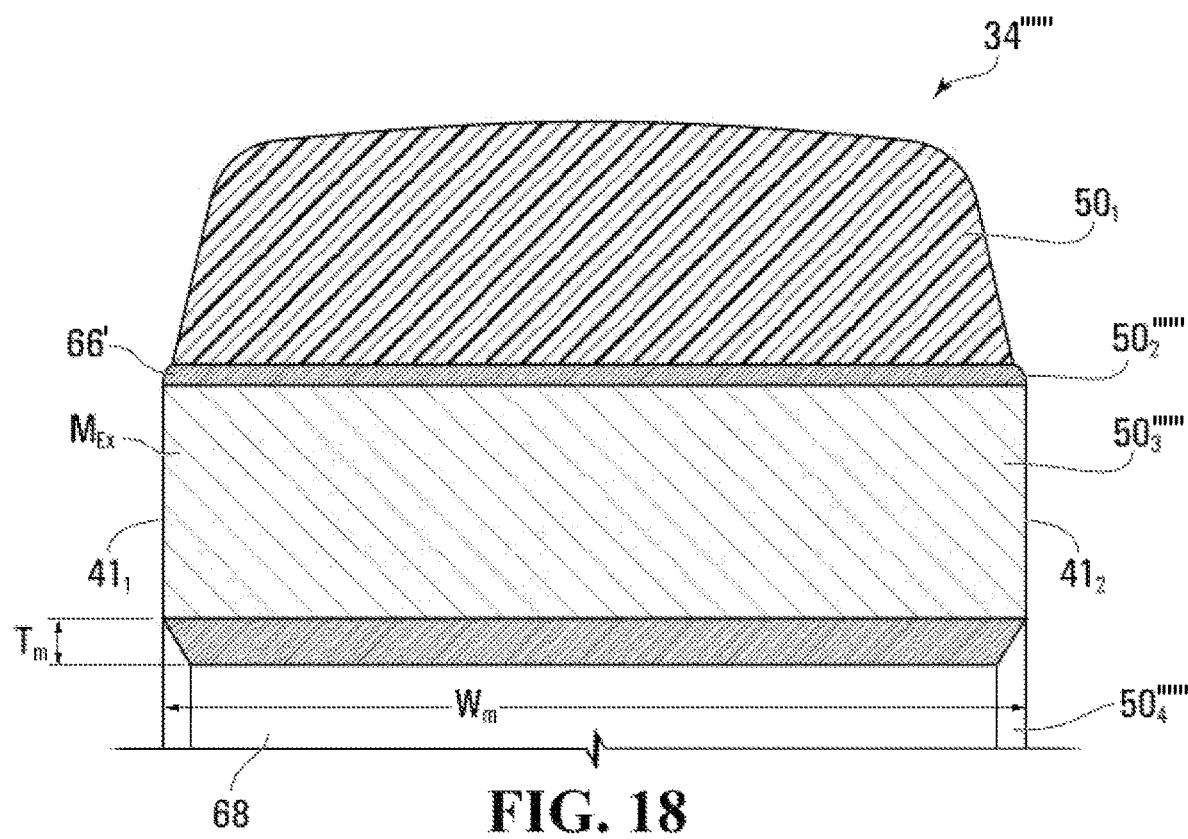
FIG. 18 is a cross-sectional view of the tire of FIG. 17.

As another example, in some embodiments, as shown in FIGS. 17 and 18, the tire 34"" may be a press-on tire in which the inner layer 50_L comprises a mounting band 68 configured to mount the tire 34"" onto the wheel body 32, such that the reinforcing band 66' and the mounting band 68 are spaced from one another in the radial direction of the tire 34"" (e.g., the tire 34"" may be viewed as a "double" press-on tire). The mounting band 68 extends in the circumferential direction of the tire 34"" and has a width $W_m$ in the lateral direction of the tire 34"" and a thickness $T_m$ in the radial direction of the tire 34"".

The mounting band 68 comprises a material $M_m$ that is stiffer than an elastomeric material $M_{EX}$ of an adjacent one of the layers 50₁-50_L of the tire 34'. For example, in this embodiment, a ratio of a modulus of elasticity (e.g., Young's modulus) of the material $M_m$ of the mounting band 68 over the modulus of elasticity of the material $M_{EX}$ of the adjacent one of the layers 50₁-50_L of the tire 34"" may be at least 200, in some cases at least 500, in some cases at least 1000, in some cases at least 2000 and in some cases even more. In this embodiment, the material $M_m$ of the mounting band 68 is a metallic material, in this case steel.

The width $W_b$ of the reinforcing band 66' may be significant in relation to the width $W_m$ of the mounting band 68. For example, in some embodiments, a ratio of the width $W_b$ of the reinforcing band 66' over the width $W_m$ of the mounting band 68 may be at least 0.5, in some cases at least 0.6, in some cases at least 0.7, in some cases at least 0.8, in some cases at least 0.9, and in some cases even more (e.g., 0.95 or more). In some cases, the width $W_b$ of the reinforcing band 66' may correspond to the width $W_m$ of the mounting band 68. For instance, in this embodiment, each of the reinforcing band 66' and the mounting band 68 extends across the tire 34"" such that it constitutes part of each of the lateral surfaces 41₁, 41₂ of the tire 34"".

The thickness $T_b$ of the reinforcing band 66' may be related to the thickness $T_m$ of the mounting band 68. For example, in some embodiments, a ratio of the thickness $T_b$ of the reinforcing band 66' over the thickness $T_m$ of the mounting band 68 may be no more than 0.5, in some cases no more than 0.3, in some cases no more than 0.1, in some cases no more than 0.07, in some cases no more than 0.05, and in some cases even less.

The stiffness of the reinforcing band 66' may be related to, such as greater than, less than, or substantially equal to, the stiffness of the mounting band 68. For example, in some embodiments, a ratio of the stiffness of the reinforcing band 66' in a given direction of the tire 34 over the stiffness of the mounting band 68 in the given direction of the tire 34""

may be at least 1.1, in some cases at least 1.2, in some cases at least 1.5, in some cases at least 2 and in some cases even more, and/or no more than 0.9, in some cases no more than 0.8, in some cases no more than 0.7, and in some cases even less.

For example, in some embodiments, a ratio of the modulus of elasticity of the material $M_S$ of the reinforcing band 66' over the modulus of elasticity of the material $M_m$ of the mounting band 68 may be at least 1.1, in some cases at least 1.2, in some cases at least 1.5, in some cases at least 2 and in some cases even more, and/or no more than 1, in some cases no more than 0.9, in some cases no more than 0.8, in some cases no more than 0.7, in some cases no more than 0.6 and in some cases even less.

Moreover, the stiffness of the reinforcing band 66' is greater than the stiffness of the layers 50₁, 50₃'''''. For example, in some embodiments, a ratio of the stiffness of the reinforcing band 66' in a given direction of the tire 34''''' over the stiffness of the tread layer 50₁ in a given direction of the tire 34''''' may be at least a certain value. As another example, in some embodiments a ratio of the stiffness of the reinforcing band 66' in a given direction of the tire 34''''' over the stiffness of the inner middle layer 50₃'''' in the given direction of the tire 34''''' may be at least a certain value. Moreover, in this embodiment, the stiffness of the tread layer 50₁ may be greater than the stiffness of the inner middle layer 50₃'''''. For instance, in some cases, a ratio of the stiffness of the tread layer 50₁ in a given direction of the tire 34''''' over the stiffness of the inner middle layer 50₃''''' in the given direction of the tire 34''''' may be at least 1.1, in some cases at least 1.2, in some cases at least 1.5, in some cases at least 1.8, in some cases at least 2, and in some cases even more.

In this embodiment, the inner middle layer 50₃''''' may be relatively thick. For instance, in some cases, a ratio of a thickness of the inner middle layer 50₃''''' over the thickness $T_T$ of the tread layer 50₁ may be at least 0.9, in some cases at least 1, in some cases at least 1.1 and in some cases even more.

In this embodiment, the tire 34''''' may be manufactured by first forming the mounting band 68 as an annular structure having the desired dimensions (e.g., desired inner and outer diameters). The inner middle layer 50₃''''' may then be formed by layering plies of its material over the mounting band 68. The reinforcing band 66', which is formed as an annular structure, is then installed over the inner middle layer 50₃'''''. The tread layer 50₁ may then be formed over the reinforcing band 66' by layering plies of its material over the reinforcing band 66'.

Figure 19:
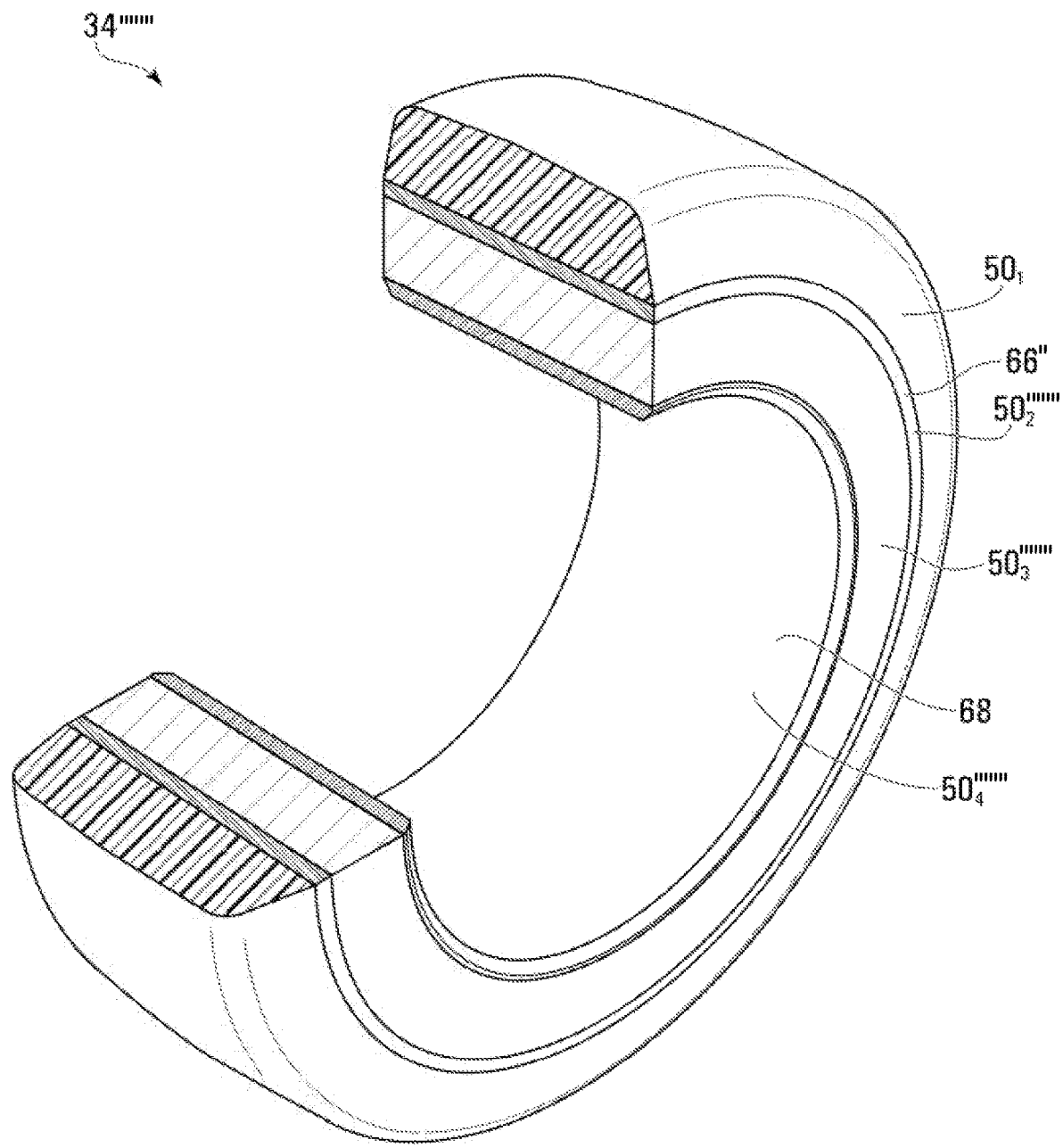
FIG. 19 is a perspective view of a cross-sectional cut of a variant of the tire of FIG. 17 in which a thickness of the reinforcing band is significant in relation to a thickness of a mounting band of the tire.

As a variant, in some embodiments, as shown in FIG. 19, the thickness $T_b$ of the reinforcing band 66" may be significant in relation to the thickness $T_m$ of the mounting band 68. For example, in some embodiments, the ratio of the thickness $T_b$ of the reinforcing band 66" over thickness $T_m$ of the mounting band 68 may be at least 0.05, in some cases at least 0.1, in some cases at least 0.2, in some cases at least 0.5, in some cases at least 0.7, in some cases at least 0.9, in some cases at least 1, and in some cases even more.

As another example, in some embodiments, the material $M_S$ of the Intermediate Layer 50ⱼ may be any other suitable material, including a nonmetallic material.

Figure 20:
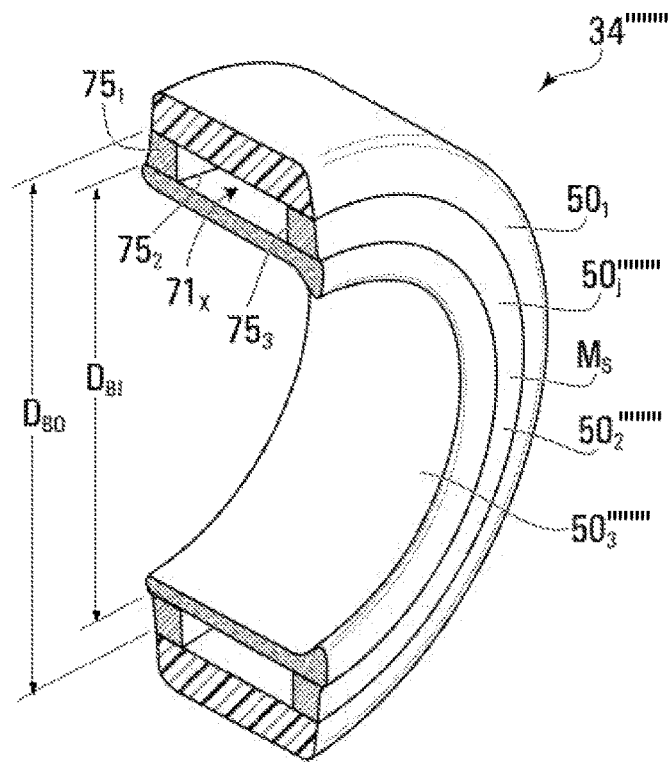
FIG. 20 is a perspective view of a cross-sectional cut of the tire in accordance with an embodiment in which the intermediate layer is a polymeric material other than rubber and comprises at least one void extending substantially in the circumferential direction of the tire.
Figure 21:
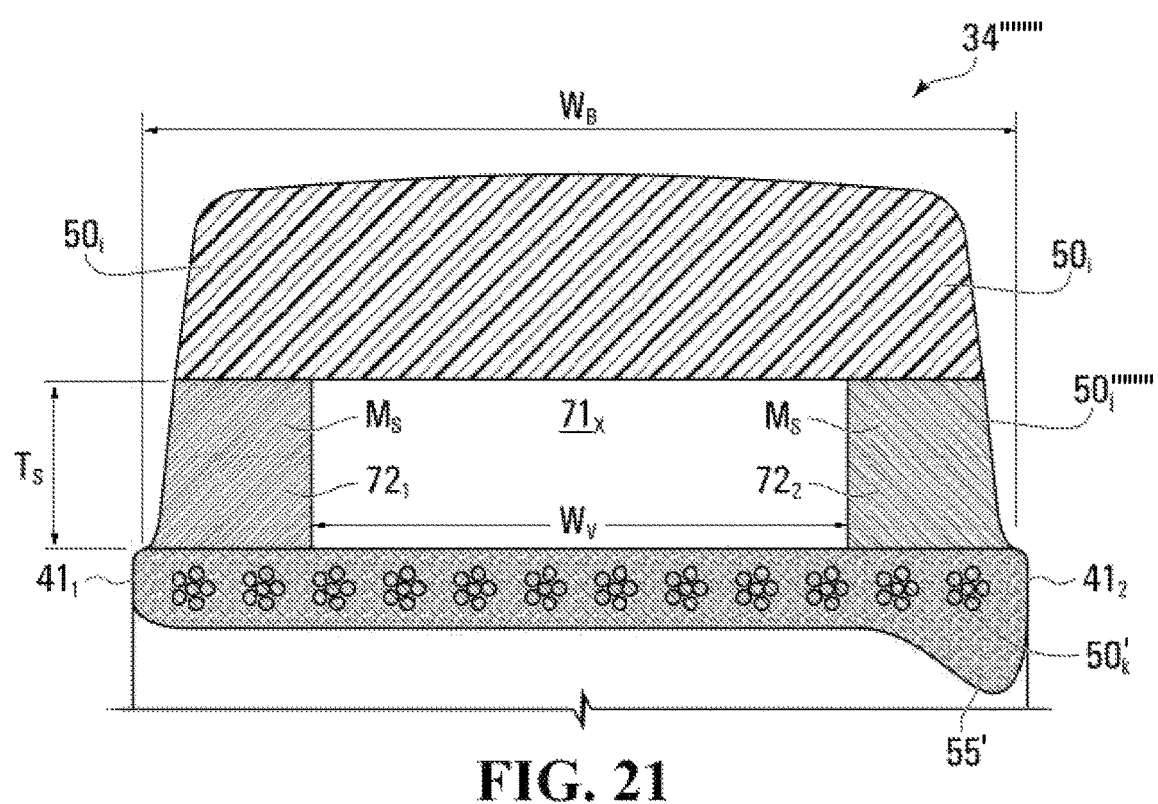
FIG. 21 is a cross-sectional view of the tire of FIG. 20.

For instance, in some embodiments, as shown in FIGS. 20 and 21, the material $M_S$ of the intermediate layer 50ⱼ''''' may be a polymeric material other than rubber (e.g., stiffer and/or with lower hysteresis than rubber). In this embodiment, the material $M_S$ of the intermediate layer 50ⱼ''''' is an elastomeric material other than rubber. In this example, the elastomeric material $M_S$ of the intermediate layer 50ⱼ'''''' is a thermoplastic elastomer, such as thermoplastic polyurethane.

More particularly, in this embodiment, the intermediate layer 50ⱼ'''''' of the tire 34'''''' is a middle layer 50₂'''''' and the adjacent layers 50ᵢ, 50ₖ' of the tire 34'''''' are the tread layer 50₁ and the heel layer 50₃''''''. The tire 34'''''' thus includes the thermoplastic elastomer $M_S$ between the rubber of the tread layer 50₁ and the rubber of the heel layer 50₃''''''.

In this example of implementation, a thickness $T_S$ of the thermoplastic elastomer $M_S$ of the intermediate layer 50ⱼ'''''' of the tire 34'''''' is significant, such that the thermoplastic elastomer $M_S$ constitutes a significant part of the tire 34''''''. For instance, in some embodiments, a ratio of the thickness $T_S$ of the thermoplastic elastomer $M_S$ of the intermediate layer 50ⱼ'''''' of the tire 34'''''' over the outer diameter $D_T$ of the tire 34'''''' may be at least 0.1, in some cases at least 0.2, in some cases at least 0.3, in some cases at least 0.4, and in some cases even more (e.g., half or more).

In some embodiments, the intermediate layer 50ⱼ'''''' of the tire 34'''''' may comprise one or more voids 71₁-71ᵥ defined by its thermoplastic elastomer $M_S$. Each void 71ₓ may be an opening, a hole or any other hollow space formed by the thermoplastic elastomer $M_S$. Each void 71ₓ can contain air that is non-pressurized (e.g., ambient) or otherwise unnecessary for supporting loading on the tire 34''''''. This may be useful for various purposes. For instance, this may help to provide or control a vertical compliance of the tire 34'''''' and/or to reduce a weight and/or a cost of the tire 34''''''.

For example, in some embodiments, a void proportion of the intermediate layer 50ⱼ'''''' of the tire 34'''''', which is a ratio of a sum of a volume of each of the one or more voids 71₁-71ᵥ over a volume bounded by the intermediate layer 50ⱼ'''''' of the tire 34'''''', may be significant. The volume bounded by the intermediate layer 50ⱼ'''''' of the tire 34'''''' is given by $\pi(D_{BO}^2 - D_{BI}^2)W_B/4$ where $D_{BO}$ is an outer diameter of the intermediate layer 50ⱼ'''''' of the tire 34, $D_{BI}$ is an inner diameter of the intermediate layer 50ⱼ'''''' of the tire 34'''''', and $W_B$ is a width of the intermediate layer 50ⱼ'''''' of the tire 34'''''' in the lateral direction of the tire 34''''''. For instance, in some embodiments, the void proportion of the intermediate layer 50ⱼ'''''' of the tire 34'''''' may be at least 0.1, in some cases at least 0.2, in some cases at least 0.3, in some cases at least 0.4, in some cases at least 0.5 and in some cases even more.

The stiffness of the intermediate layer 50ⱼ'''''' in a given direction of the tire 34'''''' may be related to the void proportion of the intermediate layer 50ⱼ''''''. For instance, a ratio of a modulus of elasticity of the elastomeric material $M_S$ of the intermediate layer 50ⱼ'''''' over the void proportion of the intermediate layer 50ⱼ'''''' may be at least a certain value.

In this example of implementation, the intermediate layer 50ⱼ'''''' of the tire 34'''''' has a single void 71ₓ which extends around the tire 34'''''' and is delimited by portions 72₁, 72₂ of the thermoplastic elastomer $M_S$ of the intermediate layer 50ⱼ'''''' of the tire 34'''''' that extend around the tire 34'''''' and constitute parts of the lateral surfaces 41₁, 41₂' of the tire 34''''''. The portions 72₁, 72₂ of the thermoplastic elastomer $M_S$ may be viewed as "columns" interconnecting the tread layer 50₁ and the heel layer 50₃''''''. More particularly, in this case, the portions 72₁, 72₂ of the thermoplastic elastomer $M_S$ constitute annular members (e.g., discs with central openings) that interconnect the tread layer 50₁ and the heel layer 50₃''''''.

The void $71_x$ may have a size that is significant relative to the tire $34''''''$. For instance, in some cases, a ratio $W_V/W_T$ of a width $W_V$ of the void $71_x$ (measured in the lateral direction of the tire $34''''''$) over the width $W_T$ of the tire $34''''''$ may be at least 0.1, in some cases at least 0.2, in some cases at least 0.3, in some cases at least 0.4 and in some cases even more. For example, in some cases, the void $71_x$ may be sized such that each of the columns $72_1$, $72_2$ has a same width (measured in the lateral direction of the tire $34''''''$). The size of the void $71_x$ may be related to the thickness $T_S$ of the elastomeric material $M_S$ of the intermediate layer $50_j''''''$. For instance, in some cases, a ratio $W_V/T_S$ of the width $W_V$ of the void $71_x$ over the thickness $T_S$ of the elastomeric material $M_S$ of the intermediate layer $50_j''''''$ may be at least a certain value.

In this embodiment, the tire $34''''''$ may be manufactured by first forming the heel layer $50_3''''''$ by layering plies of the material of the heel layer $50_3''''''$ over a mold as described above. The material $M_S$ of the intermediate layer $50_j''''''$ may then be molded onto the formed heel layer $50_3''''''$ such as to form the portions $72_1$, $72_2$ and the void $71_x$ disposed between the portions $72_1$, $72_2$. The material of the tread layer $50_1$ can then be layered as plies onto the portions $72_1$, $72_2$. In this example, the material $M_S$ is retained onto the respective materials of the layers $50_1$, $50_3''''''$ by chemical bonding (i.e., a chemical reaction between the material $M_S$ and the materials of the layers $50_1$, $50_3''''''$). In other examples, an adhesive may be used at an interface between the material $M_S$ of the intermediate layer $50_j''''''$ and the respective materials of the layers $50_1$, $50_3''''''$.

Figure 22A:
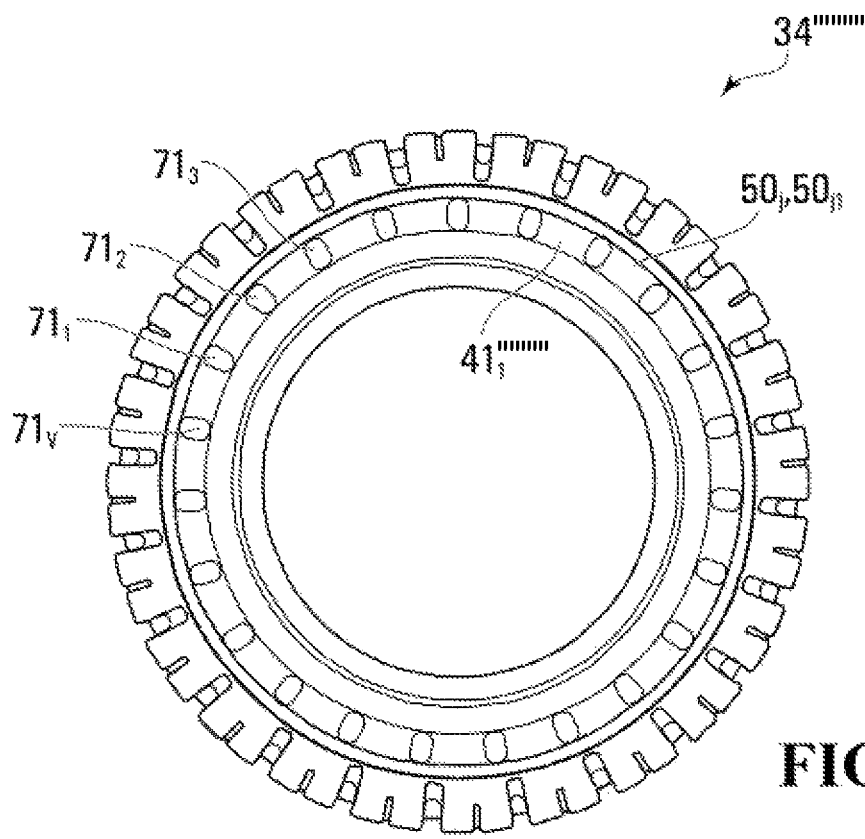
FIGS. 22A to 22C show a variant of the tire of FIG. 20 in which voids of the intermediate layer extend substantially in the lateral direction of the tire.
Figure 22B:
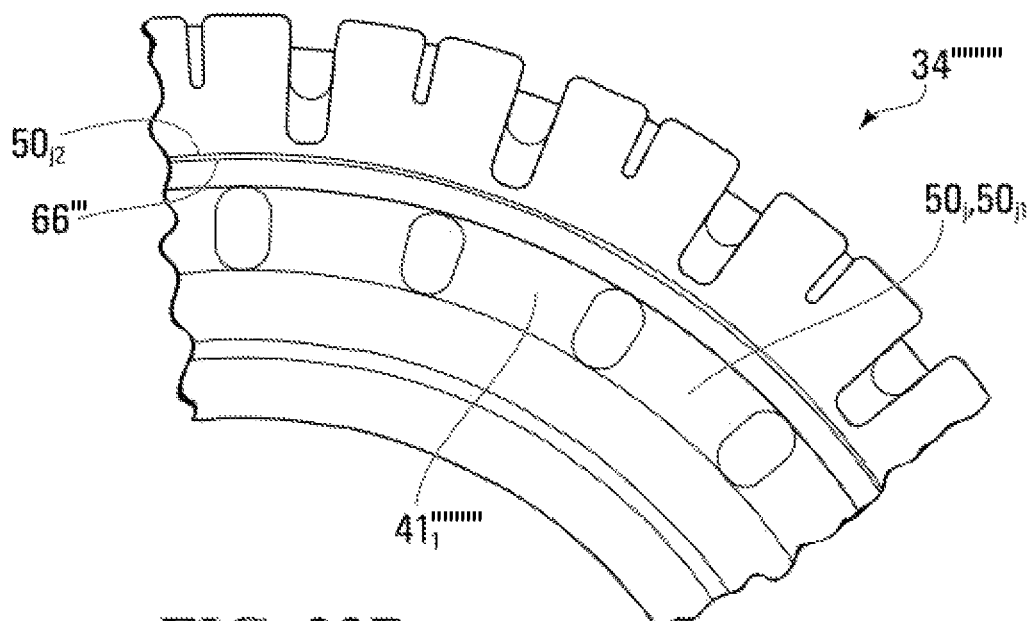
Figure 22C:
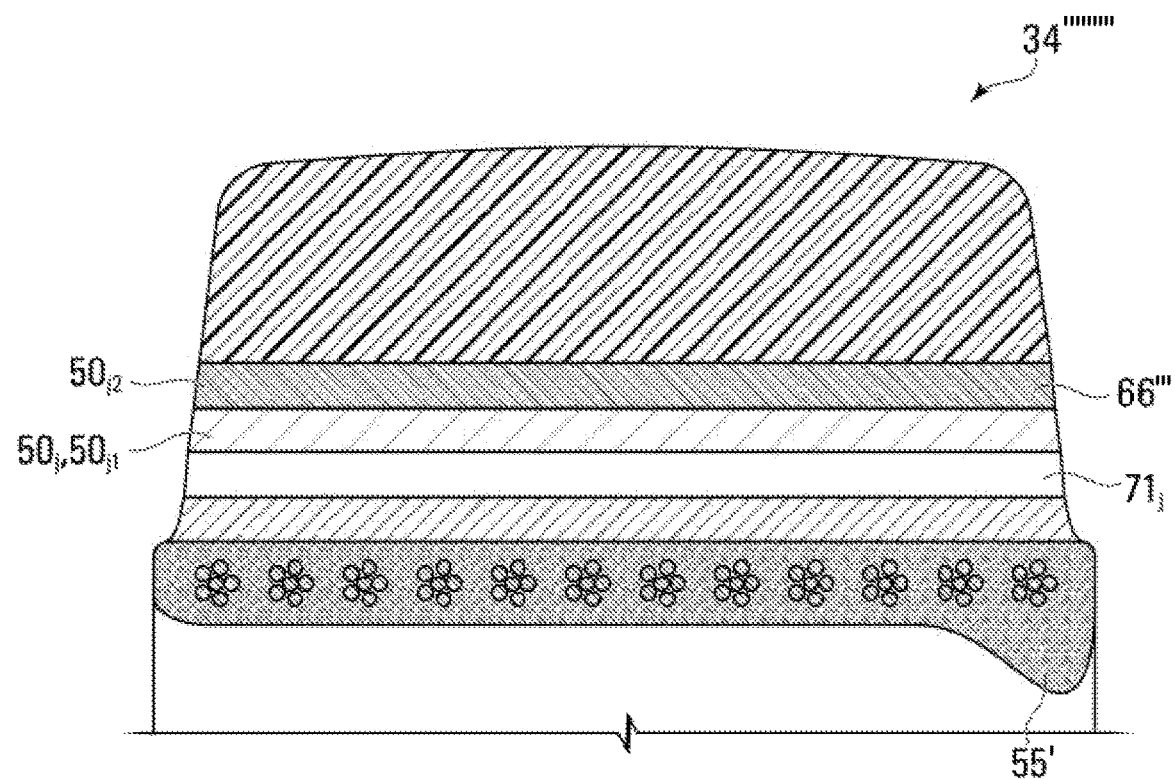

As a variant, in some embodiments, as shown in FIGS. 22A to 22C, the voids $71_1$-$71_V$ of the intermediate layer $50_j$ may be spaced apart from one another in the circumferential direction of the tire $34''''''$. In this example, the voids $71_1$-$71_V$ of the intermediate layer $50_j$ extend laterally for at least a majority of the width $W_T$ of the tire $34''''''$. More particularly, in this example, the voids $71_1$-$71_V$ of the intermediate layer $50_j$ extend laterally through the tire $34''''''$, i.e., from its lateral surface $41_1''''''$ to its lateral surface $41_2$. The voids $71_1$-$71_V$ of the intermediate layer $50_j$ are thus laterally-extending through holes in this case.

Also, in this embodiment, the intermediate layer $50_j$ comprising the voids $71_1$-$71_V$ is one intermediate layer, which is denoted $50_{j1}$, and the tire $34''''''$ comprises another intermediate layer $50_{j2}$ that comprises the reinforcing band $66'''$ as discussed above. In this example, the intermediate layer $50_{j2}$ comprising the reinforcing band $66'''$ is disposed radially-outwardly of the intermediate layer $50_j$ comprising the voids $71_1$-$71_V$.

The material $M_S$ of the intermediate layer $50_j$ may be any other suitable material in other embodiments. For instance, in some embodiments, it may be a rigid polymeric material (e.g., high-density polyethylene, etc.), a composite material (e.g., fiber-reinforced polymeric material), or any other material that is stiffer than the materials $M_{Ei}$, $M_{Ek}$ of each of the adjacent layers $50_1$, $50_k$ of the tire $34''''''$.

In some embodiments such as those discussed above, the elastic deformations of respective ones of the layers $50_1$-$50_L$ of the tire $34''''''$ that are decoupled by the intermediate layer $50_j$ of the tire $34''''''$ may be radial deflections of the respective ones of the layers $50_1$-$50_L$ of the tire $34''''''$ under load.

Notably, in some embodiments, the radial deflection of the intermediate layer $50_j$ of the tire $34''''''$ that effects decoupling may be small in relation to a total radial deflection of the tire $34''''''$ under load and/or less than the radial deflection of the outwardly-adjacent layer $50_i$ of the tire $34''''''$ and/or than the radial deflection of the inwardly-adjacent layer $50_k$ of the tire $34''''''$ under load.

For example, in some embodiments, the radial deflection of the intermediate layer $50_j$ of the tire $34''''''$ may be no more than 20%, in some cases no more than 15%, in some cases no more than 10%, and in some cases no more than 5% of the total radial deflection of the tire $34''''''$ under load. In some examples of implementation, the radial deflection of the intermediate layer $50_j$ of the tire $34''''''$ may be substantially null (i.e., zero), so that it essentially does not contribute to the total radial deflection of the tire $34''''''$ under load.

As another example, in some embodiments, the radial deflection of the intermediate layer $50_j$ of the tire $34''''''$ may be no more than half, in some cases no more than one-third, in some cases no more than one-fifth, and in some cases no more than one-tenth of the radial deflection of the outwardly-adjacent layer $50_i$ of the tire $34''''''$, and/or radial deflection of the intermediate layer $50_j$ of the tire $34''''''$ may be no more than half, in some cases no more than one-third, in some cases no more than one-fifth, and in some cases no more than one-tenth of the radial deflection of the inwardly-adjacent layer $50_k$ of the tire $34''''''$ under load.

Also, in some embodiments, the radial deflection of the outwardly-adjacent layer $50_i$ of the tire $34''''''$ and the radial deflection of the inwardly-adjacent layer $50_k$ of the tire $34''''''$, which are decoupled by the intermediate layer $50_j$ of the tire $34''''''$, may be significantly different. For example, in some embodiments, a greater one of the radial deflection of the outwardly-adjacent layer $50_i$ of the tire $34''''''$ and the radial deflection of the inwardly-adjacent layer $50_k$ of the tire $34''''''$ may be at least 25% greater, in some cases at least 50% greater, in some cases at least 75% greater, in some cases 100% greater, and in some cases more than 100% greater than a lesser one of the radial deflection of the outwardly-adjacent layer $50_i$ of the tire $34''''''$ and the radial deflection of the inwardly-adjacent layer $50_k$ of the tire $34''''''$. For instance, in some embodiments, the radial deflection of the inwardly-adjacent layer $50_k$ of the tire $34''''''$ may be at least 25% greater, in some cases at least 50%, in some cases at least 75% greater, in some cases 100% greater, and in some cases more than 100% greater than the radial deflection of the outwardly-adjacent layer $50_i$ of the tire $34''''''$.

For instance, in some embodiments, such as those discussed above in respect of FIGS. 10 to 12A, 15 to 19 and 27 to 32, due to the decoupling function of the intermediate layer $50_j$ of the tire 34, the radial deflection of the outwardly-adjacent layer $50_i$ of the tire 34 may be approximately 30% of the total radial deflection of the tire 34 under load while the radial deflection of the inwardly-adjacent layer $50_k$ of the tire 34 may be approximately 65% of the total radial deflection of the tire 34 under load. For its part, the radial deflection of the intermediate layer $50_j$ of the tire 34 is approximately 5% of the total radial deflection of the tire 34 under load. For instance, according to a specific example where the total radial deflection of the tire 34 under load is 16 mm, the radial deflection of the outwardly-adjacent layer $50_i$ of the tire 34 is 4.8 mm, the radial deflection of the inwardly-adjacent layer $50_k$ of the tire 34 is 10.4 mm, and the radial deflection of the intermediate layer $50_j$ of the tire 34 is 0.8 mm.

2. Layer Laterally-Varying in Radial Stiffness

Figure 23:
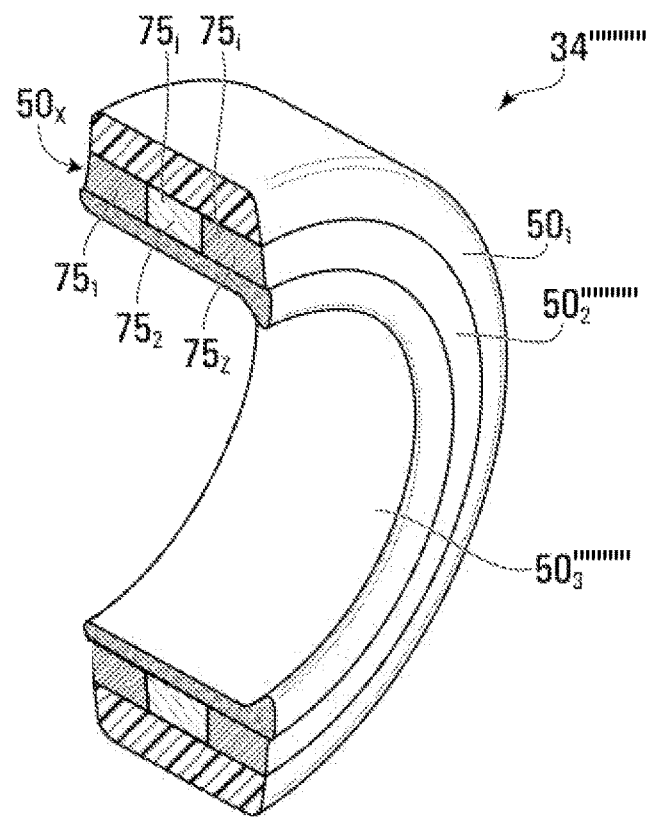
FIG. 23 is a perspective view of a cross-sectional cut of the tire in accordance with an embodiment in which a layer of the tire comprises zones distributed in the lateral direction of the tire which vary in radial stiffness.
Figure 24:
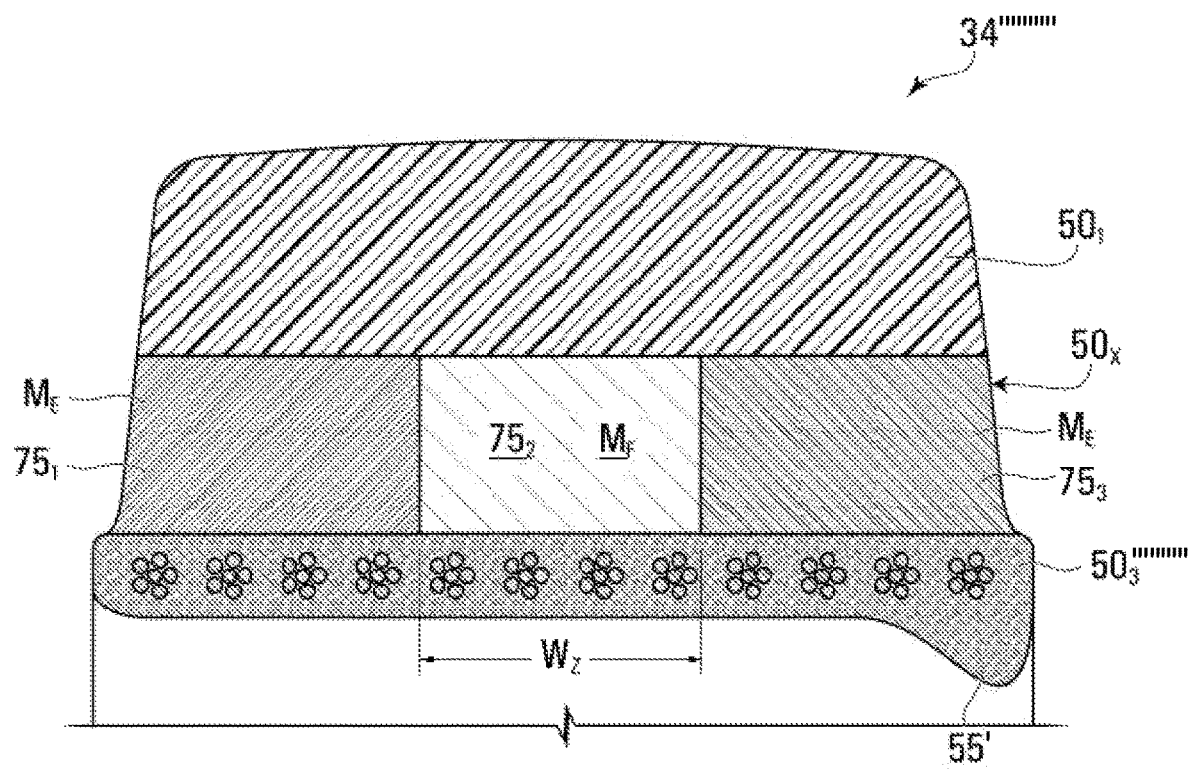
FIG. 24 is a cross-sectional view of the tire of FIG. 23.

In some embodiments, as shown in FIGS. 23 and 24, a layer $50_x$ of the tire $34''''''''$ may vary in radial stiffness in the lateral direction of the tire $34''''''''$.

The radial stiffness of the layer $50_x$ of the tire $34''''''''$ thus varies in the lateral direction of the tire $34''''''''$. The layer $50_x$ comprises zones $75_1$-$75_Z$ that are distributed in the lateral direction of the tire $34''''''''$ and vary in radial stiffness such that the radial stiffness of a zone $75_j$ is different from (e.g., greater or less than) the radial stiffness of a zone $75_i$ adjacent to the zone $75_j$. For example, in some embodiments, a ratio of the radial stiffness of the zone $75_j$ of the layer $50_x$ of the tire $34''''''''$ over the radial stiffness of the adjacent zone $75_i$ of the layer $50_x$ of the tire $34''''''''$ may be no more than 0.6, in some cases no more than 0.5, in some cases no more than 0.4, in some cases no more than 0.3, in some cases no more than 0.2, and in some cases even less (e.g., zero, i.e., null, in some cases).

Each zone $75_y$ of the layer $50_x$ of the tire $34''''''''$ occupies a significant part of the width $W_T$ of the tire $34''''''''$. For instance, in some embodiments, the zone $75_y$ of the layer $50_x$ of the tire $34''''''''$ may occupy at least 10%, in some cases at least 20%, in some cases at least 30%, in some cases at least 40%, in some cases at least half, and in some cases even more of the width $W_T$ of the tire $34''''''''$.

In this embodiment, the zone $75_2$ of the layer $50_x$ includes a material $M_F$ that is less stiff than a material $M_E$ of each of the adjacent zones $75_1$, $75_3$ of the layer $50_x$. For instance, in some embodiments, a ratio of a modulus of elasticity (e.g., Young's modulus) of the material $M_F$ of the zone $75_2$ of the layer $50_x$ over a modulus of elasticity of the material $M_E$ of each of the adjacent zones $75_1$, $75_3$ of the layer $50_x$ may be more than 0.6, in some cases no more than 0.5, in some cases no more than 0.4, in some cases no more than 0.3, in some cases no more than 0.2 and in some cases even less (e.g., substantially zero in some cases).

In this example of implementation, the material $M_F$ of the zone $75_2$ of the layer $50_x$ is a polymeric material, and the material $M_E$ of each of the adjacent zones $75_1$, $75_3$ of the layer $50_x$ is an elastomeric material. In this embodiment, the polymeric material $M_F$ of the zone $75_2$ of the layer $50_x$ is an elastomeric material different from the elastomeric material $M_E$ of each of the adjacent zones $75_1$, $75_3$ of the layer $50_N$. In this example, the elastomeric material $M_F$ of the zone $75_2$ of the layer $50_x$ and the elastomeric material $M_E$ of each of the adjacent zones $75_1$, $75_3$ of the layer $50_x$ are different rubbers. In some cases, the rubber $M_E$ of the zone $75_1$ of the layer $50_x$ of the tire $34''''''''$ may be identical to the rubber $M_E$ of the zone $75_3$ of the layer $50_x$ of the tire $34''''''''$. In some cases, the rubber $M_E$ of the zone $75_1$ of the layer $50_x$ of the tire $34''''''''$ may be different from the rubber $M_E$ of the zone $75_3$ of the layer $50_x$ of the tire $34''''''''$.

In this embodiment, the zones $75_1$-$75_Z$ are substantially equally sized to one another. For instance, each zone $75_x$ of the plurality of zones $75_1$-$75_Z$ has a width $W_Z$ in the lateral direction of the tire $34''''''''$ that is substantially equal to the width $W_T$ of the tire $34''''''''$ divided by the number of zones $75_1$-$75_Z$. In this example, as the plurality of zones $75_1$-$75_Z$ includes three zones $75_1$, $75_2$, $75_3$, the width $W_Z$ of each zone $75_x$ is equal to the width $W_T$ of the tire $34''''''''$ divided by three (i.e., $W_T/3$). Furthermore, each zone $75_x$ has a thickness that is substantially equal to a thickness of the intermediate layer $50_j$. In other embodiments, the width $W_Z$ of each zone $75_x$ may vary. For example, in some cases, the width of the zone $75_2$ may be greater than the width of the zones $75_1$, $75_3$.

In this embodiment, the tire $34''''''''$ is manufactured by first forming the heel layer $50_3''''''''$ by layering plies of its material over a mold as discussed above. The layer $50_x$ which varies in radial stiffness can then be formed by layering the material of respective ones of its zones $75_1$-$75_Z$ consecutively for example by forming respective discs of material of each of the zones $75_1$-$75_Z$. Finally, the tread layer $50_1$ would then be formed by layering plies of its material over the layer $50_x$.

Figure 25:
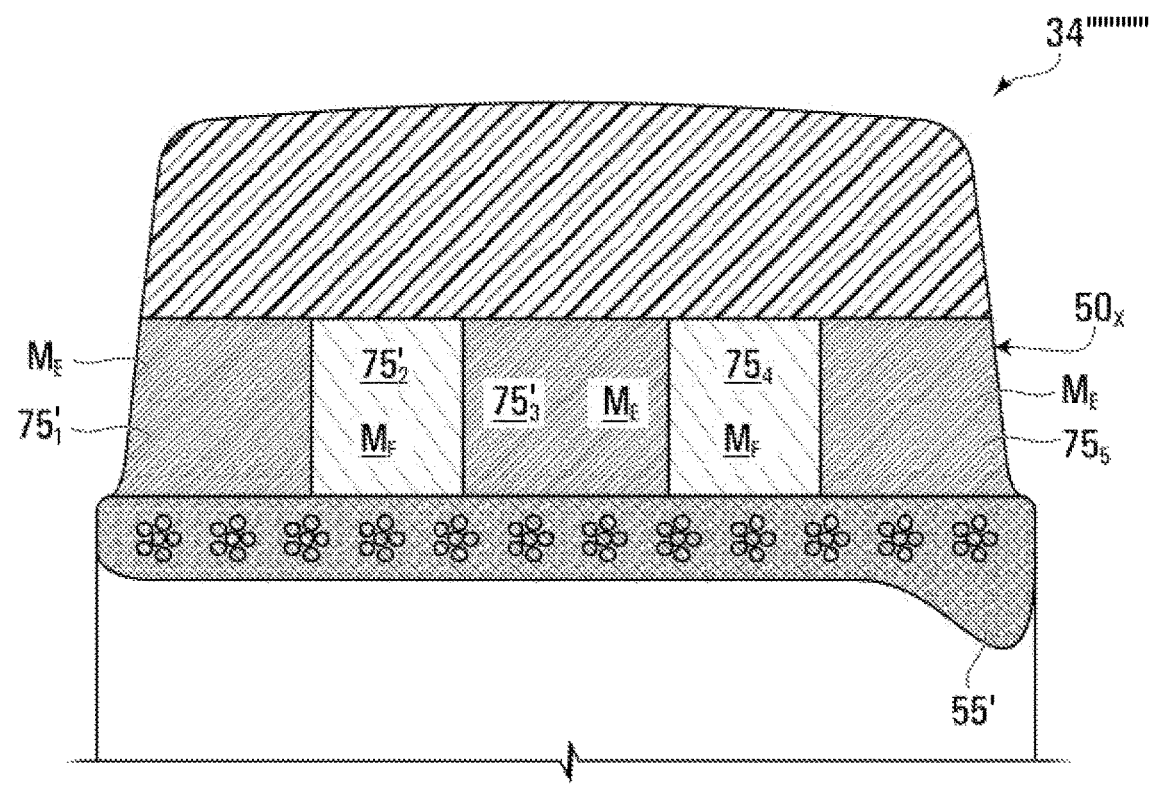
FIG. 25 is a cross-sectional view of a variant of the tire of FIG. 23.

As a variant, in some embodiments, as shown in FIG. 25, each of plural ones of the zones $75_1'$-$75_Z$ of the layer $50_x$ of the tire $34''''''''$ includes the material $M_F$ that is less stiff than the material $M_E$ of each of respective ones of the zones $75_1'$-$75_Z$ of the layer $50_x$ between which it is disposed. For example, in this embodiment, each of the zones $75_2'$, $75_4'$ of the layer $50_x$ includes the material $M_F$ that is less stiff than the material $M_E$ of each of respective ones of the zones $75_1'$, $75_3'$, $75_5$ of the layer $50_x$ between which it is disposed.

In some embodiments, a zone $75_j$ of the layer $50_x$ of the tire $34''''''''$ may be a void (i.e., an opening, hole or other hollow space) between zones $75_i$, $75_k$ of the layer $50_x$ that are adjacent to it, in which case its radial stiffness is zero (i.e., null) and therefore less than the radial stiffness of each of the zones $75_i$, $75_k$ of the layer $50_x$ that are adjacent to it.

For example, in some embodiments, as shown in FIG. 20, as previously discussed, the intermediate layer $50_j''''''$ of the tire $34''''''''$ comprises the zones $75_1$-$75_3$ where the zones $75_1$, $75_3$ are the columns $72_1$, $72_2$ of the thermoplastic elastomer $M_S$ of the layer $50_j''''''$ and the zone $75_2$ is the void $71_x$ which extends around the tire $34''''''''$.

Figure 26:
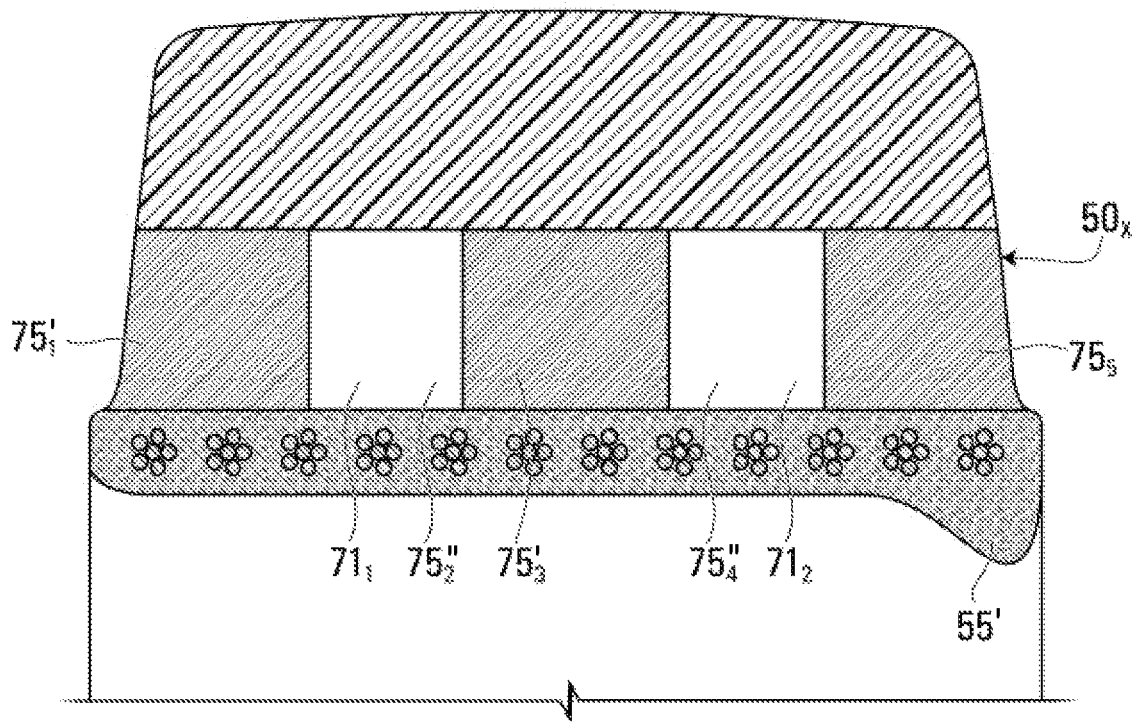
FIG. 26 is a cross-sectional view of an example of a variant of the tire of FIG. 25.

As another example, in some embodiments, as shown in FIG. 26, each of plural ones of the zones $75_1'$-$75_Z$ of the layer $50_x$ of the tire $34''''''''$ may include a void between respective ones of the zones $75_1'$-$75_Z$ of the layer $50_x$. For example, in this embodiment, the zones $75_2''$, $75_4''$ of the layer $50_x$ respectively include voids $71_1$, $71_2$ between respective ones of the zones $75_1'$, $75_3$, $75_5$ of the layer $50_x$.

The tire 34, including its layers $50_1$-$50_L$, may be implemented in various other ways in other embodiments.

For instance, features of two or more embodiments discussed herein may be combined in some embodiments.

Figure 27:
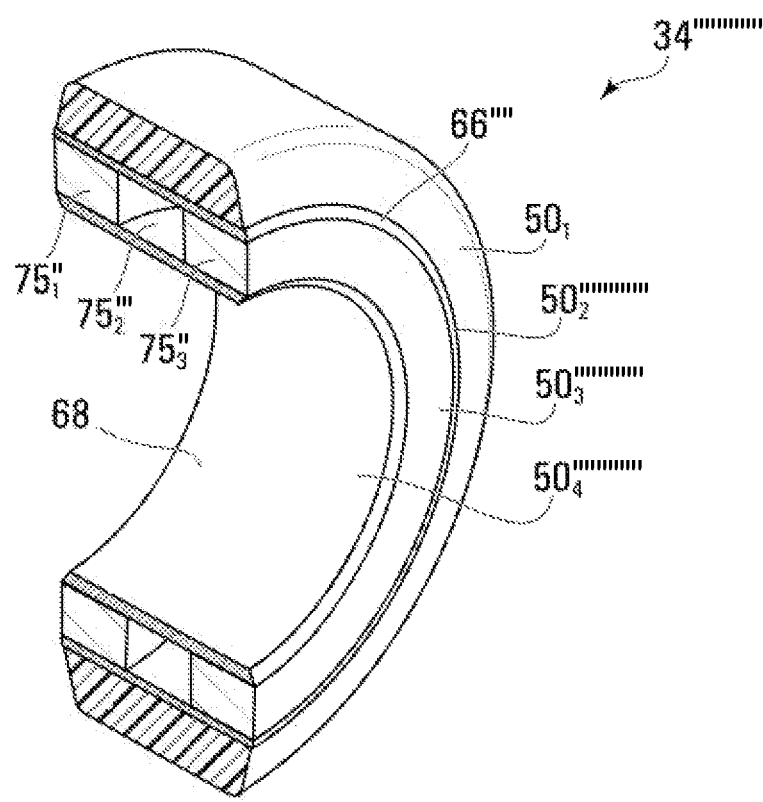
FIG. 27 is a perspective view of a cross-sectional cut of a variant of the tire in which the tire is a press-on tire and comprises the zones that are distributed in the lateral direction of tire and vary in radial stiffness.
Figure 28:
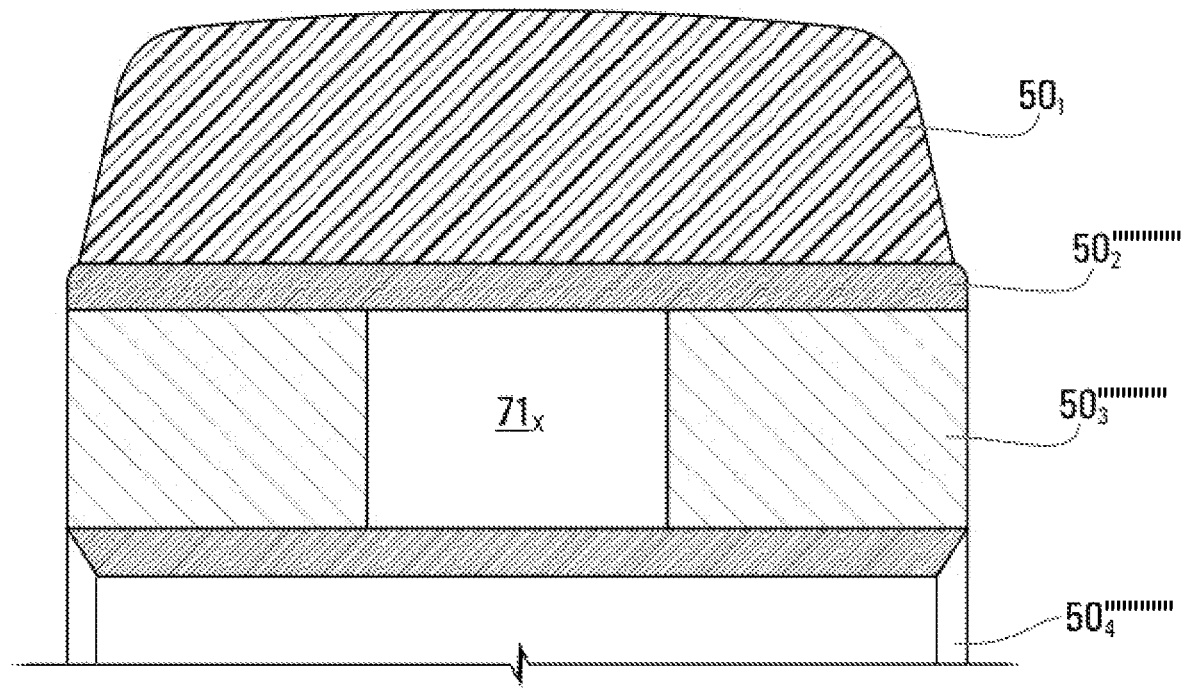
FIG. 28 is a cross-sectional view of the tire of FIG. 27.

As an example, in some embodiments, as shown in FIGS. 27 and 28, the tire $34''''''''$ may be a press-on tire and comprise the mounting band 68 and the reinforcing band $66''''$ between which the layer $50_3''''''''$ comprises the zones $75_1''$-$75_3''$ that are distributed in the lateral direction of the tire $34''''''''$ and vary in radial stiffness.

In this embodiment, the zone $75_2'''$ comprises a void $71_x$ such that the void $71_x$ is disposed between the zones $75_1''$, $75_3''$. Moreover, the void $71_x$ contains non-pressurized air and is disposed between the reinforcing band $66''''$ and the mounting band 68. In this example of implementation, the width $W_Z$ of each zone $75_1''$-$75_Z$ is substantially equal such that the void $71_x$ has a width that is substantially equal to the width of the zones $75_1''$, $75_3''$.

In this embodiment, the tire $34''''''''$ is manufactured by forming the mounting band 68 and the layer $50_3''''''''$ as a first structure and the reinforcing band $66''''$ and the tread layer $50_1$ as a second structure which are then assembled together. For instance, in this example, the mounting band 68 is first formed as an annular structure according to its desired dimensions (e.g., desired inner and outer diameters). Then, the layer $50_3''''''''$ is formed on top of the mounting band 68 by consecutively forming its zones $75_1''$-$75_Z$ on the mounting band 68. Notably, the zone $75_1''$ is first formed by layering its material onto the mounting band 68 and then the zone $75_3''$ is formed by layering its material onto the mounting band 68 at a distance away from the zone $75_1''$, in the lateral direction of the tire 34'''''''', appropriate for obtaining the desired width of the void $71_x$. Then, separately, the reinforcing band 66'''' is formed to its desired dimensions and the tread layer $50_1$ is then formed over the reinforcing band 66''''. At this point, the reinforcing band 66'''' and the tread layer $50_1$ can be layered on top of the structure formed by the mounting band 68 and the layer $50_3''''''''''$.

Figure 29:
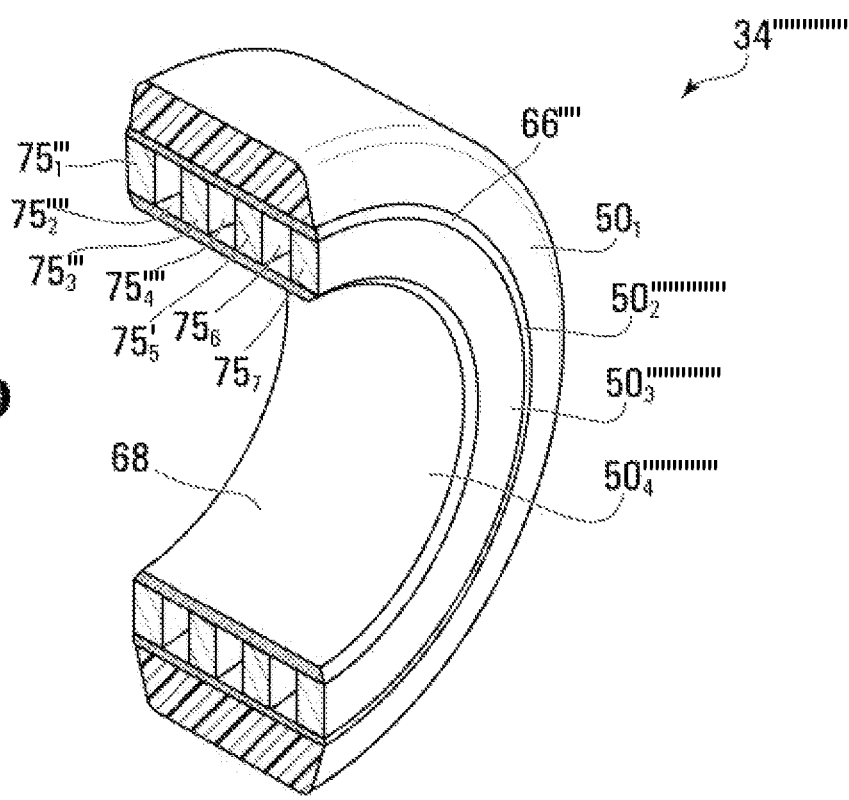
FIG. 29 is a perspective view of a cross-sectional cut of the tire in accordance with an embodiment in which a layer of the tire comprises multiple zones distributed in the lateral direction of the tire and vary in radial stiffness.
Figure 30:
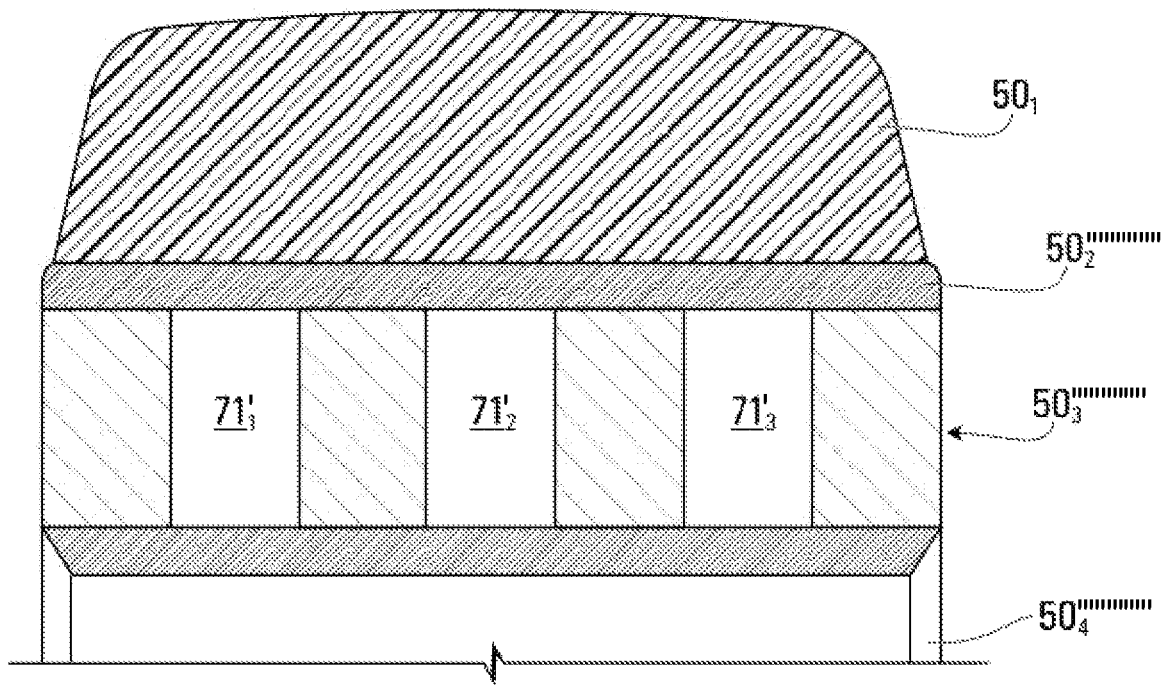
FIG. 30 is a cross-sectional view of the tire of FIG. 29.

As another example, in some embodiments, as shown in FIGS. 29 and 30, the tire 34'''''''''' may be a press-on tire and comprise the mounting band 68 and the reinforcing band 66 between which the layer $50_3''''''''''$ comprises the zones $75_1'''$-$75_7$ that are distributed in the lateral direction of the tire 34'''''''''' and vary in radial stiffness.

In this embodiment, the zones $75_2''''$, $75_4''''$, $75_6$ respectively comprise voids $71_1'$, $71_2'$, $71_3'$ such that the void $71_1'$ is disposed between the zones $75_1'$, $75_3'''$, the void $71_2'$ is disposed between the zones $75_3'''$, $75_5'$, and the void $71_3'$ is disposed between the zones $75_5'$, $75_7$. Moreover, each one of the voids $71_1'$, $71_2'$, $71_3'$ contains non-pressurized air and is disposed between the reinforcing band 66'''' and the mounting band 68. In this example of implementation, the width $W_Z$ of each zone $75_1'''$-$75_Z$ is substantially equal such that the voids $71_1'$, $71_2'$, $71_3'$ have widths substantially and to the width of the zones $75_1'''$, $75_3'''$, $75_5'$, $75_7$. In other examples of implementation, the width $W_Z$ of the zones $75_1'''$-$75_Z$ may vary for each zone $75_i$ such that the voids $71_1'$, $71_2'$, $71_3'$ may have widths different from one another.

In this embodiment, the tire 34'''''''''' is manufactured by forming the mounting band 68 and the layer $50_3''''''''''$ as a first structure and the reinforcing band 66'''' and the tread layer $50_1$ as a second structure which are then assembled together. For instance, in this example, the mounting band 68 is first formed as an annular structure according to its desired dimensions (e.g., desired inner and outer diameters). Then, the layer $50_3''''''''''$ is formed on top of the mounting band 68 by consecutively forming its zones $75_1'''$-$75_Z$ on the mounting band 68. Notably, the zone $75_1'''$ is first formed by layering its material onto the mounting band 68 and then the zone $75_3'''$ is formed by layering its material onto the mounting band 68 at a distance away from the zone $75_1'''$, in the lateral direction of the tire 34'''''''', appropriate for obtaining the desired width of the void $71_1'$. The other zones $75_4''''$, $75_5'$, $75_6$, $75_7$ are formed in a similar manner. Then, separately, the reinforcing band 66'''' is formed to its desired dimensions and the tread layer $50_1$ is then formed over the reinforcing band 66''''. At this point, the reinforcing band 66'''' and the tread layer $50_1$ can be layered on top of the structure formed by the mounting band 68 and the layer $50_3''''''''''$.

Figure 31:
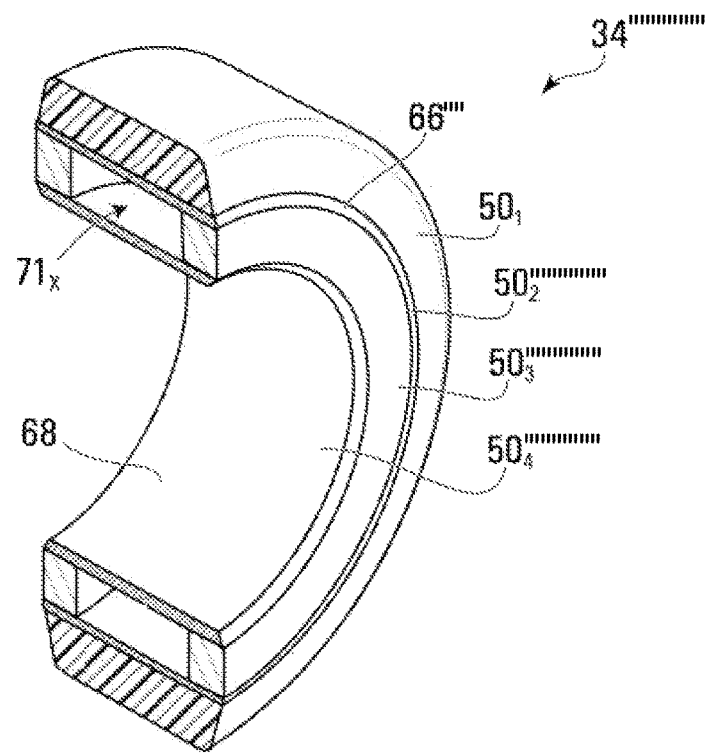
FIG. 31 is a perspective view of a cross-sectional cut of the tire in accordance with another embodiment.
Figure 32:
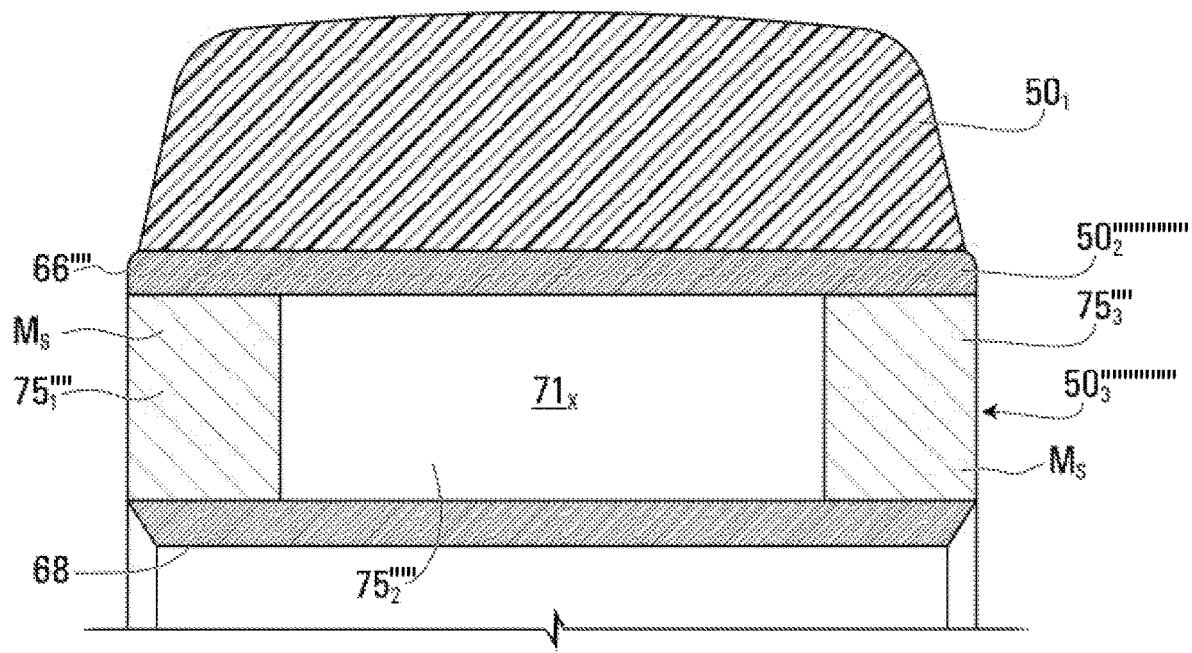
FIG. 32 is a cross-sectional view of the tire of FIG. 31.

As another example, in some embodiments, as shown in FIGS. 31 and 32, the tire 34'''''''''' may be a press-on tire and comprise the mounting band 68 and the reinforcing band 66 between which the layer $50_3''''''''''$ comprises the zones $75_1''''$-$75_3''''$ that are distributed in the lateral direction of the tire 34'''''''''' and vary in radial stiffness. In this embodiment, the zones $75_1''''$-$75_3''''$ comprise the thermoplastic elastomer $M_S$ and the zone $75_2''''$ comprises a void $71_x$ defined by the thermoplastic elastomer $M_S$ of the adjacent zones $75_1''''$-$75_3''''$.

Figure 33:
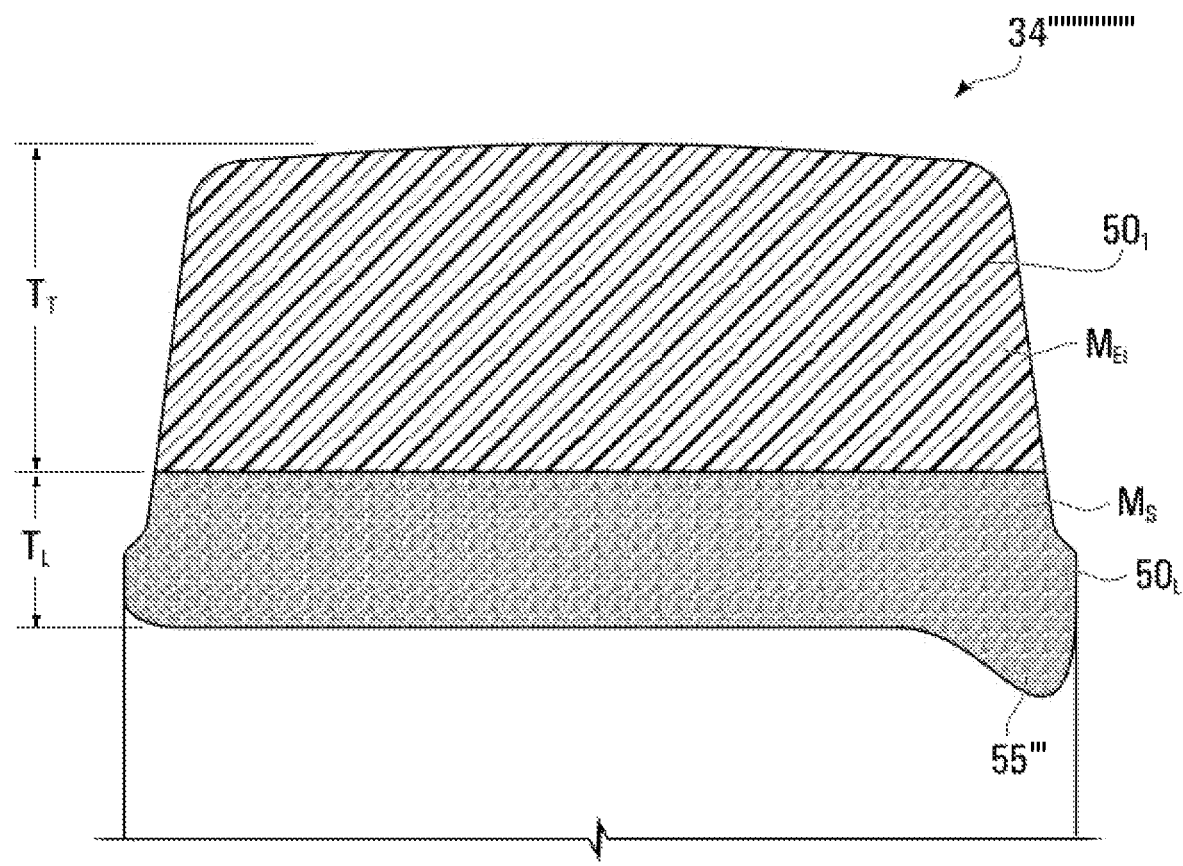
FIG. 33 is a cross-sectional view of the tire in accordance with an embodiment in which an inner layer of the tire comprises a thermoplastic elastomer that is stiffer than a material of a tread layer of the tire.

As another example, in some embodiments, features discussed above in relation to an intermediate layer $50_j$ of the tire 34 that may be stiffer in the radial direction of the tire 34 than adjacent layers $50_i$, $50_k$ of the tire 34 between which it is disposed may be implemented by a given one of the layers $50_1$-$50_L$ of the tire 34 that is not an intermediate layer. For instance, in some embodiments, as shown in FIG. 33, features discussed above in relation to an intermediate layer $50_j$ of the tire 34'''''''''' that may be stiffer in the radial direction of the tire 34'''''''''' than adjacent layers $50_i$, $50_k$ of the tire 34'''''''''' between which it is disposed may be implemented by the inner layer $50_L$ of the tire 34''''''''''.

More specifically, in this embodiment, the inner layer $50_L$ comprises the thermoplastic elastomer $M_S$ that is stiffer, in the radial direction of the tire 34'''''''''', than the elastomeric material $M_{Ei}$ of the tread layer $50_1$. The inner layer $50_L$ has a thickness $T_L$ that may be significant relative to the thickness $T_T$ of the tread layer $50_1$. For instance, in some cases, a ratio of the thickness $T_L$ of the inner layer $50_L$ over the thickness $T_T$ of the tread layer $50_1$ may be at least 0.7, in some cases at least 0.8, in some cases at least 0.9 and in some cases even more. As such, in this embodiment, the tire 34'''''''''' is substantially made of the thermoplastic elastomer $M_S$ with the exception of the tread layer $50_1$ which comprises the material $M_{Ei}$.

The rolling resistance of the tire 34 may be low because of the tire's layers $50_1$-$50_L$ as implemented in embodiments discussed above. This may allow the tire 34 to be more energy-efficient.

For instance, the rolling resistance of the tire 34 may be evaluated as a rolling resistance coefficient which is given by a ratio of a rolling resistance force applied on the tire 34 over a load on the tire 34.

In some embodiments, the rolling resistance of the tire 34 may be no more than 14 $kg_f/t_f$, in some cases no more than 12 $kg_f/t_f$, in some cases no more than 10 $kg_f/t_f$, in some cases no more than 8 $kg_f/t_f$, in some cases no more than 6 $kg_f/t_f$, and in some cases even lower (where $kg_f$ refers to kilogram-force and $t_f$ refers to tonne-force) and/or no more than 14%, in some cases no more than 12%, in some cases no more than 10%, in some cases no more than 8%, in some cases no more than 6%, and in some cases even lower. The rolling resistance of the tire 34 can be measured according to a standard VDI 2196 test of The Association of German Engineers (Verein Deutscher Ingenieure).

By allowing to better manage the elastic deformation of the tire 34 as it rolls, the layers $50_1$-$50_L$ of the tire 34 may help to improve the thermal behavior of the tire 34, such as by reducing heat buildup in elastomeric material of the tire 34.

In some examples of implementation, such as those discussed above where the tire 34 comprises the metallic material $M_S$ of the intermediate layer $50_j$, heat may also be better distributed or dissipated. The metallic material $M_S$ of the intermediate layer $50_j$, which, for instance, may be provided as the metallic reinforcing cables $61_1$-$61_R$ or the metallic reinforcing band 66, can increase thermal conductivity and thus help to distribute heat laterally within the tire 34. In embodiments in which the metallic material $M_S$ of the intermediate layer $50_j$ extends to one or more of the lateral surfaces $41_1$, $41_2$ of the tire 34, heat may be thermally conducted by the metallic material $M_S$ to the one or more of the lateral surfaces $41_1$, $41_2$ of the tire 34 where it can be dissipated by convection.

Also, in some examples discussed above where the tire 34 comprises the voids $71_1$-$71_V$ of the intermediate layer $50_j$, such as those where the voids $71_1$-$71_V$ open at a periphery (e.g., the lateral surfaces $41_1$, $41_2$) of the tire 34, this may allow convection into air to lessen the heat buildup.

For instance, in some embodiments, a temperature profile of the tire 34, which represents a temperature of the tire 34 at points of a cross-section of the tire 34 normal to the circumferential direction of the tire 34 (i.e., the cross-section is taken in a plane containing the radial direction and the lateral direction of the tire 34), may have a peak (i.e., maximal) temperature that is low and/or be more uniform in the lateral direction of the tire 34.

The temperature profile of the tire 34 may be assessed in various ways. For example, in some cases, a plurality of thermocouples may be inserted within the tire 34 at different points of the cross-section of the tire 34 normal to the circumferential direction of the tire 34 and temperature data, gathered from the thermocouples, can be used to evaluate the temperature profile of the tire 34 when the tire 34 is used according to certain parameters. For example, in some embodiments, the temperature profile of the tire 34 may be assessed after testing of the tire 34 has been done in accordance with VDI 2196 standards.

For example, in some embodiments, the peak temperature of the temperature profile of the tire 34 may be relatively small.

As another example, in some embodiments, a standard deviation for the temperature of the temperature profile along a line extending across the width $W_T$ of the tire 34 in the lateral direction of the tire 34 may be relatively small.

The temperature of the tire 34 in operation may thus be kept lower in view of the intermediate layer 50$_j$ of the tire 34 providing a decoupling or stiffening effect, and this may provide benefits.

For example, a working-day-average-speed (WDAS) for the tire 34 may be allowed to be higher, such as by a provider (e.g., a manufacturer) of the tire 34. The WDAS for the tire 34 refers to an average speed of the vehicle 10 using the tire 34 during a working day (i.e., a day of work performed by the vehicle 10). Allowing the WDAS for the tire 34 to be higher therefore entails that the vehicle 10 can travel faster while it works, which may enhance its efficiency and productivity.

In some embodiments, the WDAS for the tire 34 may be allowed to be greater than 8 km/h, in some cases at least 10 km/h, in some cases at least 12 km/h, in some cases at least 14 km/h, and in some cases even higher (e.g., 15 or 16 km/h or more). Herein, the WDAS allowed for the tire 34 is specified for an average load of 75% of a maximum load allowed for the tire 34 at an ambient temperature of 20° C. The maximum load allowed for the tire 34 may be specified (e.g., explicitly in absolute terms or as a load index) on the tire 34 itself or elsewhere (e.g., a user manual or warranty). In this case, the maximum load allowed for the tire 34 is a maximum permitted static load according to the European Tyre and Rim Technical Organization (ETRTO). Each tire has its load index which correspond to the maximum load in kg For instance, in some embodiments, the WDAS for the tire 34 may be allowed to be at least 10 km/h, in some cases at least 12 km/h, in some cases at least 14 km/h, and in some cases even higher, which would compare well with pneumatic tires but without risk of failure by puncture. This may apply in various embodiments, including those discussed above in respect of FIGS. 6A, 7A, 6B and 7B where the intermediate layer 50$_j$ of the tire 34', 34" comprises the reinforcing cables 61$_1$-61$_R$, those discussed above in respect of FIGS. 15 and 16 where the intermediate layer 50$_j$'''' of the tire 34'''' comprises the reinforcing band 66, and those discussed above in respect of FIGS. 22A and 22B wherein the intermediate layer 50$_{j1}$ of the tire 34''''''' comprises the voids 71$_1$-71$_V$ and the intermediate layer 50$_{j2}$ of the tire 34''''''' comprises the reinforcing band 66'''.

Figure 34:
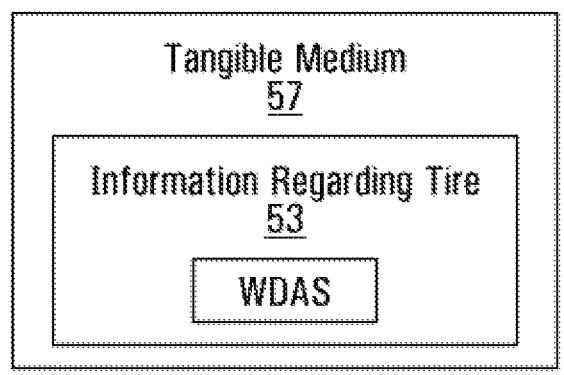
FIG. 34 shows information regarding the tire conveyed by a tangible medium.

The WDAS for the tire 34 that is allowed may be specified by the provider of the tire 34. As shown in FIG. 34, in some embodiments, the WDAS for the tire 34 that is allowed may be specified as part of information 53 regarding the tire 34 which is provided by the provider of the tire 34. For example, in this embodiment, the information 53 regarding the tire 34, including the WDAS of the tire 34 that is allowed, may be conveyed by a tangible medium 57. For instance, in some embodiments, the tangible medium 57 may include a manual (e.g., a user or operator manual) or a warranty for the tire 34. The tangible medium 57 may be a printed medium (e.g., a paper copy) or a computer-readable storage medium (e.g., a semiconductor memory (e.g., read-only memory (ROM) and/or random-access memory (RAM)), a magnetic storage medium, an optical storage medium, and/or any other suitable type of memory). In some cases, the information 53 regarding the tire 34, including the WDAS of the tire 34 that is allowed, may be conveyed on an internet webpage associated with the provider of the tire 34.

The WDAS for the tire 34 that is actually occurring as the vehicle 10 is used may be calculated in any suitable way. As an example, in some cases, a total distance (in kilometers) travelled by the vehicle 10 in a working day may be measured, a total time (in hours) worked with the vehicle 10 in the working day may be determined, and the WDAS for the tire 34 may be calculated by dividing the total distance covered by the vehicle 10 by the total time worked with the vehicle in the working day. As another example, in some cases, where the vehicle 10 essentially performs a number of roundtrips that are substantially identical during a working day, a distance (in kilometers) travelled by the vehicle 10 per roundtrip may be measured, a total time (in hours) worked with the vehicle 10 in the working day may be determined, and the WDAS for the tire 34 may be calculated by multiplying the distance per roundtrip by the number of roundtrips and dividing by the total time worked with the vehicle in the working day.

In some embodiments, the tire 34 may achieve a reduction in heat buildup that enables the WDAS that is allowed for the tire 34 to be increased as discussed above without excessively stiffening the tire 34 vertically in order to avoid detrimentally affecting ride comfort. Therefore, the tire 34 may help to enhance the efficiency and productivity of the vehicle 10 and maintain or improve the ride comfort.

For instance, in some embodiments, the tire 34 may be such that the WDAS allowed for the tire 34 is higher while maintaining the radial stiffness of the tire 34, i.e., travel faster while maintaining the ride comfort, or such that the WDAS allowed for the tire 34 is maintained while the radial stiffness of the tire 34 is lower, i.e., travel as fast while enhancing the ride comfort.

As an example, in some embodiments, the WDAS allowed for the tire 34 may be at least 8 km/h and in some cases at least 10 km/h while the radial stiffness of the tire 34 may be no more than 210 kg/mm, in some cases no more than 205 kg/mm, and in some cases no more than 200 kg/mm. As another example, in some embodiments, the WDAS allowed for the tire 34 may be at least 10 km/h and in some cases at least 12 km/h while the radial stiffness of the tire 34 may be no more than 240 kg/mm, in some cases no more than 235 kg/mm, and in some cases no more than 230 kg/mm. As yet another example, in some embodiments, the WDAS allowed for the tire 34 may be at least 12 km/h and in some cases at least 14 km/h while the radial stiffness of the tire 34 may be no more than 260 kg/mm, in some cases no more than 250 kg/mm, and in some cases no more than 240 kg/mm.

Figure 35A:
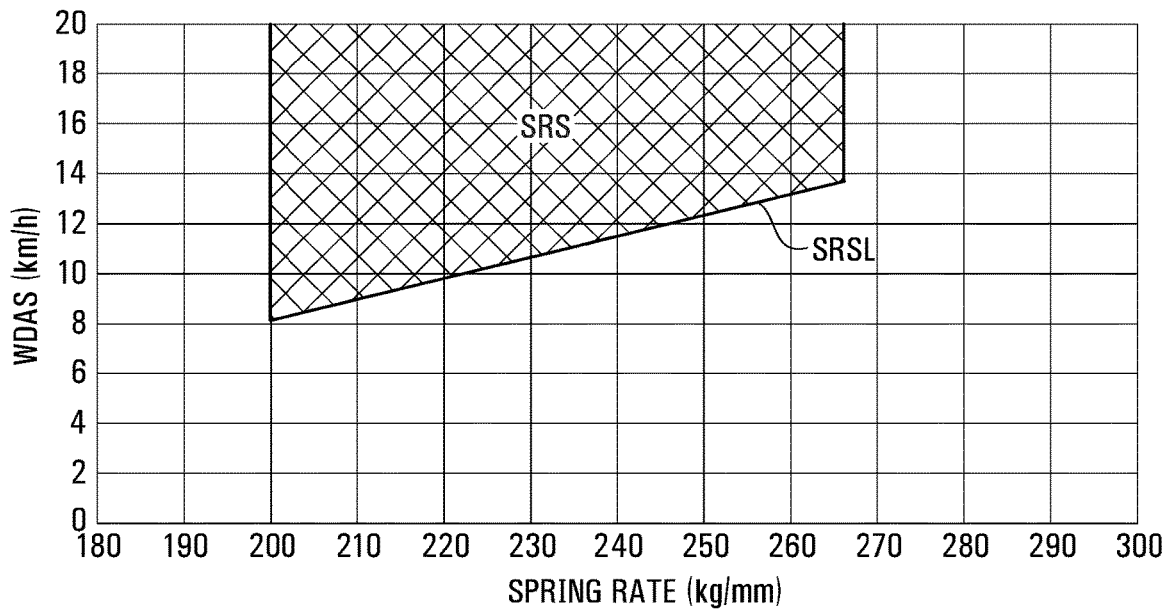
FIGS. 35A and 35B show charts expressing speed and stiffness characteristics of the tire in some embodiments.
Figure 35B:
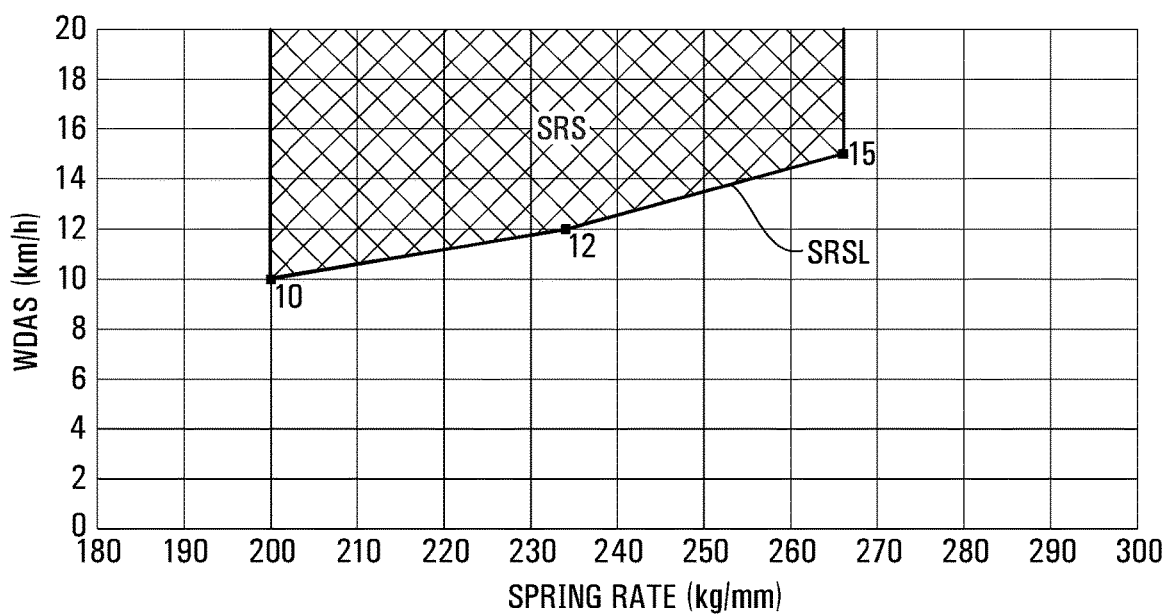

For instance, in some embodiments, the tire 34 may be configured such that the WDAS allowed for the tire 34 and the radial stiffness of the tire 34 are defined in a crosshatched zone SRS indicated in a chart as shown in FIG. 35A, where the crosshatched zone SRS includes and extends above a linear boundary SRSL in that chart. In some cases, the crosshatched zone SRS, including its linear boundary SRSL, that defines the WDAS allowed for the tire 34 and the radial stiffness of the tire 34 may be as shown in FIG. 35B.

Values expressed in units of kg/mm herein can also be expressed in units of N/mm by multiplying them by 9.81 (i.e., 1 kg/mm equals 9.81 N/mm).

While in embodiments considered above the wheels $20_1$-$20_4$ are part of the forklift 10, a wheel constructed according to principles discussed herein may be used as part of other vehicles in other embodiments.

Figure 36:
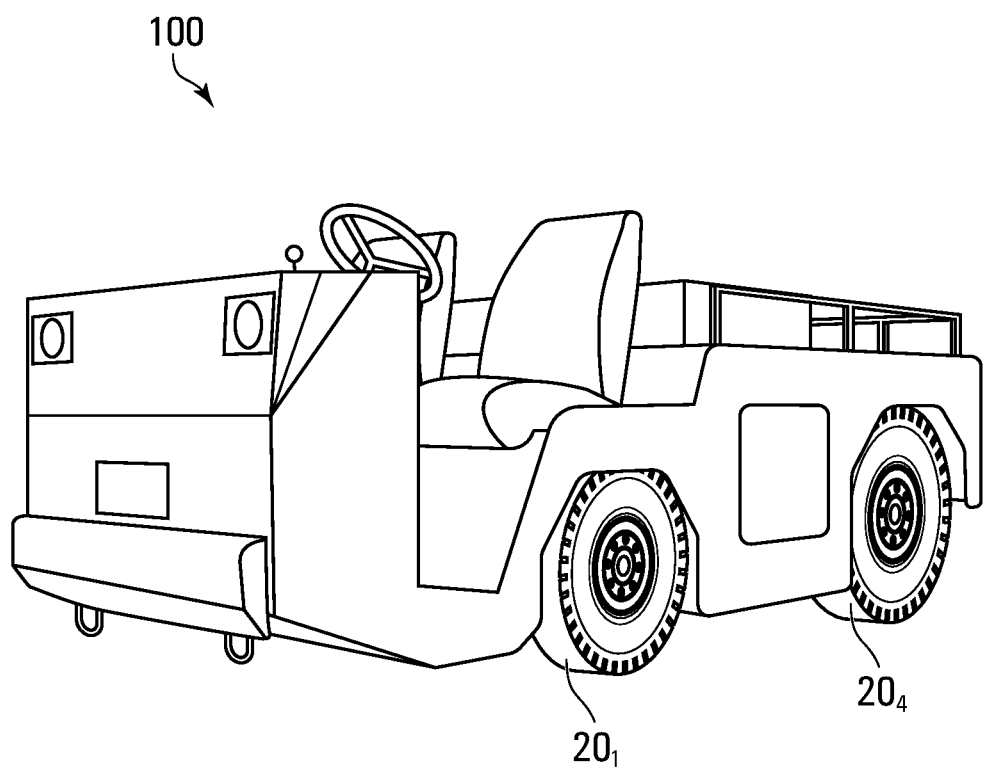
FIGS. 36 to 39 show examples of other vehicles which can implement the wheel, including its wheel body and tire.
Figure 37:
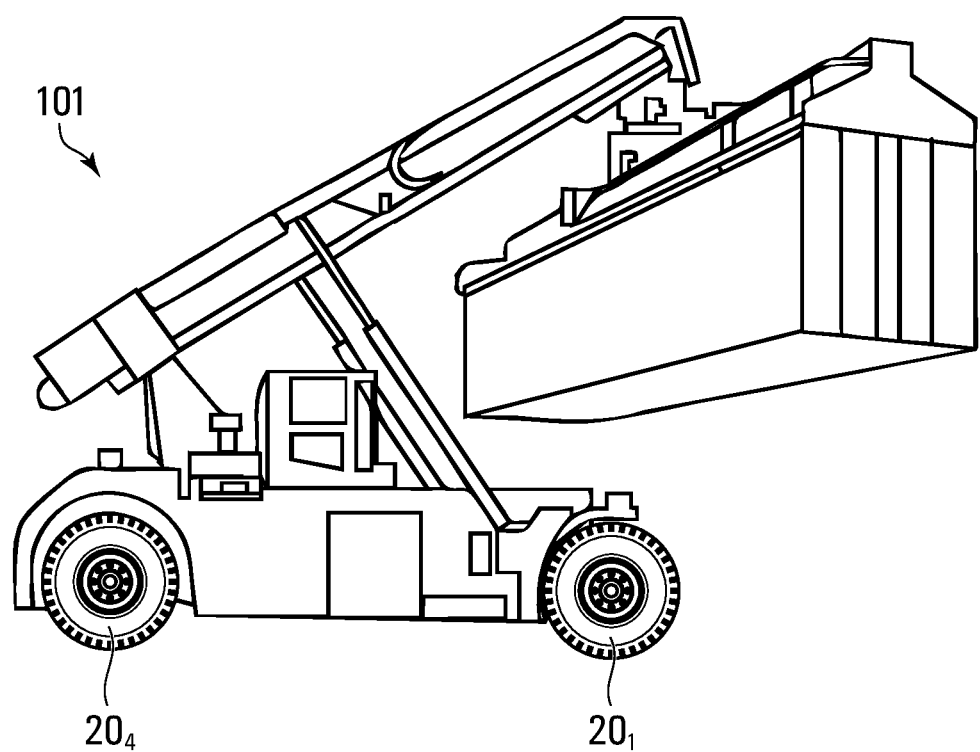
Figure 38:
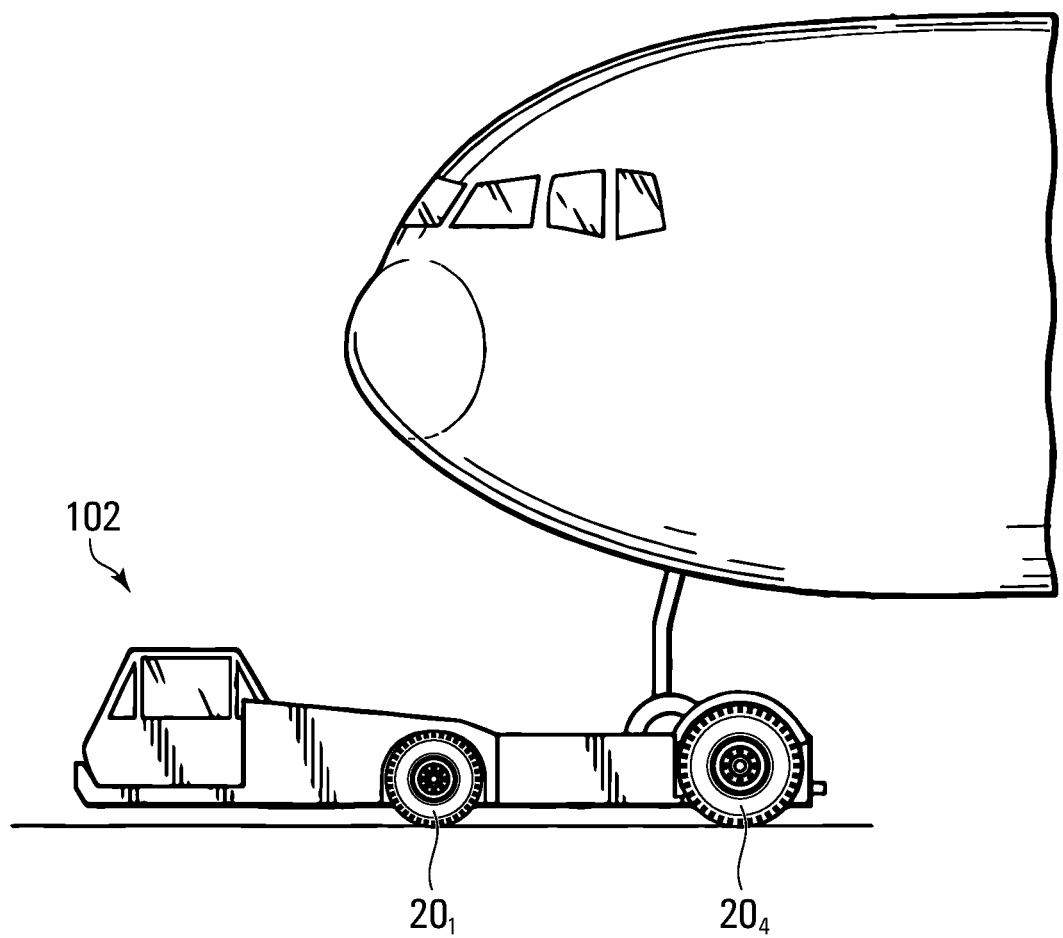
Figure 39:
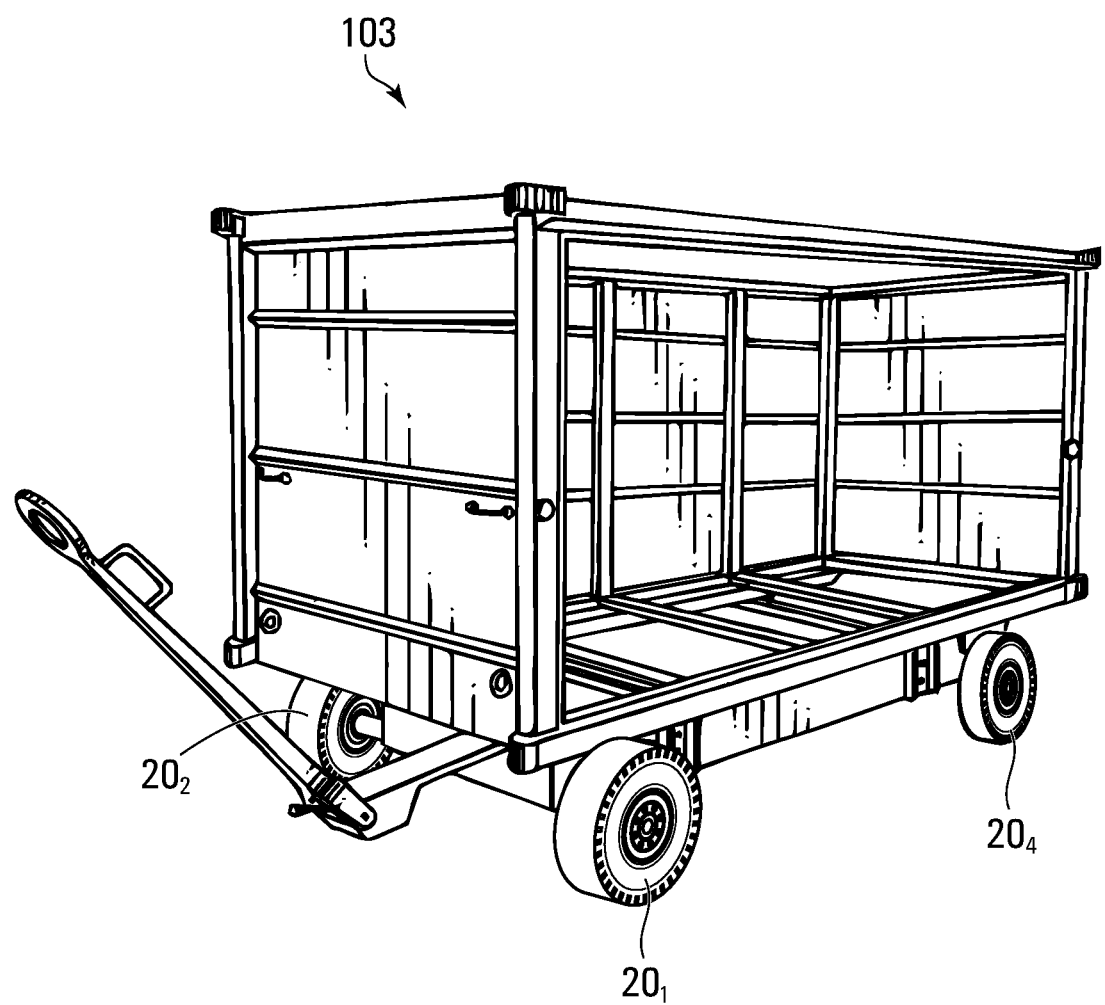

For example, in other embodiments, the material-handling vehicle 10 may be of another type, i.e., not a forklift. For instance, in other embodiments, as shown in FIGS. 36 to 39, the material-handling vehicle 100 may be a baggage tractor for transporting baggage (as shown in FIG. 36), a reach stacker for moving containers 101 (as shown in FIG. 37) or a pushback tractor for moving aircraft 102 (as shown in FIG. 38). The material-handling vehicle 100 may also be a non-motorized vehicle in some embodiments, such as a baggage cart as shown in FIG. 39.

As another example, in other embodiments, the vehicle 10 may be another type of industrial vehicle that is not a material-handling vehicle. For instance, in some examples, the vehicle 10 may be a construction vehicle such as an articulated dump truck, a backhoe loader, a compact wheel loader, a telehandler, a wheel loader, an aerial work platform, compaction equipment, a multi-purpose truck, a skid steer loader or a wheel excavator.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A tire for a wheel rolling on an underlying surface, the tire being elastomeric and non-pneumatic and comprising a plurality of layers that are structurally different and arranged in a radial direction of the tire, wherein:
   an outer one of the layers comprises an outer surface for contacting the underlying surface;
   an inner one of the layers comprises an inner surface for facing an axis of rotation of the wheel;
   an intermediate one of the layers is disposed between and is in contact with an outwardly-adjacent one of the layers and an inwardly-adjacent one of the layers, configured to decouple elastic deformations of the outwardly-adjacent one of the layers and the inwardly-adjacent one of the layers, and comprises reinforcing cables that comprise a metallic material and that extend transversally to a circumferential direction of the tire;
   an elastomeric material of the intermediate one of the layers is different from at least one of an elastomeric material of the outwardly-adjacent one of the layers and an elastomeric material of the inwardly-adjacent one of the layers; and
   the intermediate one of the layers is stiffer in a given direction than the outwardly-adjacent one of the layers.

2. The tire of claim 1, wherein a ratio of a stiffness of the intermediate one of the layers in the given direction over a stiffness of the outwardly-adjacent one of the layers in the given direction is at least 1.2.

3. The tire of claim 1, wherein the given direction is the radial direction of the tire.

4. The tire of claim 1, wherein the given direction is a circumferential direction of the tire.

5. The tire of claim 1, wherein the given direction is a lateral direction of the tire.

6. The tire of claim 1, wherein the intermediate one of the layers is stiffer in plural directions of the tire than the outwardly-adjacent one of the layers.

7. The tire of claim 1, wherein a material of the intermediate one of the layers is stiffer than a material of the outwardly-adjacent one of the layers.

8. The tire of claim 7, wherein a ratio of a modulus of elasticity of the material of the intermediate one of the layers over a modulus of elasticity of the material of the outwardly-adjacent one of the layers is at least 10.

9. The tire of claim 1, wherein the reinforcing cables extend transversally to the radial direction of the tire.

10. The tire of claim 9, wherein the reinforcing cables extend substantially normal to the circumferential direction of the tire and the radial direction of the tire.

11. The tire of claim 9, wherein the reinforcing cables extend substantially parallel to a lateral direction of the tire.

12. The tire of claim 1, wherein a ratio of a length of each reinforcing cable over a width of the tire is at least 0.7.

13. The tire of claim 12, wherein the reinforcing cables extend across the tire to lateral surfaces of the tire.

14. The tire of claim 12, wherein the ratio of the length of the reinforcing cable over the width of the tire is at least 0.9.

15. The tire of claim 1, wherein respective ones of the reinforcing cables are spaced apart from one another in the radial direction of the tire.

16. The tire of claim 1, wherein: the wheel comprises a wheel body for connecting the wheel to an axle; the tire is configured to be press-mounted about the wheel body; and the inner one of the layers comprises a mounting band configured to press-mount the tire onto the wheel body.

17. The tire of claim 1, wherein the outwardly-adjacent one of the layers is the outer one of the layers.

18. The tire of claim 1, wherein the wheel comprises a wheel body for connecting the wheel to an axle and the tire is disposed around the wheel body for contacting the underlying surface.

19. The tire of claim 18, wherein the tire is securable to the wheel body via a press-fit.

20. The tire of claim 1, wherein a rolling resistance coefficient of the tire is no more than 14 $kg_f/t_f$ according to VDI 2196.

21. The tire of claim 1, wherein a working-day-average-speed (WDAS) for the tire is allowed to be greater than 8 km/h.

22. A vehicle comprising the tire of claim 1.

23. The vehicle of claim 22, wherein the vehicle is a material-handling vehicle.

24. The vehicle of claim 23, wherein the material-handling vehicle is a forklift.

25. The vehicle of claim 24, wherein the forklift is an electrical forklift.

26. A tire for a wheel rolling on an underlying surface, the tire being elastomeric and non-pneumatic and comprising:
- an outer surface for contacting the underlying surface;
- an inner surface for facing an axis of rotation of the wheel; and
- reinforcing cables extending transversally to a circumferential direction of the tire and substantially parallel to a lateral direction of the tire;
- wherein: the reinforcing cables extend across the tire to lateral surfaces of the tire; and given ones of the reinforcing cables that extend substantially parallel to the lateral direction of the tire are spaced apart from one another in a radial direction of the tire.

27. The tire of claim 26, wherein a layer of the tire comprising the reinforcing cables is stiffer than an adjacent layer of the tire.

28. The tire of claim 27, wherein a ratio of a stiffness of the layer of the tire comprising the reinforcing cables in a given direction over a stiffness of the adjacent layer of the tire in a given direction is at least 1.2.

29. The tire of claim 27, wherein the layer comprising the reinforcing cables is stiffer in the radial direction of the tire than the adjacent layer.

30. The tire of claim 27, wherein the layer comprising the reinforcing cables is stiffer in a circumferential direction of the tire than the adjacent layer.

31. The tire of claim 27, wherein the layer comprising the reinforcing cables is stiffer in a lateral direction of the tire than the adjacent layer.

32. The tire of claim 27, wherein the layer comprising the reinforcing cables is stiffer in plural directions of the tire than the adjacent layer.

33. The tire of claim 26, wherein a material of a layer of the tire comprising the reinforcing cables is stiffer than a material of an adjacent layer of the tire.

34. The tire of claim 33, wherein a ratio of a modulus of elasticity of the material of the layer comprising the reinforcing cables over a modulus of elasticity of the material of the adjacent layer is at least 10.

35. The tire of claim 26, wherein the reinforcing cables extend transversally to a radial direction of the tire.

36. The tire of claim 35, wherein the reinforcing cables extend substantially normal to the circumferential direction of the tire and the radial direction of the tire.

37. The tire of claim 26 wherein a ratio of a length of each reinforcing cable over a width of the tire is at least 0.5.

38. The tire of claim 37, wherein the ratio of the length of each reinforcing cable over the width of the tire is at least 0.7.

39. The tire of claim 26, wherein the given ones of the reinforcing cables spaced apart from one another in the radial direction of the tire are arranged in a plurality of rows that are spaced apart from one another in the radial direction of the tire and differently configured.

40. The tire of claim 39, wherein a spacing of adjacent ones of the reinforcing cables of a first one of the rows is different from a spacing of adjacent ones of the reinforcing cables of a second one of the rows.

41. The tire of claim 26, wherein the wheel comprises a wheel body for connecting the wheel to an axle and the tire is disposed around the wheel body for contacting the underlying surface.

42. The tire of claim 41, wherein the tire is securable to the wheel body via a press-fit.

43. The tire of claim 26, wherein a rolling resistance coefficient of the tire is no more than 14 $kg_f/t_f$ according to VDI 2196.

44. The tire of claim 26, wherein a working-day-average-speed (WDAS) for the tire is allowed to be greater than 8 km/h.

45. A vehicle comprising the tire of claim 26.

46. The vehicle of claim 45, wherein the vehicle is a material-handling vehicle.

47. The vehicle of claim 46, wherein the material-handling vehicle is a forklift.

48. The vehicle of claim 47, wherein the forklift is an electrical forklift.

49. A tire for a wheel rolling on an underlying surface, the tire being elastomeric and non-pneumatic and comprising:
- an outer surface for contacting the underlying surface;
- an inner surface for facing an axis of rotation of the wheel; and
- reinforcing cables extending transversally to a circumferential direction of the tire and substantially parallel to a lateral direction of the tire across the tire,
- wherein given ones of the reinforcing cables are spaced apart from one another in a radial direction of the tire in a plurality of rows, and
- wherein a diameter of each of the reinforcing cables in a first row of the plurality of rows is different from a diameter of each of the reinforcing cables in a second row of the plurality of rows.

* * * * *